US008876937B2

(12) United States Patent
Peng et al.

(10) Patent No.: US 8,876,937 B2
(45) Date of Patent: *Nov. 4, 2014

(54) PRODUCTION OF NANOSTRUCTURES

(71) Applicant: Innova Dynamics, Inc., San Francisco, CA (US)

(72) Inventors: Sheng Peng, San Francisco, CA (US); Arjun Srinivas, San Francisco, CA (US); Tom Credelle, San Francisco, CA (US); Andrew Loxley, San Francisco, CA (US); Gayatri Keskar, San Francisco, CA (US)

(73) Assignee: Innova Dynamics, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,061

(22) Filed: Apr. 8, 2014

(65) Prior Publication Data
US 2014/0251086 A1 Sep. 11, 2014

Related U.S. Application Data

(63) Continuation of application No. 14/203,482, filed on Mar. 10, 2014.

(60) Provisional application No. 61/774,917, filed on Mar. 8, 2013, provisional application No. 61/793,192, filed on Mar. 15, 2013, provisional application No. 61/920,429, filed on Dec. 23, 2013.

(51) Int. Cl.
*B22F 9/24* (2006.01)
*B82Y 40/00* (2011.01)

(52) U.S. Cl.
CPC .............. *B22F 9/24* (2013.01); *B22F 2009/245* (2013.01); *Y10S 977/896* (2013.01); *B82Y 40/00* (2013.01); *Y10S 977/762* (2013.01)
USPC .............................. 75/371; 977/762; 977/896

(58) Field of Classification Search
None
See application file for complete search history.

(56) References Cited

U.S. PATENT DOCUMENTS

| 7,585,349 B2 | 9/2009 | Xia et al. |
| 7,922,787 B2 * | 4/2011 | Wang et al. ..................... 75/371 |
| 2006/0115536 A1 * | 6/2006 | Yacaman et al. .............. 424/489 |

(Continued)

FOREIGN PATENT DOCUMENTS

WO  WO-2012/171486  12/2012

OTHER PUBLICATIONS

Carotenuto et al., "Preparation and Characterization of Nano-sized Ag/PVP Composites for Optical Applications", Eur. Phys. J. B (2000), 16, pp. 11-17.

(Continued)

*Primary Examiner* — George Wyszomierski
(74) *Attorney, Agent, or Firm* — Foley & Lardner LLP; Cliff Z. Liu

(57) ABSTRACT

Methods of producing nanowires and resulting nanowires are described. In one implementation, a method of producing nanowires includes energizing (i) a metal-containing reagent; (ii) a templating agent; (iii) a reducing agent; and (iv) a seed-promoting agent (SPA) in a reaction medium and under conditions of a first temperature for at least a portion of a first duration, followed by a second temperature for at least a portion of a second duration, and the second temperature is different from the first temperature.

5 Claims, 38 Drawing Sheets

(56) References Cited

U.S. PATENT DOCUMENTS

| | | | |
|---|---|---|---|
| 2006/0240980 A1* | 10/2006 | Hung et al. | 502/417 |
| 2007/0034052 A1 | 2/2007 | Vanheusden et al. | |
| 2008/0003130 A1 | 1/2008 | Xia et al. | |
| 2008/0210052 A1 | 9/2008 | Allemand | |
| 2011/0045272 A1* | 2/2011 | Allemand | 428/292.1 |
| 2011/0048170 A1* | 3/2011 | Bhatia et al. | 75/330 |
| 2011/0185853 A1 | 8/2011 | Wang et al. | |
| 2012/0247275 A1* | 10/2012 | Yang et al. | 75/370 |
| 2012/0301348 A1* | 11/2012 | Whitcomb | 420/469 |
| 2014/0102254 A1* | 4/2014 | Jiang et al. | 75/345 |

OTHER PUBLICATIONS

Iida, Masayasu et al. Physicochemical Properties of Ionic Liquids Containing N-alkylamine-Silver(I) Complex Cations or Protic N-alkylaminium Cations, Ionic Liquids: Theory, Properties, New Approaches, (2011), Prof. Alexander Kokorin (Ed.), ISBN: 978-953-307-349-1, InTech, Available from: http://www.intechopen.com/books/ionic-liquids-theory-properties-new-approaches/physicochemical-properties-of-ionic-liquids-containing-n-alkylamine-silver-i-complex-cations-or-prot.

Kuo et al., "Nitrate Ion Promoted Formation of Ag Nanowires in Polyol Processes: A New Nanowire Growth Mechanism", Langmuir (2012), 28, pp. 3722-3729.

Sun et al., "Crystalline Silver Nanowires by Soft Solution Processing", Nano Letters (2002), vol. 2, No. 2, pp. 165-168.

Sun et al., "Large-Scale Synthesis of Uniform Silver Nanowires Through a Soft, Self-Seeding, Polyol Process", Adv. Mater. (2002), 14, No. 11, Jun. 5 pp. 833-837.

Sun, et al., "Uniform Silver Nanowires Synthesis by Reducing $AgNO_3$ with Ethylene Glycol in the Presence of Seeds and Poly(Vinyl Pyrrolidone)", Chem. Mater., (2002), vol. 14, pp. 4736-4745.

* cited by examiner

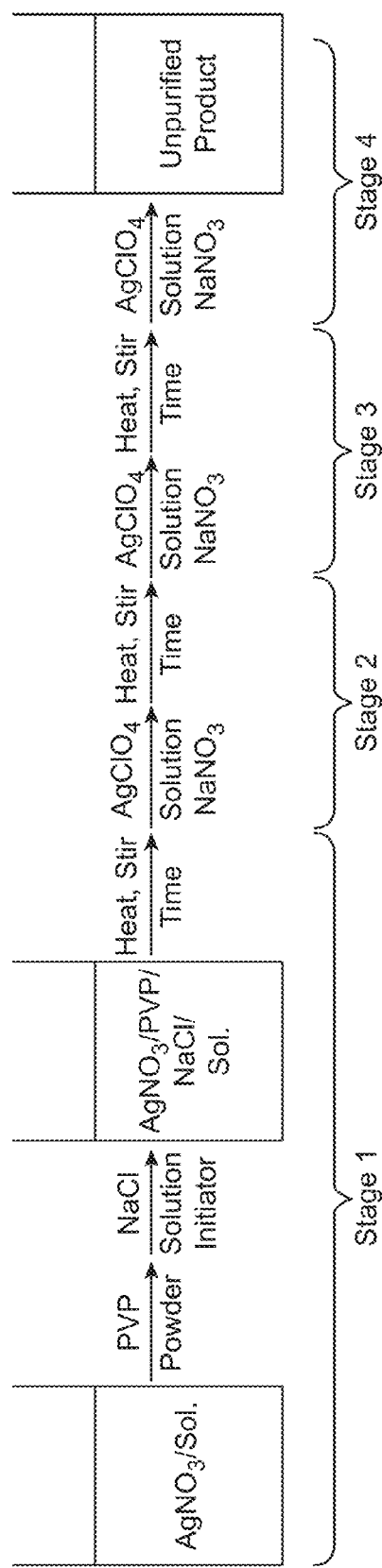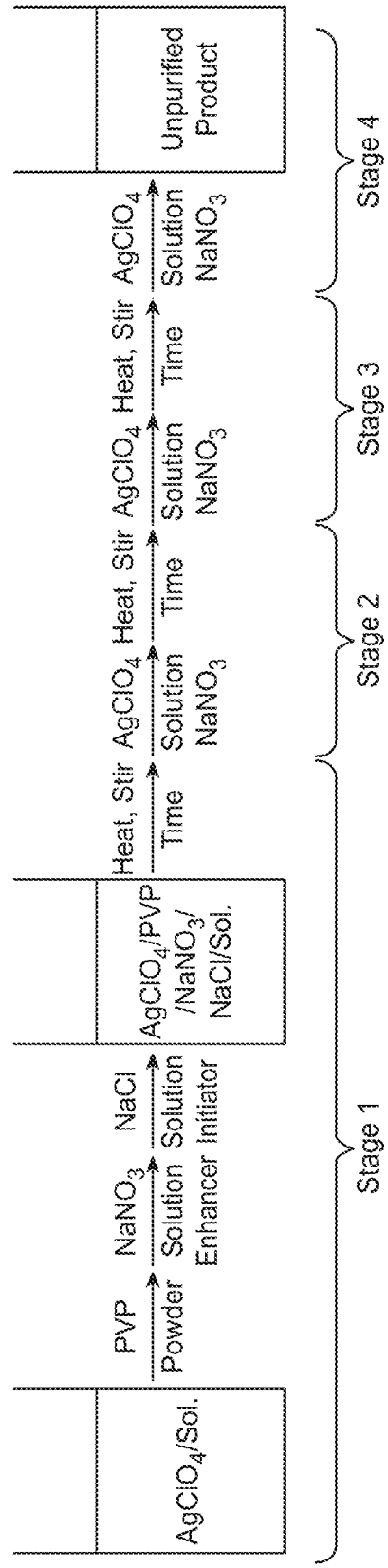
FIG. 2I
FIG. 2J

Flowchart

2.15 L Reaction, total time ~71 hr

Glycerol
⬇ 2571 g (2.05 L), Warm up to 60°C

AgNO₃ granulated powder
⬇ 35.00 g (0.205 mol), Max stirring
1 min, mix well (until fully dissolved)

PVP (MW:55k) powder into AgNO₃/Glycerol
⬇ 58.7 g (0.529 mol monomer, ~2.2% wt)

⬇ Max. mechanical stirring @ 60°C
Dissolve PVP as fast as possible

NaCl/H₂O/Glycerol (1.19 g/10 g/252.26 g stock)
⬇ 105 mL added 2 min after PVP
Heat up to 90° C within ~20min Total Volume ~2.15 L, Total AgNO₃ 0.205 mol

One Stage Reaction

⬇ 90°C 0.5hr, full dissolution

⬇ Lower to 80°C for seeding (16 hr)

⬇ Raise back to 90°C for growth

⬇ Age at 90°C for 54 hr

⬇ Mix with MeOH at 1:1 v/v

Ag Nanowires (31.3 nm x 17 um)

Ag Concentration: 0.095 Molar

FIG. 3

Coarse Purified Nanowires, Diameter: 31.3 ± 4.6 nm; Length: 17.5 ± 7.4 μm

Optical and TEM Images of
Product from a NaCl-free Synthesis

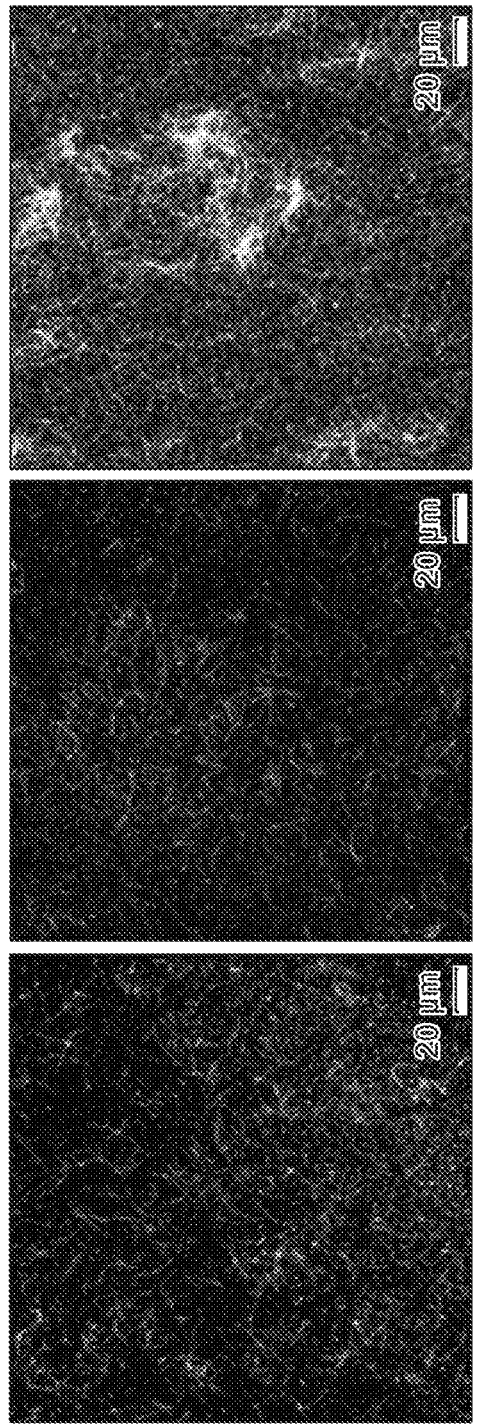

Color Observations

BKM 140°C reaction

After AgNO₃ is added in Stage 1.

Light yellow (40C) ⟶ Yellow/Orange (60C) ⟶ Dark Brown (80C) ⟶ Brown/Orange (100C) ⟶ Carrot/TomatoSauce (140C) ⟶ Dark red (140C 1-2hrs) ⟶ Dark purple (140C 2-3 hr) ⟶ Grey (140C 4hr) (Bubbling) ⟶ Silvery Grey with a pinch of olive/brown (140 C 24 hr) ⟶ Silvery grey (after injection)

- Translucent: { Light yellow (40C), Yellow/Orange (60C) }
- Opaque/Cloudy: { Dark Brown (80C) ... }
- Seeding
- Growth Transition: 140 C, 2-4hrs

Process A

After AgNO₃ is added in Stage 1.

Salmon Pink (68C) ⟶ Salmon Orange (72C) ⟶ Curry Yellow Orange (75C) (with yellow/brown undissolved PVP lumps) ⟶ Curry Olive with a pinch red (106C) Lumps almost gone ⟶ Same color (120C) Lumps fully disappeared ⟶ Carrot/Tomato Soup (129C, overshot) ⟶ Dark red (120C 1-2hrs) ⟶ Dark purple (120C 2-3 hr) ⟶ Olive Grey (120C 18hr)

Back to normal observation since 120 C for 15 min. The chemical sequence probably did not change the latter part of the reaction.

Transition: 120 C, 2-4hrs

FIG. 21

- OPS (ohms/sq) values are the average of 49 points from 6"x6" samples, 6"-0.75mil Rod
- %T & %H values are the average of 9 points from 6"x6" samples
- Samples were annealed at 130°C -1hr -17hr or more till OPS values stop changing
- NOTE: the formulation & annealing conditions are all different in each point

- OPS (ohms/sq) values are the average of 49 points from 6"x6" samples, 6"-0.75mil Rod
- %T & %H values are the average of 9 points from 6"x6" samples
- Samples were annealed at 130°C -1hr -17hr or more till OPS values stop changing
- NOTE: the formulation & annealing conditions are all different in each point Process A: Sample Characterization

| Sample # | YY-112812-2 | YY-112812-3 | YY-112812-4 |
|---|---|---|---|
| Ink formulation | 1.5mg/ml 1%CX | 2mg/ml 1%CX | 2.4mg/ml 1%CX |
| Ethocel | 2mg/ml | 2mg/ml | 2mg/ml |
| Ink # | HGV373 | HGV374 | HGV375 |
| AgNW # | PSA95-1127 | PSA95-1127 | PSA95-1127 |
| Mean | 83 | 55 | 47 |
| Std Dev | 6 | 6 | 3 |
| %dev from Mean | 7% | 11% | 7% |
| Min | 61 | 47 | 40 |
| Max | 93 | 73 | 54 |
| %T | 92.4 | 91.6 | 91.7 |
| %H | 0.83 | 1.22 | 1.25 |

- OPS (ohms/sq) values are the average of 49 points from 6"x6" samples, 6"-0.75mil Rod
- %T & %H values are the average of 9 points from 6"x6" samples
- Samples were annealed at 130°C -1hr -17hr or more till OPS values stop changing
- NOTE: the formulation & annealing conditions are all different in each point

FIG. 28

PRODUCTION OF NANOSTRUCTURES

CROSS REFERENCE TO RELATED APPLICATIONS

This application is a continuation of U.S. application Ser. No. 14/203,482, filed on Mar. 10, 2014, which claims the benefit of U.S. Provisional Application No. 61/774,917, filed on Mar. 8, 2013, U.S. Provisional Application No. 61/793,192, filed on Mar. 15, 2013, and U.S. Provisional Application No. 61/920,429, filed on Dec. 23, 2013, the disclosures of which are incorporated herein by reference in their entireties.

FIELD OF THE INVENTION

This disclosure relates generally to nanostructures. More particularly, this disclosure relates to the production of nanostructures, such as nanowires.

BACKGROUND

Nano-sized materials (or nanostructures) can differ markedly from their analogous bulk materials. In particular, physical, chemical, electrical, and other properties of nanostructures can correlate with their morphology, including shape and size. As a result, efforts have been made to develop methods for producing nanostructures with controllable morphology, hence tailoring their properties. Unfortunately, existing methods can suffer from poor yields and difficulty in attaining desired nanostructure morphology. Nanowires of high aspect ratios and small diameters, such as over 500 in aspect ratio and below 30 nm in diameter, are particularly difficult to attain consistently.

It is against this background that a need arose to develop the embodiments described herein.

SUMMARY

One aspect of this disclosure relates to a method of producing nanowires. In some embodiments, the method includes heating a reaction mixture including (i) a solvent; (ii) a metal-containing reagent; (iii) a templating agent; and (iv) a seed-promoting agent (SPA) that is a source of halide anions, thereby producing a product that includes nanowires of the metal. The solvent includes at least two hydroxyl groups per molecule. A ratio of a concentration of the halide anions in the reaction mixture to an overall concentration of the metal in the reaction mixture, including ionic and elemental metal forms, is up to 10. The heating is carried out at a seeding temperature, followed by a growth temperature that is higher than the seeding temperature.

In some embodiments, the solvent includes at least three hydroxyl groups per molecule. In some embodiments, the solvent has a viscosity higher than 16.9 cP at room temperature (25° C.). In some embodiments, the solvent is glycerol.

In some embodiments, the metal is silver, the nanowires are silver nanowires, the metal-containing reagent includes at least one silver-containing salt selected from silver nitrate, silver perchlorate, and silver fluoride, and the templating agent is poly(vinylpyrrolidone). In some embodiments, the metal is silver, the nanowires are silver nanowires, and the metal-containing reagent is silver perchlorate.

In some embodiments, the overall concentration of the metal in the reaction mixture is less than 0.1 molar.

In some embodiments, the method further includes purifying the product to yield a purified product, and wherein at least 30% by number of the nanowires in the purified product have a length of at least 10 μm.

In some embodiments, the metal-containing reagent is in a solution form when combined with other reagents in the reaction mixture. In some embodiments, the templating agent is in a solid or semi-solid form when combined with other reagents in the reaction mixture.

In some embodiments, the halide anions are chloride anions, and the ratio of the concentration of the chloride anions in the reaction mixture to the overall concentration of the metal in the reaction mixture is in a range of 0.001 to 10. In some embodiments, the SPA is a first SPA, and the reaction mixture also includes a second SPA that is a source of nitrate anions, and a ratio of a concentration of the nitrate anions in the reaction mixture to the overall concentration of the metal in the reaction mixture is in a range of 0.01 to 10.

In some embodiments, the method includes energizing (i) a metal-containing reagent; (ii) a templating agent; (iii) a reducing agent; and (iv) a seed-promoting agent (SPA) in a reaction medium and under conditions of a first temperature for at least a portion of a first duration, followed by a second temperature for at least a portion of a second duration, and the second temperature is different from the first temperature.

In some embodiments, the reaction medium includes an alcohol including at least three hydroxyl groups per molecule. In some embodiments, the alcohol is glycerol. In some embodiments, the reaction medium has a viscosity higher than 16.9 cP at room temperature.

In some embodiments, the first temperature is less than 120° C. In some embodiments, a difference between the second temperature and the first temperature is at least 5° C.

In some embodiments, the metal-containing reagent is selected from silver perchlorate, silver fluoride, and silver permanganate. In some embodiments, the metal-containing reagent is a first metal-containing reagent, the energizing further includes energizing a second metal-containing reagent that is different from the first metal-containing reagent, and at least one of the first metal-containing reagent and the second metal-containing reagent is different from silver nitrate.

In some embodiments, the metal-containing reagent is a source of silver different from silver nitrate, and the SPA is a source of nitrate anions.

In some embodiments, the metal-containing reagent is selected from ionic liquids and organometallic compounds.

In some embodiments, the templating agent is in a solid or semi-solid form when combined with other reagents in the reaction medium, and the templating agent is poly(vinylpyrrolidone). In some embodiments, the templating agent is a first templating agent, and the energizing further includes energizing a second templating agent that is different from the first templating agent.

In some embodiments, a ratio of a concentration of the templating agent in the reaction medium to an overall concentration of the metal in the reaction medium, including ionic and elemental metal forms, is greater than 10.

In some embodiments, the reducing agent is formed in-situ. In some embodiments, the reducing agent is exogenously added to the reaction medium. In some embodiments, the energizing includes forming the reducing agent as an oxidized derivative of the reaction medium. In some embodiments, the reducing agent is an aldehyde.

In some embodiments, the SPA is a source of halide anions, and a ratio of a concentration of the halide anions in the reaction medium to an overall concentration of the metal in the reaction medium, including ionic and elemental metal forms, is in a range of 0.001 to 10.

In some embodiments, the SPA is a source of nitrate anions, and a ratio of a concentration of the nitrate anions in the reaction medium to an overall concentration of the metal in the reaction medium, including ionic and elemental metal forms, is in a range of 0.1 to 20.

In some embodiments, the SPA is a first SPA that is a source of halide anions, and the energizing further includes energizing a second SPA that is a source of nitrate anions. In some embodiments, the first SPA is a chloride salt, and the second SPA is a nitrate salt.

In some embodiments, the reaction medium includes an alcohol including at least three hydroxyl groups per molecule, the first temperature is less than 85° C., the second temperature is less than 105° C. and is greater than the first temperature, the metal-containing reagent is silver nitrate, the templating agent is poly(vinylpyrrolidone), the reducing agent is an oxidized derivative of the alcohol, the SPA is sodium chloride, and an overall concentration of silver in the reaction medium, including ionic and elemental metal forms, is less than 0.1 molar.

Another aspect of this disclosure relates to a method of producing silver nanowires. In some embodiments, the method includes heating a reaction mixture including (i) a solvent; (ii) a silver-containing reagent; (iii) a templating agent; (iv) a first seed-promoting agent (SPA) that is a source of halide anions; and (v) a second SPA that is a source of nitrate anions, thereby producing silver nanowires. The solvent includes at least three hydroxyl groups per molecule, and a ratio of a concentration of the nitrate anions in the reaction mixture to an overall concentration of silver in the reaction mixture, including ionic and elemental metal forms, is different from 1.

In some embodiments, the solvent is glycerol.

In some embodiments, the silver-containing reagent also is a source of the nitrate anions in the reaction mixture. In some embodiments, the silver-containing reagent is silver perchlorate.

In some embodiments, the halide anions are chloride anions, and a ratio of a concentration of the chloride anions in the reaction mixture to the overall concentration of silver in the reaction mixture is in a range of 0.001 to 10. In some embodiments, the ratio of the concentration of the nitrate anions in the reaction mixture to the overall concentration of silver in the reaction mixture is different from 1 and is in a range of 0.01 to 10. In some embodiments, the first SPA is a chloride salt, and the second SPA is a nitrate salt.

In some embodiments, the heating is carried out at a seeding temperature, followed by a growth temperature that is higher than the seeding temperature.

In some embodiments, the method includes combining (i) a solvent; (ii) a silver-containing reagent; (iii) a templating agent; and (iv) a nitrate salt to produce a reaction mixture; and energizing the reaction mixture to produce silver nanowires. At least one of the silver nanowires is single crystalline, and a ratio of a concentration of nitrate anions in the reaction mixture to an overall concentration of silver in the reaction mixture, including ionic and elemental metal forms, is different from 1.

In some embodiments, the silver-containing reagent is different from silver nitrate, and the ratio of the concentration of nitrate anions in the reaction mixture to the overall concentration of silver in the reaction mixture is different from 1 and is in a range of 0.1 to 20.

In some embodiments, the silver-containing reagent is silver perchlorate.

In some embodiments, the method includes: (1) in a first stage, heating a first amount of a first silver-containing reagent, a solvent, and a templating agent in a reaction mixture; and (2) in a second stage subsequent to the first stage, introducing a second amount of a second silver-containing reagent to the reaction mixture. The second silver-containing reagent is different from silver nitrate.

In some embodiments, the solvent includes at least three hydroxyl groups per molecule. In some embodiments, the solvent is glycerol.

In some embodiments, the first silver-containing reagent includes at least one silver-containing salt selected from silver nitrate, silver perchlorate, and silver fluoride, and the second silver-containing reagent includes at least one silver-containing salt selected from silver perchlorate and silver fluoride.

In some embodiments, in the first stage, the templating agent is in a solid or semi-solid form when combined with other reagents in the reaction mixture.

In some embodiments, in the second stage, the second amount of the second silver-containing reagent is introduced to the reaction mixture, such that an overall concentration of silver in the reaction mixture, including ionic and elemental metal forms, is less than 0.1 molar.

In some embodiments, in the first stage, the reaction mixture also includes a first seed-promoting agent (SPA) that is a source of halide anions. In some embodiments, in the first stage, the reaction mixture also includes a second SPA that is a source of nitrate anions. In some embodiments, in the second stage, the second silver-containing reagent is silver perchlorate, the introducing also includes introducing a second SPA to the reaction mixture, and the second SPA is a source of nitrate anions.

In some embodiments, the method also includes, in a third stage subsequent to the second stage, introducing a third amount of a third silver-containing reagent to the reaction mixture, and the third silver-containing reagent is different from silver nitrate.

Another aspect of this disclosure relates to a method of producing nanowire-forming seeds. In some embodiments, the method includes energizing (i) a source of a metal; (ii) a templating agent; (iii) a reducing agent; and (iv) a seed-promoting agent at a seeding temperature for at least a portion of a seeding duration, followed by cooling to produce a product including nanowire-forming seeds.

In some embodiments, the method further includes purifying the product to yield a purified product including the nanowire-forming seeds.

In some embodiments, the method further includes placing the product in a container for storage.

Another aspect of this disclosure relates to a method of producing nanowires from nanowire-forming seeds. In some embodiments, the method includes (1) providing nanowire-forming seeds; (2) combining the nanowire-forming seeds with a metal-containing reagent, a templating agent, and a reducing agent in a reaction medium; and (3) energizing the reaction medium at a growth temperature for at least a portion of a growth duration to produce nanowires.

In some embodiments, the nanowire-forming seeds are exogenously added to the reaction medium, and the reducing agent is formed endogenously in the reaction medium.

Other aspects and embodiments of this disclosure are also contemplated. The foregoing summary and the following detailed description are not meant to restrict this disclosure to any particular embodiment but are merely meant to describe various embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 2I shows another implementation of a multi-staged reaction for the production of silver nanowires, according to an embodiment of this disclosure.

FIG. 2J shows yet another implementation of a multi-staged reaction for the production of silver nanowires, according to an embodiment of this disclosure.

FIG. 3 is a flowchart of a process for the production of silver nanowires according to the implementation of FIG. 2A.

FIG. 9A is an optical image of silver nanowires produced according to FIG. 3, while FIG. 9B and FIG. 9C are optical images of silver nanowires produced according FIG. 3, but with sodium nitrate (or $NaNO_3$) added at the beginning of a reaction according to the implementation of FIG. 2B.

FIG. 21 compares color observations during the production of silver nanowires according to FIG. 19 and during the production of silver nanowires according to FIG. 20.

FIGS. 26, 27, and 28 show haze and sheet resistance values of transparent conductive electrodes incorporating silver nanowires produced according to FIG. 20.

DETAILED DESCRIPTION

Definitions

Figure 1A:
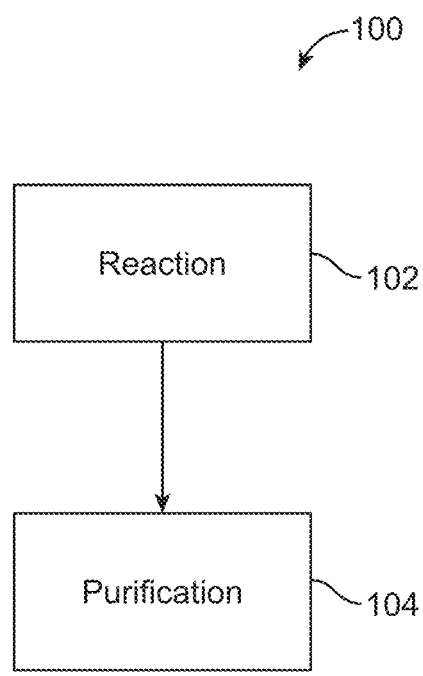
FIG. 1A shows a flowchart for the production of nanowires, such as metal nanowires, according to an embodiment of this disclosure.

The following definitions apply to some of the aspects described with regard to some embodiments of this disclosure. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set can also be referred to as members of the set. Objects of a set can be the same or different. In some instances, objects of a set can share one or more common characteristics.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the terms "optional" and "optionally" mean that the subsequently described event or circumstance may or may not occur and that the description includes instances where the event or circumstance occurs and instances in which it does not.

As used herein, the term "nanometer range" or "nm range" refers to a range of dimensions from about 1 nanometer (or nm) to about 1 micrometer (or μm). The nm range includes the "lower nm range," which refers to a range of dimensions from about 1 nm to about 10 nm, the "middle nm range," which refers to a range of dimensions from about 10 nm to about 100 nm, and the "upper nm range," which refers to a range of dimensions from about 100 nm to about 1 μm.

As used herein, the term "micrometer range" or "μm range" refers to a range of dimensions from about 1 μm to about 1 millimeter (or mm). The μm range includes the "lower μm range," which refers to a range of dimensions from about 1 μm to about 10 μm, the "middle μm range," which refers to a range of dimensions from about 10 μm to about 100 μm, and the "upper μm range," which refers to a range of dimensions from about 100 μm to about 1 mm.

As used herein, the term "aspect ratio" refers to a ratio of a largest dimension or extent of an object and an average of remaining dimensions or extents of the object, where the remaining dimensions can be substantially orthogonal with respect to one another and with respect to the largest dimension. In some instances, remaining dimensions of an object can be substantially the same, and an average of the remaining dimensions can substantially correspond to either of the remaining dimensions. In some instances, a largest dimension or extent of an object can be aligned with, or can extend along, a major axis of the object, while remaining dimensions of the object can be aligned with, or can extend along, respective minor axes of the object, where the minor axes can be substantially orthogonal with respect to one another and with respect to the major axis. For example, an aspect ratio of a cylinder refers to a ratio of a length of the cylinder and a cross-sectional diameter of the cylinder. As another example, an aspect ratio of a spheroid refers to a ratio of a dimension along a major axis of the spheroid and a dimension along a minor axis of the spheroid.

As used herein, the term "nano-sized" object refers to an object that has at least one dimension in the nm range. A nano-sized object can have any of a wide variety of shapes, and can be formed of a wide variety of materials. Examples of nano-sized objects include nanowires, nanotubes, nanoplatelets, nanoparticles, and other nanostructures.

As used herein, the term "nanowire" refers to an elongated, nano-sized object that is substantially solid. Typically, a nanowire has a lateral dimension (e.g., a cross-sectional dimension in the form of a width, a diameter, or a width or diameter that represents an average across orthogonal directions) in the nm range, a longitudinal dimension (e.g., a length) in the μm range, and an aspect ratio that is about 3 or greater.

As used herein, the term "nanoplatelet" refers to a planar-like nano-sized object that is substantially solid.

As used herein, the term "nanotube" refers to an elongated, hollow, nano-sized object. Typically, a nanotube has a lateral dimension (e.g., a cross-sectional dimension in the form of a width, an outer diameter, or a width or outer diameter that represents an average across orthogonal directions) in the nm range, a longitudinal dimension (e.g., a length) in the μm range, and an aspect ratio that is about 3 or greater.

As used herein, the term "nanoparticle" refers to a nano-sized object. Typically, each dimension (e.g., a cross-sectional dimension in the form of a width, a diameter, or a width or diameter that represents an average across orthogonal directions) of a nanoparticle is in the nm range, and the nanoparticle has an aspect ratio that is less than about 3, such as about 1.

As used herein, the term "micron-sized" object refers to an object that has at least one dimension in the μm range. Typically, each dimension of a micron-sized object is in the μm range or beyond the μm range. A micron-sized object can have any of a wide variety of shapes, and can be formed of a wide variety of materials. Examples of micron-sized objects include microwires, microtubes, microparticles, and other microstructures.

As used herein, the term "microwire" refers to an elongated, micron-sized object that is substantially solid. Typically, a microwire has a lateral dimension (e.g., a cross-sectional dimension in the form of a width, a diameter, or a width or diameter that represents an average across orthogonal directions) in the μm range and an aspect ratio that is about 3 or greater.

As used herein, the term "microtube" refers to an elongated, hollow, micron-sized object. Typically, a microtube has a lateral dimension (e.g., a cross-sectional dimension in the form of a width, an outer diameter, or a width or outer diameter that represents an average across orthogonal directions) in the μm range and an aspect ratio that is about 3 or greater.

As used herein, the term "microparticle" refers to a micron-sized object. Typically, each dimension (e.g., a cross-sectional dimension in the form of a width, a diameter, or a width or diameter that represents an average across orthogonal directions) of a microparticle is in the μm range, and the microparticle has an aspect ratio that is less than about 3, such as about 1.

As used herein, the term "seed" refers to a microparticle, a micron-sized cluster, a nanoparticle, a nano-sized cluster, or other micron-sized or nano-sized object, which can, or has the potential to, subsequently grow or be grown into a different sized or shaped object, such as a nanowire, a nanotube, a nanoplatelet, a larger nanoparticle, or another nanostructure or microstructure. In some example cases, a seed can be grown in an initial phase of a reaction, followed by a subsequent phase. In other example cases, a seed can be grown in a stand-alone reaction. In other example cases, nanowires can be grown in a stand-alone reaction that starts with nanowire-forming seeds as well.

As used herein, the term "non-nanowire-forming seeds" refers to seeds having particular structures, compositions, or chemistries that exhibit limited, little, or no growth to form nanowires, such as in a later phase of a reaction or a stand-alone reaction, and can instead preferentially form other types of nanostructures, such as nanoplatelets or larger nanoparticles.

As used herein, the term "nanowire-forming seeds" refers to seeds having particular structures, compositions, or chemistries, which can, or has the potential to, exhibit growth, such as via one-dimensional or axial growth, to form nanowires in a later phase of a reaction or a stand-alone reaction, and can, or has the potential to, preferentially form nanowires instead of other types of nanostructures. Examples of nanowire-forming seeds include multiple twinned nanoparticles, such as decahedron, five-fold twinned, or pentagonal nanoparticles.

As used herein, the term "single crystalline" or "monocrystalline" refers to an object in which a crystal lattice extends across the object to its boundaries, with a uniform crystalline orientation that is substantially devoid of crystalline orientation mismatches or grain boundaries. As will be understood, the presence of crystalline orientation mismatches or grain boundaries is a characteristic of a polycrystalline object. In the case of a population of objects, the population of objects can be characterized as single crystalline if a concentration of crystalline orientation mismatches or grain boundaries within the population of objects is no greater than about 1 per 10 objects, no greater than about 1 per 20 objects, no greater than about 1 per 50 objects, no greater than about 1 per 100 objects, no greater than about 1 per 200 objects, no greater than about 1 per 500 objects, or no greater than about 1 per 1,000 objects.

As used herein, the term "reactant" refers to a material that reacts in a chemical reaction, that is capable of influencing an extent or a rate of the reaction, or that is capable of influencing an abundance or characteristics of products formed in the reaction. A reactant can be a solid, a semi-solid, a liquid, a gas, a compound, a solution, or any combination thereof.

As used herein, the term "binding" refers to an object forming a complex, coordinating, adhering, partially or otherwise covering, undergoing adsorption (e.g., physisorption, chemisorption, or both), undergoing absorption, interacting, or otherwise associating with another object.

As used herein, the term "energizing" refers to supplying energy to an object, where at least a portion of the supplied energy is absorbed by at least some component of the object.

As used herein, the term "heating" refers to energizing an object in a manner that transfers thermal energy to the object. Heating can be accomplished by, for example, irradiating an object or via non-radiative heating. The transfer of thermal energy can result in a change in temperature of an object.

As used herein, the term "irradiating" refers to energizing an object by supplying electromagnetic radiation to the object, where at least a portion of the supplied electromagnetic radiation is absorbed by at least some component of the object. The energy absorbed can result in a change in temperature of an object. Alternatively, or in conjunction, the energy can be absorbed in a manner that does not necessarily result in a change in temperature, such as by driving a chemical change, a change of physical state, or other reaction in an irradiated object. Electromagnetic radiation includes, for example, radiofrequency radiation, microwave radiation, terahertz radiation, infrared radiation, visible radiation, ultraviolet radiation, X-rays, gamma rays, or any combination thereof.

As used herein, the term "non-radiative" heating refers to heating an object in a manner other than by irradiation.

As used herein, the term "infrared radiation" refers to electromagnetic radiation characterized by a vacuum wavelength between about 700 nm and about 100,000 nm.

As used herein, the term "microwave radiation" refers to electromagnetic radiation characterized by a vacuum wavelength between about 1 mm and about 1 meter (m).

As used herein, the term "ultraviolet radiation" refers to electromagnetic radiation characterized by a vacuum wavelength shorter than that of the visible region, but longer than that of soft X-rays. Ultraviolet radiation can be subdivided into the following wavelength ranges: near UV, from about 380 nm to about 200 nm; far or vacuum UV (FUV or VUV), from about 200 nm to about 10 nm; and extreme UV (EUV or XUV), from about 121 nm to about 10 nm.

As used herein, the term "visible radiation" refers to electromagnetic radiation that can be detected and perceived by the human eye. Visible radiation generally has a vacuum wavelength in a range from about 400 nm to about 700 nm.

As used herein, the term "vacuum wavelength" refers to a wavelength that electromagnetic radiation of a given frequency would have if the radiation is propagating through a vacuum, and is given by the speed of light in vacuum divided by the frequency of the electromagnetic radiation.

As used herein, relative terms, such as "inner," "interior," "outer," "exterior," "top," "bottom," "front," "rear," "back," "upper," "upwardly," "lower," "downwardly," "vertical," "vertically," "lateral," "laterally," "above," and "below," refer to an orientation of a set of objects with respect to one another, such as in accordance with the drawings, but do not require a particular orientation of those objects during manufacturing or use.

Additionally, concentrations, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Production of Nanowires

Embodiments described herein relate to the production of nanostructures with controllable morphologies. Examples of nanostructures include nanowires, which can be formed of a variety of materials, including metals (e.g., silver (or Ag), nickel (or Ni), palladium (or Pd), platinum (or Pt), copper (or Cu), and gold (or Au)), metal alloys, semiconductors (e.g., silicon (or Si), indium phosphide (or InP), and gallium nitride (or GaN)), metalloids (e.g., tellurium (or Te)), conducting oxides and chalcogenides that are optionally doped and transparent (e.g., metal oxides and chalcogenides that are optionally doped and transparent such as zinc oxide (or ZnO)), electrically conductive polymers (e.g., poly(aniline), poly (acetylene), poly(pyrrole), poly(thiophene), poly(p-phenylene sulfide), poly(p-phenylene vinylene), poly(3-alkylthiophene), olyindole, poly(pyrene), poly(carbazole), poly (azulene), poly(azepine), poly(fluorene), poly(naphthalene), melanins, poly(3,4-ethylenedioxy thiophene) (or PEDOT), poly(styrenesulfonate) (or PSS), PEDOT-PSS, PEDOT-poly (methacrylic acid), poly(3-hexylthiophene), poly(3-octylthiophene), poly(C-61-butyric acid-methyl ester), and poly[2-methoxy-5-(2'-ethyl-hexyloxy)-1,4-phenylene vinylene]), insulators (e.g., silica (or $SiO_2$) and titania (or $TiO_2$)), and any combination thereof. Nanowires can have a core-shell configuration or a core-multi-shell configuration.

In some embodiments, nanowire morphologies are controlled by incorporating a single-staged or multi-staged reaction along with purification of a resulting nanowire product. In such manner, desired nanowire morphologies can be achieved in high yields. Although certain embodiments are described in the context of nanowires, additional embodiments can be implemented for the production of other types of nanostructures with controllable morphologies, such as other types of nanostructures that are generally elongated and having an aspect ratio of about 3 or greater. Further embodiments can be implemented for the production of micron-sized structures (or microstructures) with controllable morphologies, such as microstructures that are generally elongated and having an aspect ratio of about 3 or greater.

By way of overview, FIG. 1A shows a flowchart 100 for the production of nanowires, such as metal nanowires, according to an embodiment of this disclosure. The flowchart 100 includes a reaction phase 102 and a purification phase 104, which follows the reaction phase 102.

Referring to FIG. 1A, the reaction phase 102 is implemented to perform a solution synthesis reaction for the production of nanowires. In a solution synthesis reaction, nanowires can be grown from a reaction mixture including a set of solvents, a set of reagents including a material forming the nanowires, and a set of templating agents, where the set of solvents function as a reaction medium. As the reaction mixture is heated, a small amount of a metal-containing reagent transforms to form seeds, which can include non-nanowire-forming seeds and nanowire-forming seeds. For example, the templating agent may selectively or preferentially bind to a set of crystal facets of a nanowire-forming seed, thereby impeding or inhibiting growth on that set of crystal facets to which the templating agent is bound; further, because the templating agent has selectively or preferentially bound to a set of crystal facets, the crystal facets that have less templating agent bound to their surfaces will have preferentially higher growth. As another example, the templating agent may selectively or preferentially bind to a lateral crystal face of a nanowire-forming seed, thereby impeding growth in a radial direction, and selectively or preferentially allowing growth or lengthening in a longitudinal direction on crystal faces that are substantially perpendicular to the lateral crystal face. In the meanwhile, crystal faces of non-nanowire-forming seeds may be bound by the templating agent without or with little selectivity, and the seeds will not grow into nanowires. In an example of a solution synthesis reaction for the production of metal (e.g., silver) nanowires, a templating agent (e.g., poly (vinylpyrrolidone)) can selectively bind to the {1 0 0} face of a five-fold twinned seed structure, allowing growth on the {1 1 1} face in the [1 1 0] longitudinal direction. Other types of solution synthesis reactions are contemplated. More generally, the reaction phase 102 can be carried out in any suitable reaction medium for the production of nanowires, where the reaction medium can be a solid medium, a semi-solid medium, a fluid medium (e.g., a gas, a supercritical fluid, a solvent, a solvent mixture, a solution, or another liquid), or any combination thereof.

In the case of metal nanowires, examples of suitable metal-containing reagents include metal salts, such as silver nitrate (or $AgNO_3$), silver nitrite (or $AgNO_2$), silver acetate (or $(CH_3COO)_2Ag$), trifluorosilver acetate (or $(CF_3COO)_2Ag$), silver chlorate (or $AgClO_3$), silver perchlorate (or $AgClO_4$), silver fluoride (AgF), silver chloride (AgCl), silver trifluoromethanesulfonate (or $AgSO_3CF_3$), silver carbonate (or $Ag_2CO_3$), silver sulfate (or $Ag_2SO_4$), silver phosphate (or $Ag_3PO_4$), silver oxalate (or $Ag_2C_2O_4$), silver neodecanoate (or $AgOOCC_9H_{19}$), silver 2-ethylhexanoate (or $AgOOCCH(C_2H_5)C_4H_9$), silver ammoniacal compounds (or $Ag(NH_3)_2^+$), silver permanganate ($AgMnO_4$), gold perchlorate (or $Au(ClO_4)_3$), chloroauric acid (or $HAuCl_4$), palladium (II) chloride (or $PdCl_2$), palladium acetylacetonate (or $Pd(C_5H_7O_2)_2$), palladium nitrate (or $Pd(NO_3)_2$), potassium tetrachloropalladate(II) (or $K_2PdCl_4$), platinum (II) chloride (or $PtCl_2$), potassium hexachloroplatinate (or $K_2PtCl_6$), chloroplatinic acid (or $H_2PtCl_6$), platinum acetylacetonate (or $Pt(C_5H_7O_2)_2$), and any combination thereof. It has been previously contemplated that the use of a silver-containing reagent different from $AgNO_3$ would not yield nanowires, but would rather yield nanoparticles instead of nanowires. It is an unexpected finding of some embodiments of this disclosure that $AgClO_4$, among other silver-containing reagents different from $AgNO_3$ and with a solubility of at least or more than about 0.01 molar or at least or more than about 0.1 molar in a solvent, can be used in place of, or in combination with, $AgNO_3$ to attain silver nanowires with desired morphologies. Combinations of different silver-containing reagents can be used, where at least one of the silver-containing reagents is different from $AgNO_3$. For example, a first silver-containing reagent can be used in combination with a second silver-containing reagent that is different from the first silver-containing reagent and is different from $AgNO_3$, and a ratio (e.g., in terms of weight or moles) of an amount of silver introduced by the second silver-containing reagent and an amount of silver introduced by the first silver-containing reagent can be up to about 20:1, such as up to about 15:1, up to about 10:1, up to about 5:1, up to about 4.5:1, up to about 4:1, up to about 3.5:1, up to about 3:1, up to about 2.5:1, up to about 2:1, or up to about 1.5:1, and down to about 1:1, down to about 1:2, or less. In the case of silver-containing reagents different from $AgNO_3$, such as $AgClO_4$, it can be desirable to include a seed promoting agent that is a source of nitrate anions. Further details on seed promoting agents are explained below.

Additional examples of suitable metal-containing reagents include ionic liquids, such as silver-containing ionic liquids (e.g., a silver-containing cation as a center coordinated by one or more alkylamine ligands and a bis(trifluoromethylsulfonyl)imide (or $Tf_2N$) anion of the formula $[Ag(L)_2][Tf_2N]$, where L is a monodentate amine such as tert-butylamine, iso-butylamine, sec-butylamine, 2-ethylhexylamine, di(2-ethylhexyl)amine, or piperidine, or of the formula $[AgL'][Tf_2N]$, where L' is a bidendate amine such as ethylenediamine; and bis(N-alkylethylenediamine)silver(I) nitrates (alkyl=hexyl, octly, dodecyl, or hexadecyl) as well as analogues thereof with $PF_6$ anion in place of nitrate anion), other metal-containing ionic liquids, and any combination thereof. Metal-containing ionic liquids can be used in place of, or in combination with, metal salts to attain metal nanowires with desired morphologies.

Further examples of suitable metal-containing reagents include organometallic compounds, such as organosilver compounds (e.g., arylsilver, complexes of silver with ylides, perfluoroalkylsilver, alkenylsilver, and silver-N-heterocyclic carbene complexes), organometallic compounds of metals other than silver, and any combination thereof. Organometallic compounds can be used in place of, or in combination with, metal salts and metal-containing ionic liquids to attain metal nanowires with desired morphologies.

Combinations of metal-containing reagents including different metals can be used. For example, a silver-containing reagent can be used in combination with a metal-containing reagent in which the metal is different from silver.

Examples of suitable templating agents (also sometimes referred as capping agents) include molecules that each includes any one or more of a set of C atoms, a set of Si atoms, a set of O atoms, a set of N atoms, a set of Cl atoms, a set of P atoms, a set of Br atoms, and a set of S atoms, as well as inorganic, organic, and hybrid polymers, oligomers, or dimers formed of monomers that each includes any one or more of a set of C atoms, a set of Si atoms, a set of O atoms and a set of N atoms. Co-polymers also can be suitable templating agents, including block-copolymers, alternating-copolymers, bipolymers, terpolymers, quaterpolymers (and so on), and graft macromolecules (e.g., a PVP copolymer like poly(vinylpyrrolidone/vinylacetate) or a PVP copolymer with any other vinyl monomers). Molecules can include, for example, at least one functional group selected from a hydroxyl group (or —OH), a carboxylic group (or —COOH), an ester group (or —COOR), a thiol group (or —SH), a phosphine group (or —$R_1R_2R_3P$), a phosphine oxide group (or —$R_1R_2R_3P$=O), an amino group (or —$NH_2$), an ionic quaternary ammonium halide ion pair (e.g., $R_1R_2R_3N^+Cl^-$or $R_1R_2R_3N^+Br^-$), where R, $R_1$, $R_2$, and $R_3$ are independently selected from hydrogen and organic groups (e.g., an aliphatic or aromatic, unsubstituted or substituted group including from 1 to 20 carbon atoms). Specific examples of suitable molecules as templating agents include oleylamine, octadecylamine, dodecylamine, dopamine, oleic acid, lauric acid, hexadecane thiol, mercaptopropionic acid, mercaptohexanol, trioctylphosphine, trioctylphosphine oxide, dioctadecyldimethylammonium chloride, cetyltrimethylammonium bromide, other molecules having a molecular weight (or MW) of about 1,000 or less or about 500 or less, and combinations thereof. Monomers and polymers formed from such monomers can include, for example, at least one functional group selected from a hydroxyl group, a carbonyl group (or —CO—), an ether linkage (or —O—), an amino group, and functional groups of the formulas: —COO—, —O—CO—O—, —CO—O—CO—, —C—O—C—, —CONR—, —NR—CO—O—, —$NR_1$—CO—$NR_2$—, —CO—NR—CO—, —$SO_2NR$— and —$SO_2$—O—, wherein R, $R_1$, and $R_2$ are independently selected from hydrogen and organic groups (e.g., an aliphatic or aromatic, unsubstituted or substituted group including from 1 to 20 carbon atoms). Specific examples of suitable templating agents include poly(vinylpyrrolidone) (or PVP), poly(arylamide), poly(acrylic), poly(vinyl acetate), poly(vinyl alcohol), and any combination or copolymer thereof. Molecules and monomers, such as those listed above, can be used in place of, or in combination with, polymers as templating agents. For example, N-vinylpyrrolidone (or another monomer having a molecular weight (or MW) of about 1,000 or less or about 500 or less) can be used in place of, or in combination with, PVP as a templating agent. An inorganic analog of PVP or other polymers, molecules, and monomers noted above (e.g., with Si in place of carbon) also can be used in place of, or in combination with, PVP as a templating agent. Desired nanowire morphologies can be attained by combining or blending two or more populations of PVP (or another polymer) having respective and different number average or mass average MWs, such as by blending a first population of PVP with a first average MW and a second population of PVP with a second average MW different from the first average MW, in an about 1:1 ratio (e.g., by weight or moles) or another ratio greater than or less than 1:1. The first average MW can be greater than, or less than, the second average MW by a difference of at least about 1,000, such as at least about 2,000, at least about 3,000, at least about 4,000, at least about 5,000, at least about 6,000, at least about 7,000, at least about 8,000, at least about 9,000, at least about 10,000, at least about 15,000, at least about 50,000, at least about 100,000, at least about 150,000, at least about 200,000, at least about 1,500,000, or more. In other embodiments, the difference in average MW can be up to about 1,500,000, up to about 200,000, up to about 100,000, up to about 50,000, or up to about 10,000.

Examples of suitable solvents include polar and non-polar solvents that function as a reaction medium in which a metal-containing reagent, a templating agent, and any other reagents or additives are sufficiently soluble. In addition, suitable solvents also can function (without the addition of exogenous reducing agents) under certain conditions to reduce at least a portion, or all, of the metal-containing reagent to its corresponding elemental metal form with zero valence. In some cases, for instance with a solvent like glycerol or another alcohol, the solvent can be oxidized to form a glycolaldehyde, which is capable of reducing metal ions (e.g., silver ions). Such a glycolaldehyde is an example of an endogenous reducing agent, namely one that is formed in-situ in a reaction mixture as part of, or during the course of, a reaction, rather than added to the reaction mixture as a reagent in the case of an exogenous reducing agent. More generally, an endogenous reducing agent can include an oxidized derivative or a partially or fully reacted form of a reaction medium or any other reagent or additive added to a reaction mixture, such as an aldehyde or other oxidized derivative of an alcohol like glycerol. In addition, suitable solvents also can function as an exogenous reducing agent itself. It is also contemplated that a separate, exogenous reducing agent can be used with a solvent, such as a hydride (e.g., sodium borohydride (or $NaBH_4$)), hydrazine, an amine, or trisodium citrate. The addition of the exogenous reducing agent can apply for cases where the solvent itself can function as an exogenous reducing agent, for cases where an endogenous reducing agent can be formed in-situ from the solvent, and for cases where the solvent has little or no endogenous and exogenous reducing capability.

In some embodiments, a suitable solvent includes, for example, at least one double bond per molecule, at least one primary or secondary amine group per molecule, at least one aldehyde group per molecule, at least two hydroxyl groups per molecule, or any combination thereof. Examples of suitable solvents include polar and non-polar primary amines (e.g., diethylamine), alcohols (e.g., polyols), and any combination thereof. More specifically, solvents including at least two hydroxyl groups per molecule, namely polyols, can be, for example, diols or glycols (e.g., ethylene glycol, diethylene glycol, triethylene glycol, polyethylene glycol, 1,2-propylene glycol, 1,4-butanediol, 1,2-butanediol, 1,3-propylene glycol, germinal diol, octane-1,8-diol, p-menthane-3,8-diol, and 1,5-pentanediol), glycerin, glycerol, glucose, or any combination thereof. In some embodiments, a solvent having a higher viscosity can mitigate against the formation of agglomerates. For example, compared to ethylene glycol (viscosity of about 16.9 centipoise (or cP) at room temperature), glycerol has a higher viscosity (about 1,410 cP at room temperature), and can be selected as a solvent. Other solvents having a higher viscosity than ethylene glycol can be similarly selected, such as having a viscosity of at least about 50 cP, at least about 100 cP, at least about 200 cP, at least about 300 cP, at least about 400 cP, at least about 500 cP, at least about 600 cP, at least about 700 cP, at least about 800 cP, at least about 900 cP, at least about 1,000 cP, at least about 1,100 cP, at least about 1,200 cP, at least about 1,300 cP, or at least about 1,400 cP, and up to about 2,000 or more at room temperature. In other embodiments, a solvent with a lower viscosity also can be used, particularly when the solvent is not an alcohol or when the alcohol is not ethylene glycol. Similarly, the viscosity of a reaction mixture can have an effect on the mitigation of agglomerate formation; for example, higher levels of templating agent can enhance the viscosity in the reaction mixture, such as in the case of a solvent of a lower viscosity like water. In some embodiments, a solvent having more than two hydroxyl groups per molecule can provide greater reducing strength or capability, which allows reactions to be carried out at lower temperatures to provide benefits in terms of attaining desired morphologies as well as ease and lower cost of manufacturing. For example, low temperature synthesis of nanowires with desired morphologies can be attained using glycerol as a solvent, among other polyols having at least three hydroxyl groups per molecule, at least four hydroxyl groups per molecule, or at least five hydroxyl groups per molecule, and up to ten hydroxyl groups per molecule or more. Similar benefits can be attained by using solvents including more than one primary or secondary amine group per molecule, or more than one aldehyde group per molecule. Water also can be a suitable solvent.

Additives can be included to increase yield and promote desired nanowire morphology as well as uniformity in desired nanowire morphology. Examples of suitable additives include seed promoting agents (or SPAs), which provide control over seeds in a reaction. SPAs can function according to any one or any combination of two or more of the following mechanisms: 1) SPAs can promote formation of seeds having desired structures that will grow into desired nanostructures, such as nanowires, 2) SPAs can promote formation of precursors or intermediates that will transform into or otherwise lead to seeds having desired structures, which, in turn, will grow into desired nanostructures, such as nanowires, 3) SPAs can promote an increase in a ratio (e.g., by number, weight, or moles) of seeds having desired structures over seeds having other structures, such as nanowire-forming seeds versus non-nanowire-forming seeds, and 4) SPAs can catalyze or otherwise expedite a reaction to grow seeds at a faster rate into nanostructures, including desired nanostructures.

Specific examples of SPAs that can promote formation of nanowire-forming seeds or intermediates of nanowire-forming seeds include sources of halide anions, including halide salts such as alkali metal halides (e.g., sodium chloride (or NaCl), potassium chloride (or KCl), sodium bromide (or NaBr), potassium bromide (or KBr), and other chlorides, bromides, iodides, and fluorides of alkali metals), transition metal halides (e.g., platinum chloride (or $PtCl_2$), palladium chloride (or $PdCl_2$), manganese chloride (or $MnCl_2$), and other chlorides, bromides, iodides, and fluorides of transition metals), quaternary ammonium halides (e.g., tetrabutylammonium chloride (or TBAC), dioctadecyldimethyl ammonium chloride (or DDAC), didodecyldimethylammonium bromide (or DDAB), cetyltrimethylammonium chloride (or CTAC), and cetyltrimethylammonium bromide (or CTAB)), and any combination thereof.

Specific examples of SPAs that can increase a ratio between nanowire-forming seeds versus non-nanowire-forming seeds include iron salts, such as iron nitrate, iron acetate, iron chloride, and iron acetylacetonate in either the +2 or +3 valence, and sources of nitrate or nitrite anions, including nitrate salts or nitrite salts such as alkali metal nitrates (e.g., sodium nitrate (or $NaNO_3$), potassium nitrate (or $KNO_3$), and other nitrates of alkali metals), ammonium nitrate (or $NH_4NO_3$), alkali metal nitrites (e.g., sodium nitrite (or $NaNO_2$), potassium nitrite (or $KNO_2$), and other nitrites of alkali metals), ammonium nitrite (or $NH_4NO_2$), and other sources of nitrate or nitrite anions (e.g., nitric acid (or $HNO_3$) and nitrous acid (or $HNO_2$)), as well as any combination thereof. A SPA that is a source of nitrate or nitrite anions also can be a source of a metal, such as silver.

Specific examples of SPAs that can catalyze or expedite growth of nanowire-forming seeds into nanowires include transition metal salts, such as copper salts (e.g., copper in either the +1 or +2 valence, such as copper (I) chloride (or CuCl), copper (II) chloride (or $CuCl_2$), copper (II) nitrate (or $Cu(NO_3)_2$), and copper (II) sulfate (or $CuSO_4$)), manganese salts (e.g., manganese chloride (or $MnCl_2$)), iron salts (e.g., iron chloride (or $FeCl_3$) and iron nitrate (or $Fe(NO_3)_3$)), zinc salts (e.g., zinc chloride (or $ZnCl_2$)), cobalt salts (e.g., cobalt chloride (or $CoCl_2$)), and nickel salts (e.g., nickel chloride (or $NiCl_2$)), salts of p-block metals, such as bismuth salts (e.g., bismuth nitrate (or $Bi(NO_3)_3$)), tin salts (e.g., tin chloride (or $SnCl_2$)), and aluminum salts (e.g., aluminum chloride (or $AlCl_3$)), alkali earth metal salts (e.g., magnesium chloride (or $MgCl_2$)), alkali metal salts (e.g., lithium chloride (or LiCl)), and other halides, nitrates, and sulfates of transition metals, alkali earth metals, alkali metals, and p-block metals, as well as any combination thereof.

Further examples of SPAs include microstructures and nanostructures, which include surfaces to which nanowire-forming seeds are bound. For example, SPAs can include microparticles or nanoparticles (e.g., AgCl microparticles or nanoparticles) including surfaces decorated with nanowire-forming seeds (e.g., 5-fold twinned pentagonal nanowire-forming seeds). The microparticles or nanoparticles can be exogenously added, can be formed in-situ or endogenously from an exogenously added SPA or other reagent, or both.

At the reaction phase 102 of FIG. 1A, various reagents are introduced, combined, and energized (e.g., heated) to produce an unpurified product, including nanowires. The reagents can be combined as solutions or in a solid or semi-solid form, such as a granular form, a paste, a slurry, a quasi-solid, a powdered form, or as a mixture of a reagent in a fluid that does not dissolve that reagent. As used herein, a solution can refer to a homogeneous or heterogeneous mixture including a set of solvents and a set of reagents dispersed or suspended in the set of solvents. A solution also can refer to a homogenous material, such as an ionic liquid or a mixture of an ionic liquid with another material or materials. In some instances, a reagent may not fully or substantially dissolve in a solvent such that a solution can be characterized as a dispersion or a suspension of the reagent in the solvent. Accordingly, as used herein, a solution can encompass a suspension as well as a mixture where a reagent is fully or substantially dissolved. In general, the order of introduction of reagents can be varied as the reagents can be combined in various ways. For example, a metal salt can be incorporated in a solution including the metal salt in a first portion of a solvent, and a templating agent can be incorporated in another solution including the templating agent in a second portion of the solvent. The metal salt solution and the templating agent solution, in some embodiments, can be simultaneously or sequentially added to a third portion of the solvent. This addition can be drop-wise or portion-wise. As another example, the metal salt solution and the templating agent solution can be combined together, and a resulting mixture can be added to the third portion of the solvent. As noted above, either, or both, of the metal salt and the templating agent can be combined in a solid or semi-solid form. For example, a metal salt can be incorporated in a solution including the metal salt in a solvent, and a templating agent can be added in a solid form to the metal salt solution. As another example, a templating agent can be incorporated in a solution including the templating agent in a solvent, and a metal salt can be added in a solid form to the templating agent solution. As a further example, a metal salt and a templating agent can be introduced into a reaction vessel, both in a solid or a semi-solid form, and a solvent is subsequently introduced into the reaction vessel. Additives, such as SPAs, also be combined as solutions or in a solid or semi-solid form. Surprisingly, despite the perceived non-uniformities and inconsistencies that could result from the addition of heterogeneous forms of reagents to reaction mixtures, through the processes disclosed herein, adding certain reagents in a solid or semi-solid form has resulted in a high quality and a high level of consistency. Additionally, rather than adding reagents in a solid or semi-solid form to a liquid, in other embodiments, solid or semi-solid forms of reagents can be mixed to form a solid or semi-solid reagent mixture (e.g., of PVP powder and $AgNO_3$ powder); subsequently, a solvent can be added to the solid or semi-solid mixture. For example, in powder form, the PVP can be considered a mixture of PVP and a fluid, wherein the fluid is air.

Nanowires having long lengths and small diameters are desirable for certain applications, such as transparent conductors (or transparent conductive electrodes). The long lengths of the nanowires promote connectivity between adjacent nanowires and improved electrical conductance characteristics, such as reduced sheet resistance values. In conjunction, the small diameters of the nanowires promote improved optical characteristics, such as in terms of reduced haze values. Nanowires with long lengths and small diameters that are desirable for transparent conductor applications can have aspect ratios of at least or on average about 50, at least or on average about 100, at least or on average about 200, at least or on average about 500, at least or on average about 1,000, at least or on average about 1,500, at least or on average about 2,000, or at least or on average about 3,000, and can have diameters no greater than or on average about 60 nm, no greater than or on average about 40 nm, no greater than or on average about 35 nm, no greater than or on average about 33 nm, no greater than or on average about 31 nm, no greater than or on average about 30 nm, no greater than or on average about 29 nm, no greater than or on average about 28 nm, no greater than or on average about 27 nm, no greater than or on average about 26 nm, no greater than or on average about 25 nm, no greater than or on average about 24 nm, no greater than or on average about 23 nm, no greater than or on average about 22 nm, no greater than or on average about 21 nm, no greater than or on average about 20 nm, no greater than or on average about 19 nm, no greater than or on average about 18 nm, no greater than or on average about 17 nm, no greater than or on average about 16 nm, no greater than or on average about 15 nm, no greater than or on average about 14 nm, no greater than or on average about 13 nm, no greater than or on average about 12 nm, no greater than or on average about 11 nm, no greater than or on average about 10 nm, no greater than or on average about 9 nm, no greater than or on average about 8 nm, no greater than or on average about 7 nm, no greater than or on average about 6 nm, or no greater than or on average about 5 nm.

To produce long nanowires having small diameters, the reaction phase 102 can be implemented as a single-staged reaction or a multi-staged reaction including at least two stages. A single-staged reaction indicates that a metal-containing reagent is added in a single stage, while, in a multi-staged reaction, one or more metal-containing reagents are added in multiple stages. Generally, to produce long nanowires, a reaction can initially form nanowire-forming seeds using a small amount of a metal-containing reagent, and then subsequently allow one-dimensional or axial growth of the nanowire-forming seeds by consuming a remaining, larger amount of the metal-containing reagent. For example, a single-staged reaction can be carried out under reaction conditions so that a reduced or minimal amount of the metal-containing reagent decomposes into nanowire-forming seeds, and then the nanowire-forming seeds can consume a remaining, larger amount of the metal-containing reagent to grow into long nanowires. In some implementations, a ratio (e.g., in terms of weight or moles and expressed as a percentage) of an amount of a metal nucleating into seeds (in elemental metal form and including either, or both, nanowire-forming seeds and non-nanowire-forming seeds) and a total amount of the metal introduced during all stages of the reaction phase 102 can be in a range up to about 90%, such as up to about 75%, up to about 50%, up to about 25%, up to about 20%, up to about 15%, up to about 10%, up to about 5%, up to about 2%, up to about 1.8%, up to about 1.5%, up to about 1%, up to about 0.5%, or up to about 0.1%, and down to about 0.03%, down to about 0.01%, down to about 0.001%, or less.

In some embodiments, the reaction phase 102 of FIG. 1A can be carried out to produce metal nanowires by combining and heating: (a) at least one solvent; (b) at least one metal-containing reagent; (c) at least one templating agent; and (d) at least one SPA, and under reaction conditions that are controlled or optimized to produce desirable nanowire morphologies at high yields.

In other embodiments, the reaction phase 102 of FIG. 1A can be carried out to produce metal nanowires by energizing: (a) at least one metal-containing reagent; (b) at least one templating agent; (c) at least one reducing agent; and (d) at least one SPA in a reaction medium and under reaction conditions that are controlled or optimized to produce desirable nanowire morphologies at high yields. The reducing agent can include a reducing agent that is formed in-situ (e.g., as an oxidized derivative of the reaction medium), a reducing agent that is exogenously added, or both. At least a portion of the reagents (a) through (d) and the reaction medium can be combined in a reaction mixture substantially concurrently with energizing of the reaction mixture.

In other embodiments, the reaction phase 102 of FIG. 1A can be carried out by energizing, through heating or other energizing mechanism: (a) at least one metal-containing reagent; (b) at least one templating agent; (c) at least one reducing agent; and (d) at least one SPA in a reaction medium to produce nanowire-forming seeds, followed by continued energizing of the seeds and at least a portion of the reagents (a) through (d) in the reaction medium, through the same or a different energizing mechanism, to produce desirable nanowire morphologies at high yields. The reducing agent can include a reducing agent that is formed in-situ (e.g., as an oxidized derivative of the reaction medium), a reducing agent that is exogenously added, or both.

Desirable nanowire morphologies can be attained by selecting or controlling any one or any combination of two or more of the following reaction conditions within an expanded reaction parameter matrix:

(1) A total amount of a metal (e.g., silver) introduced via one or more metal-containing reagents during all stages of the reaction phase 102 can result in an overall concentration of the metal in a reaction mixture (including both ions and in elemental metal form) in a range of up to about 0.2 molar, such as up to about 0.18 molar, up to about 0.16 molar, up to about 0.14 molar, up to about 0.12 molar, up to about 0.11 molar, or up to about 0.1 molar, and down to about 0.04 molar, down to about 0.02 molar, or less. Surprisingly, nanowires having long lengths can be attained even with a relatively low overall concentration of the metal in the reaction mixture of less than about 0.1 molar, such as up to about 0.099 molar, up to about 0.098 molar, up to about 0.097 molar, up to about 0.096 molar, up to about 0.095 molar, up to about 0.09 molar, up to about 0.085 molar, or up to about 0.08 molar, and down to about 0.04 molar, down to about 0.02 molar, or less. A concentration of the metal in the reaction mixture can be expressed in terms of moles of the metal added to the reaction mixture divided by an overall volume of the reaction mixture.

(2) A concentration of each templating agent (e.g., PVP) in a reaction mixture can be in a range of up to about 1 molar, such as up to about 0.9 molar, up to about 0.8 molar, up to about 0.7 molar, up to about 0.6 molar, up to about 0.5 molar, up to about 0.4 molar, up to about 0.35 molar, up to about 0.3 molar, up to about 0.25 molar, or up to about 0.2 molar, and down to about 0.1 molar, down to about 0.05 molar, or less. Surprisingly, nanowires having small diameters and at least moderately long lengths can be attained even with a relatively high concentration of the templating agent in the reaction mixture of greater than about 1 molar, such as up to about 20 molar, up to about 15 molar, up to about 10 molar, up to about 5 molar, up to about 4.2 molar, up to about 4 molar, up to about 3.5 molar, up to about 3 molar, up to about 2.5 molar, up to about 2 molar, or up to about 1.5 molar. A concentration of the templating agent in the reaction mixture can be expressed in terms of moles of the templating agent added to the reaction mixture divided by an overall volume of the reaction mixture, and, in the case of PVP or another polymer as the templating agent, moles of the templating agent can be expressed in terms of moles of repeating or monomeric units included in the polymer.

(3) For each SPA that can promote formation of nanowire-forming seeds or intermediates of nanowire-forming seeds (e.g., NaCl or manganese chloride), a concentration of SPA anions (e.g., halide anions such as $Cl^-$) in a reaction mixture can be in a range of up to about 5 molar, such as up to about 1 molar, up to about 0.5 molar, up to about 0.25 molar, up to about 0.1 molar, up to about 75 millimolar (or mmolar), up to about 50 mmolar, up to about 25 mmolar, up to about 20 millimolar, up to about 15 mmolar, up to about 10 mmolar, up to about 9 mmolar, up to about 8 mmolar, up to about 7 mmolar, up to about 6 mmolar, up to about 5 mmolar, up to about 4.5 mmolar, up to about 4 mmolar, up to about 3.5 mmolar, up to about 3 mmolar, or up to about 2.5 mmolar, and down to about 0.4 mmolar, down to about 0.1 mmolar, or less. A concentration of the SPA anions in the reaction mixture can be expressed in terms of moles of the anions added to the reaction mixture via the SPA (plus via one or more metal-containing reagents if the anions are included in the metal-containing reagents) divided by an overall volume of the reaction mixture.

(4) For each SPA that can increase a ratio between nanowire-forming seeds versus non-nanowire-forming seeds (e.g., $NaNO_3$), a concentration of SPA anions (e.g., nitrate anions) in a reaction mixture can be in a range of up to about 20 molar, such as up to about 15 molar, up to about 10 molar, up to about 5 molar, up to about 3 molar, up to about 2 molar, up to about 1 molar, up to about 0.9 molar, up to about 0.8 molar, up to about 0.7 molar, up to about 0.6 molar, up to about 0.5 molar, up to about 0.4 molar, up to about 0.35 molar, up to about 0.3 molar, up to about 0.25 molar, or up to about 0.2 molar, and down to about 0.1 molar, down to about 0.05 molar, down to about 0.04 molar, down to about 0.03 molar, down to about 0.02 molar, down to about 0.005 molar, down to about 0.001 molar, or less. A concentration of the SPA anions in the reaction mixture can be expressed in terms of moles of the anions added to the reaction mixture via the SPA (plus via one or more metal-containing reagents if the anions are included in the metal-containing reagents) divided by an overall volume of the reaction mixture.

(5) A ratio by moles or concentration of each templating agent (e.g., PVP) to a metal (e.g., silver) in a reaction mixture can be in a range of up to about 20, such as up to about 15, up to about 12, up to about 11, up to about 10, up to about 9.5, up to about 8, up to about 7.5, up to about 7, up to about 6.5, up to about 6, up to about 5.5, up to about 5, up to about 4.5, up to about 4, up to about 3.5, up to about 3, up to about 2.5, up to about 2, or up to about 1.5, and down to about 1.3, down to about 1.2, or less. For example, the ratio of the templating agent to the metal can be in the range of about 2.5 to about 5, can be greater than about 5 and up to about 10, or can be greater than about 2. Surprising, nanowires having small diameters and at least moderately long lengths can be attained even with a relatively high ratio of the templating agent to the metal of greater than about 10, such as greater than about 11, greater than about 12, greater than about 13, greater than about 14, or greater than about 15, and up to about 21, up to about 25, or more.

(6) For each SPA that can promote formation of nanowire-forming seeds or intermediates of nanowire-forming seeds (e.g., manganese chloride), a ratio by moles or concentration of SPA anions (e.g., halide anions such as $Cl^-$) to a metal (e.g., silver) in a reaction mixture can be in a range of up to about 10, such as less than about 10, up to about 5, up to about 3, up to about 2.5, up to about 2, up to about 1.5, up to about 1, up to about 0.5, up to about 0.25, up to about 0.1, up to about 0.05, up to about 0.01, or up to about 0.005, and down to about 0.002, down to about 0.001, or less. For example, the ratio by moles or concentration of the SPA anions (e.g., halide anions such as $Cl^-$) to the metal (e.g., silver) in the reaction mixture can be in the range of about 0.001 to about 10.

(7) For each SPA that can increase a ratio between nanowire-forming seeds versus non-nanowire-forming seeds (e.g., $NaNO_3$), a ratio by moles or concentration of SPA anions (e.g., nitrate anions) to a metal (e.g., silver) in a reaction mixture can be a non-zero value different from 1, such as a value greater than 1 (e.g., at least 1.01, at least 1.02, at least 1.03, at least 1.04, at least 1.05, or at least 1.1) and up to about 20, up to about 15, up to about 10, up to about 9, up to about 8, up to about 7, up to about 6, up to about 5, up to about 4, up to about 3, up to about 2.5, up to about 2, up to about 1.8, or up to about 1.6, and down to about 1.2, down to about 1.1, or less (but still greater than 1). It is also contemplated that the ratio by moles or concentration of the SPA anions (e.g., nitrate anions) to the metal (e.g., silver) in the reaction mixture can be about 1 or can be a non-zero value less than 1 (e.g., no greater than 0.99, no greater than 0.98, no greater than 0.97, no greater than 0.96, or no greater than 0.95), such as down to about 0.9, down to about 0.7, down to about 0.5, down to about 0.3, down to about 0.1, down to about 0.01, or less. For example, the ratio by moles or concentration of the SPA anions (e.g., nitrate anions) to the metal (e.g., silver) in the reaction mixture can be in the range of about 0.1 to about 20.

(8) For each SPA that can promote formation of nanowire-forming seeds or intermediates of nanowire-forming seeds (e.g., manganese chloride), a ratio by moles or concentration of each templating agent (e.g., PVP) to SPA anions (e.g., halide anions such as $Cl^-$) in a reaction mixture can be in a range of up to about 400, such as up to about 350, up to about 300, up to about 250, up to about 200, up to about 150, up to about 100, up to about 90, up to about 80, up to about 70, up to about 60, up to about 50, or up to about 45, and down to about 30, down to about 20, down to about 10, or less.

(9) For each first SPA that can promote formation of nanowire-forming seeds or intermediates of nanowire-forming seeds (e.g., manganese chloride), and each second SPA that can increase a ratio between nanowire-forming seeds versus non-nanowire-forming seeds (e.g., $NaNO_3$), a ratio by moles or concentration of second SPA anions (e.g., nitrate anions) to first SPA anions (e.g., halide anions such as $Cl^-$) in a reaction mixture can be in a range of up to about 1,000, such as up to about 500, up to about 100, up to about 50, up to about 40, up to about 30, up to about 20, or up to about 10, down to about 5, down to about 1, or less.

(10) It has been previously contemplated that a high reaction temperature, such as about 160° C. or higher, should be selected to produce nanowires. It is an unexpected finding of some embodiments of this disclosure that lower reaction temperatures can produce desired nanowire morphologies at high yields, in addition to providing benefits in terms of ease and lower cost of manufacturing. Specifically, long nanowires having small diameters can be attained at a high yield with a reaction temperature (maintained for at least a portion of a reaction duration, such as at least about 50%, at least about 60%, at least about 70%, at least about 80%, at least about 90%, or substantially throughout the entire reaction duration) in a range of less than about 100° C., such as up to about 99° C., up to about 98° C., up to about 97° C., up to about 96° C., up to about 95° C., up to about 90° C., up to about 85° C., up to about 80° C., or up to about 75° C., and down to about 60° C., down to about 50° C., down to about 40° C., down to about 30° C., or less. For example, the reaction temperature for at least a portion of the reaction duration can be in the range of about 80° C. to about 95° C., about 60° C. to about 90° C., about 50° C. to about 75° C., or about 30° C. to about 50° C., or the reaction temperature, when averaged over the reaction duration, can be in the range of about 80° C. to about 95° C., about 60° C. to about 90° C., about 50° C. to about 75° C., or about 30° C. to about 50° C.

(11) In conjunction with a high reaction temperature, it has been previously contemplated that a short reaction duration, such as about 20 min or about 25 min, should be selected to produce nanowires. By contrast for some embodiments of this disclosure, a lower reaction temperature can be maintained for a prolonged reaction duration (including both a seeding phase and a growth phase) in a range of at least about 1 hr, such as at least about 2 hr, at least about 4 hr, at least about 6 hr, at least about 12 hr, at least about 18 hr, at least about 24 hr, at least about 30 hr, at least about 36 hr, or at least about 42 hr, and up to about 48 hr, up to about 96 hr, or more. As noted earlier, nanowires of some embodiments can be formed without the addition of exogenous reducing agents. However, it is contemplated that adding an exogenous reducing agent can allow a reaction to proceed quickly, while allowing a low reaction temperature and a short reaction duration at the low reaction temperature.

Combinations of two or more of the above-specified reaction conditions can be selected for the reaction phase 102 of FIG. 1A to yield unexpected synergistic benefits. For example, long nanowires having small diameters can be attained at a high yield by controlling a combination of reaction conditions including a low silver concentration (e.g., less than about 0.1 molar), a lower PVP:silver molar ratio (e.g., up to about 2.5 or up to about 2), a lower PVP:$Cl^-$ molar ratio (e.g., up to about 50 or up to about 45), and a reaction temperature less than about 100° C. As another example, long nanowires having small diameters can be attained at a high yield by controlling a combination of reaction conditions including a low silver concentration (e.g., less than about 0.1 molar), a higher PVP:silver molar ratio (e.g., about 2.5 to about 5, greater than about 5 to about 10, or greater than about 10), a lower $NO_3^-$:$Cl^-$ molar ratio (e.g., up to about 20 or up to about 10), and a reaction temperature less than about 100° C. As a further example, long nanowires having small diameters can be attained at a high yield by controlling a combination of reaction conditions including a higher $NO_3^-$:silver molar ratio (e.g., greater than 1) and a low silver concentration (e.g., less than about 0.1 molar).

Figure 1B:
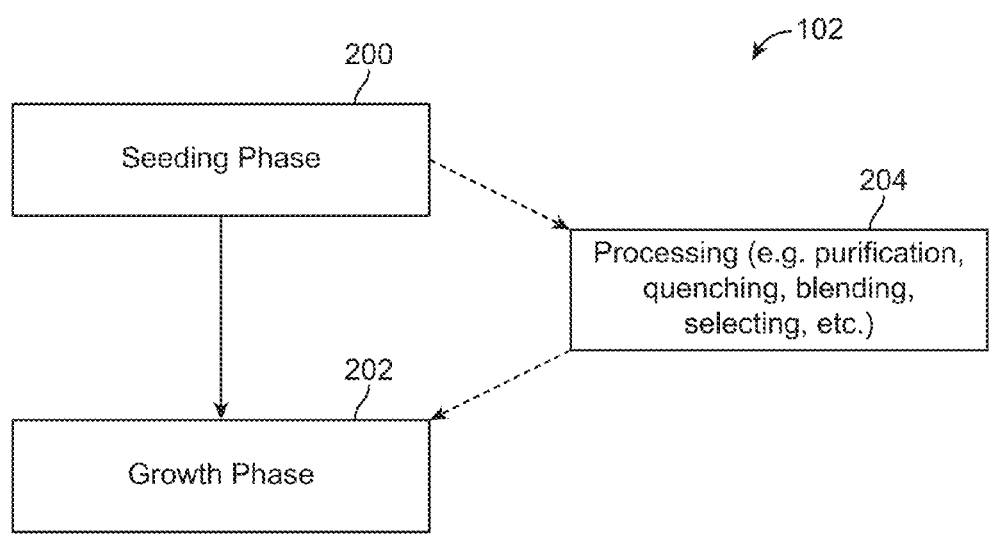
FIG. 1B shows a flowchart for a reaction including a seeding phase and a growth phase, according to an embodiment of this disclosure.

In some embodiments, the reaction phase 102 of FIG. 1A can be carried out as shown in FIG. 1B, and can include a seeding phase 200, which is carried out or maintained for at least a portion of a seeding duration at a seeding temperature, followed by a growth phase 202, which is carried out or maintained for at least a portion of a growth duration at a growth temperature. In the case of a single-staged reaction, both the seeding phase 200 and the growth phase 202 can be encompassed within the single-staged reaction. In the case of a multi-staged reaction, the seeding phase 200 can be encompassed within a portion of a first stage, and the growth phase 202 can be encompassed within a remaining portion of the first stage as well as a second stage (plus any one or more subsequent stages). In some embodiments, a ratio (e.g., in terms of weight or moles and expressed as a percentage) of an amount of a metal nucleating into seeds (in elemental metal form and including either, or both, nanowire-forming seeds and non-nanowire-forming seeds) and a total amount of the metal introduced during the seeding phase 200 can be in a range of up to or at least about 99.9%, such as up to or at least about 99%, up to or at least about 98%, up to or at least about 97%, up to or at least about 95%, up to or at least about 90%, up to or at least about 75%, up to or at least about 50%, up to or at least about 25%, up to or at least about 20%, up to or at least about 15%, up to or at least about 10%, up to or at least about 5%, up to or at least about 2%, up to or at least about 1.8%, up to or at least about 1.5%, up to or at least about 1%, up to or at least about 0.5%, or up to or at least about 0.1%, and down to about 0.03%, down to about 0.01%, down to about 0.001%, or less.

In such embodiments, the reaction phase 102 can be carried out by energizing, in the seeding phase 200: (a) at least one metal-containing reagent; (b) at least one templating agent; (c) at least one reducing agent; and (d) at least one SPA in a reaction medium to produce nanowire-forming seeds, followed by, in the growth phase 202, continued energizing of the seeds and at least a portion of the reagents (a) through (d) in the reaction medium to produce desirable nanowire morphologies at high yields. The reducing agent can include a reducing agent that is formed in-situ (e.g., as an oxidized derivative of the reaction medium), a reducing agent that is exogenously added, or both. It is contemplated that additional reagents can be added to the reaction medium in the growth phase 202, such as an additional amount of the same or a different metal-containing reagent in the case of a multi-staged reaction. It is also contemplated that an additional amount of the same or a different templating agent can be added to the reaction medium in the growth phase 202. It is also contemplated that an additional amount of the same or a different reducing agent can be formed in-situ or can be added to the reaction medium in the growth phase 202. It is also contemplated that an additional amount of the same or a different SPA can be added to the reaction medium in the growth phase 202.

In some embodiments, the seeding phase 200 and the growth phase 202 can be viewed as successive or interspersed portions of a single, substantially continuous reaction. In other embodiments, the seeding phase 200 and the growth phase 202 can be viewed as separate reactions, with the former reaction carried out for the production of nanowire-forming seeds, and the latter reaction carried out for the production of nanowires from the nanowire-forming seeds. In such embodiments, a reaction mixture in the seeding phase 200 optionally can be quenched or otherwise cooled to a desired temperature in a processing phase 204, such as about room temperature, and optionally can be subjected to purification or other processing in the phase 204 to yield a purified product including nanowire-forming seeds. The nanowire-forming seeds can be exogenously added to a reaction medium in the growth phase 202, in place of, or in combination with, in-situ formation of nanowire-forming seeds in the reaction medium. Aspects of quenching and purification can be carried out as further explained below in the context of nanowires.

For example, the seeding phase 200 can be carried out by energizing: (a) at least one metal-containing reagent; (b) at least one templating agent; (c) at least one reducing agent; and (d) at least one SPA in a reaction medium that is maintained at a seeding temperature for at least a portion of a seeding duration, thereby producing nanowire-forming seeds. The reducing agent can include a reducing agent that is formed in-situ (e.g., as an oxidized derivative of the reaction medium), a reducing agent that is exogenously added, or both.

As another example, the growth phase 202 can be carried out by energizing: (a) at least one metal-containing reagent; (b) at least one templating agent; (c) at least one reducing agent; (d) at least one nanowire-forming seed; and (e) optionally at least one SPA in a reaction medium that is maintained at a growth temperature for at least a portion of a growth duration, thereby producing nanowires. The reducing agent can include a reducing agent that is formed in-situ (e.g., as an oxidized derivative of the reaction medium), a reducing agent that is exogenously added, or both. The nanowire-forming seeds can include seeds that are formed in-situ, seeds that are exogenously added, or both.

In general, a seeding temperature and a growth temperature can be the same or different and can be independently selected from the above-specified ranges of the reaction temperature, although benefits in terms of small nanowire diameters and high yields can be attained in some embodiments by selecting a higher growth temperature compared to a seeding temperature. For example, the seeding temperature can be maintained for at least a portion of a seeding duration (such as at least about 50%, at least about 60%, at least about 70%, at least about 80%, at least about 90%, or substantially throughout the entire seeding duration) in a range of less than about 120° C., less than about 110° C., or less than about 100° C., while the growth temperature can be maintained for at least a portion of a growth duration (such as at least about 50%, at least about 60%, at least about 70%, at least about 80%, at least about 90%, or substantially throughout the entire growth duration) in a range of less than about 150° C., less than about 140° C., less than about 130° C., less than about 120° C., less than about 110° C., or less than about 100° C. As another example, the seeding temperature for at least a portion of the seeding duration can be in the range of about 80° C. to about 95° C., about 60° C. to about 90° C., about 50° C. to about 75° C., about 30° C. to about 50° C., or about or less than about 85° C., while the growth temperature for at least a portion of the growth duration can be higher with a temperature difference of at least or greater than about 5° C., at least about 10° C., at least about 15° C., at least about 20° C., at least about 25° C., or at least about 30° C., and up to about 40° C., up to about 50° C., or more, such as where the growth temperature is about or less than about 105° C. As another example, the seeding temperature, when averaged over the seeding duration, can be in the range of about 80° C. to about 95° C., about 60° C. to about 90° C., about 50° C. to about 75° C., about 30° C. to about 50° C., or about or less than about 85° C., while the growth temperature, when averaged over the growth duration, can be higher with a temperature difference of at least or greater than about 5° C., at least about 10° C., at least about 15° C., at least about 20° C., at least about 25° C., or at least about 30° C., and up to about 40° C., up to about 50° C., or more, such as where the growth temperature is about or less than about 105° C. It is contemplated that the seeding temperature can be in a range of less than about 100° C., while the growth temperature can be in a range of at least or greater than about 100° C.

In general, a seeding duration and a growth duration can be the same or different and can be independently selected from the above-specified ranges of the reaction duration, although benefits in terms of desired nanowire morphologies can be attained in some embodiments by selecting a longer growth duration compared to a seeding duration. For example, the seeding duration can be in a range of up to about 48 hr, such as up to about 42 hr, up to about 36 hr, up to about 30 hr, up to about 24 hr, up to about 18 hr, up to about 12 hr, or up to about 6 hr, and down to about 1 hr or less, while the growth duration can be at least about 1 hr and can be at least about 1.1× the seeding duration, such as at least about 1.2×, at least about 1.3×, at least about 1.4×, at least about 1.5×, at least about 1.6×, at least about 1.7×, at least about 1.8×, at least about 1.9×, at least about 2×, or at least about 2.5×, and up to about 3×, up to about 4×, or more.

Figure 2A:
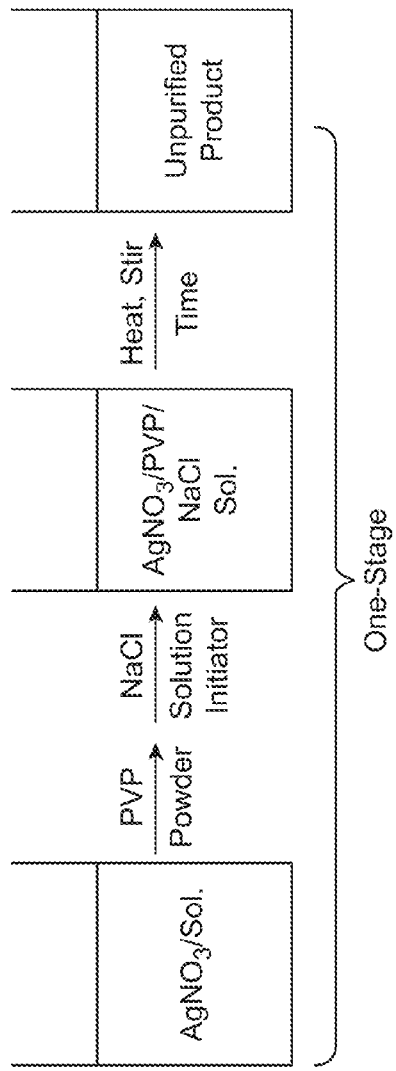
FIG. 2A shows an implementation of a single-staged reaction for the production of silver nanowires, according to an embodiment of this disclosure.

FIG. 2A shows an implementation of a single-staged reaction for the production of silver nanowires. First, a solution of $AgNO_3$ is provided, such as by dispersing or dissolving $AgNO_3$ in glycerol or another suitable solvent. Another silver-containing reagent or a combination of silver-containing reagents can be used in place of, or in combination with, $AgNO_3$. Next, PVP in a solid or semi-solid form, such as a powder, granular, or paste form, is introduced into the $AgNO_3$ solution as a templating agent and dispersed or dissolved. Another templating agent or a combination of templating agents can be used in place of, or in combination with, PVP. It is also contemplated that a PVP solution can be provided, and $AgNO_3$ in a solution or a solid or semi-solid form can be introduced into the PVP solution. Next, a solution of NaCl in the same or a different solvent is introduced as a SPA to initiate a reaction. Another SPA or a combination of SPAs can be used in place of, or in combination with, NaCl. A ratio by moles or concentration of $Cl^-$ to silver (including both ionic and elemental metal forms) in the reaction can be in a range of up to about 10, such as up to about 5, up to about 3, up to about 2.5, up to about 2, up to about 1.5, up to about 1, up to about 0.5, up to about 0.25, up to about 0.1, up to about 0.05, up to about 0.01, or up to about 0.005, and down to about 0.002, down to about 0.001, or less. The reaction is heated to a certain reaction temperature and over a certain reaction duration to yield an unpurified product including silver nanowires.

Figure 2B:
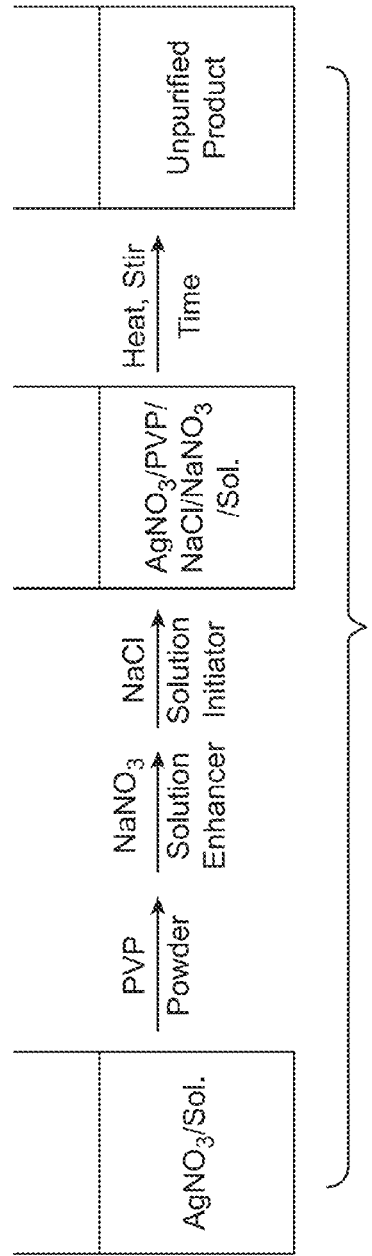
FIG. 2B shows another implementation of a single-staged reaction for the production of silver nanowires, according to an embodiment of this disclosure.

FIG. 2B shows another implementation of a single-staged reaction where a combination of different SPAs (here, NaCl and $NaNO_3$) is incorporated for the production of silver nanowires. First, a solution of $AgNO_3$ is provided, such as by dispersing or dissolving $AgNO_3$ in glycerol or another suitable solvent. Another silver-containing reagent or a combination of silver-containing reagents can be used in place of, or in combination with, $AgNO_3$. Next, PVP in a solid or semi-solid form, such as a powder, granular, or paste form, is introduced into the $AgNO_3$ solution as a templating agent and dispersed or dissolved. Another templating agent or a combination of templating agents can be used in place of, or in combination with, PVP. It is also contemplated that a PVP solution can be provided, and $AgNO_3$ in a solution or a solid or semi-solid form can be introduced into the PVP solution. Next, a solution of NaCl and $NaNO_3$ in the same or a different solvent is introduced as SPAs to initiate and enhance a reaction. Other SPAs can be used in place of, or in combination with, NaCl and $NaNO_3$. It is also contemplated that separate solutions of NaCl and $NaNO_3$ can be provided and introduced sequentially or simultaneously into the reaction. A ratio by moles or concentration of $Cl^-$ to silver (including both ionic and elemental metal forms) in the reaction can be in a range of up to about 10, such as up to about 5, up to about 3, up to about 2.5, up to about 2, up to about 1.5, up to about 1, up to about 0.5, up to about 0.25, up to about 0.1, up to about 0.05, up to about 0.01, or up to about 0.005, and down to about 0.002, down to about 0.001, or less. A ratio by moles or concentration of $NO_3^-$ to silver (including both ionic and elemental metal forms) in the reaction can be a non-zero value different from 1, such as a value greater than 1 and up to about 10, up to about 9, up to about 8, up to about 7, up to about 6, up to about 5, up to about 4, up to about 3, up to about 2.5, up to about 2, up to about 1.8, or up to about 1.6, and down to about 1.2, down to about 1.1, or less (but still greater than 1). The reaction is heated to a certain reaction temperature and over a certain reaction duration to yield an unpurified product including silver nanowires.

Figure 2C:
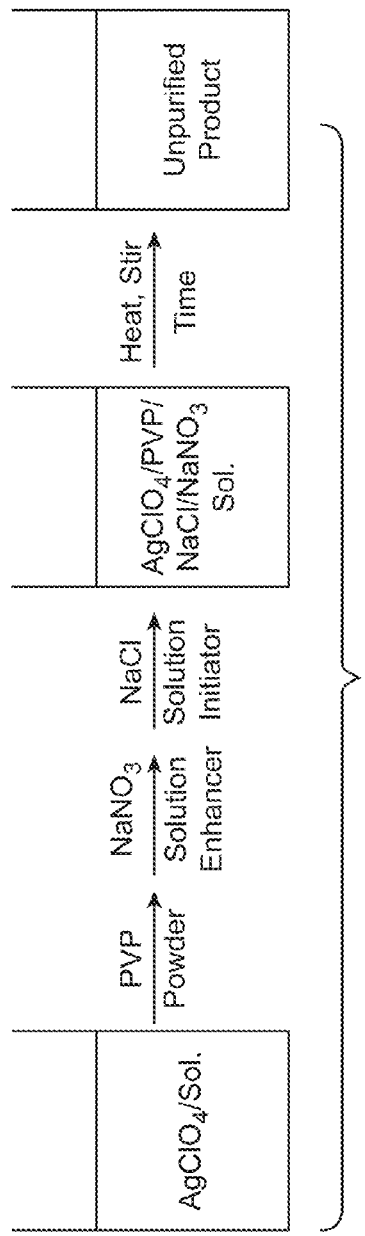
FIG. 2C shows another implementation of a single-staged reaction for the production of silver nanowires, according to an embodiment of this disclosure.
Figure 2D:
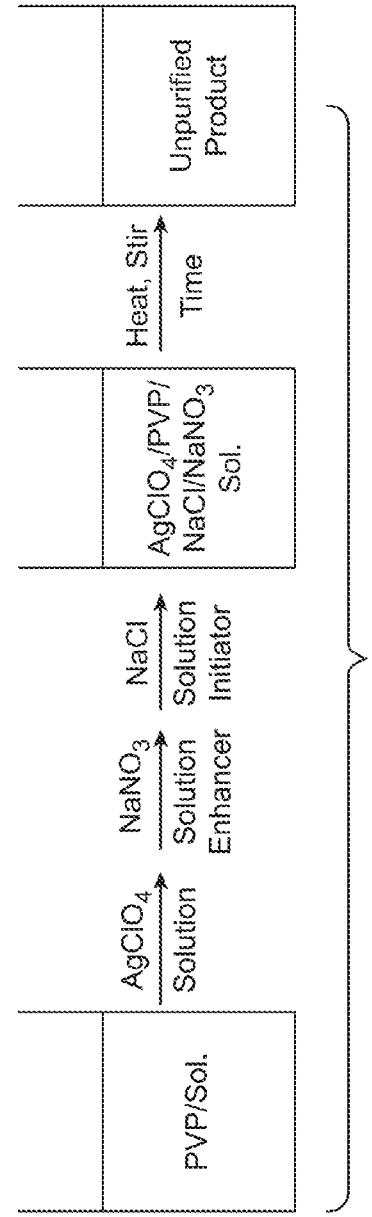
FIG. 2D shows yet another implementation of a single-staged reaction for the production of silver nanowires, according to an embodiment of this disclosure.

FIG. 2C shows another implementation of a single-staged reaction where a combination of different SPAs (here, NaCl and $NaNO_3$) is incorporated for the production of silver nanowires. First, a solution of $AgClO_4$ is provided, such as by dispersing or dissolving $AgClO_4$ in glycerol or another suitable solvent. Another silver-containing reagent or a combination of silver-containing reagents can be used in place of, or in combination with, $AgClO_4$. Next, PVP in a solid or semi-solid form, such as a powder, granular, or paste form, is introduced into the $AgClO_4$ solution as a templating agent and dispersed or dissolved. Another templating agent or a combination of templating agents can be used in place of, or in combination with, PVP. It is also contemplated that a PVP solution can be provided, and $AgNO_3$ in a solution or a solid or semi-solid form can be introduced into the PVP solution, as shown in another implementation of FIG. 2D. Next, a solution of NaCl and $NaNO_3$ in the same or a different solvent is introduced as SPAs to initiate and enhance a reaction. Other SPAs can be used in place of, or in combination with, NaCl and $NaNO_3$. It is also contemplated that separate solutions of NaCl and $NaNO_3$ can be provided and introduced sequentially or simultaneously into the reaction. A ratio by moles or concentration of $Cl^-$ to silver (including both ionic and elemental metal forms) in the reaction can be in a range of up to about 10, such as up to about 5, up to about 3, up to about 2.5, up to about 2, up to about 1.5, up to about 1, up to about 0.5, up to about 0.25, up to about 0.1, up to about 0.05, up to about 0.01, or up to about 0.005, and down to about 0.002, down to about 0.001, or less. A ratio by moles or concentration of $NO_3^-$ to silver (including both ionic and elemental metal forms) in the reaction can be a non-zero value different from 1, such as a value greater than 1 and up to about 10, up to about 9, up to about 8, up to about 7, up to about 6, up to about 5, up to about 4, up to about 3, up to about 2.5, up to about 2, up to about 1.8, or up to about 1.6, and down to about 1.2, down to about 1.1, or less (but still greater than 1). The ratio by moles or concentration of $NO_3^-$ to silver in the reaction also can be about 1 or a non-zero value less than 1, such as down to about 0.9, down to about 0.7, down to about 0.5, down to about 0.3, down to about 0.1, down to about 0.01, or less. The reaction is heated to a certain reaction temperature and over a certain reaction duration to yield an unpurified product including silver nanowires.

To produce long nanowires having small diameters, the reaction phase 102 of FIG. 1A can be implemented as a multi-staged reaction including at least two stages. The multi-staged reaction allows fine-tuned control over axial growth of nanowires, such that diameters and lengths of the nanowires can be respectively controlled. In a first stage of the reaction to produce metal nanowires, a first amount (e.g., in terms of weight or moles) of a metal-containing reagent can be introduced into a reaction mixture. During this first stage, nanowires can be formed from the reaction mixture in a self-seeding process, and the nanowires can preferentially grow in a radial direction, which is induced by the presence of a templating agent. At the end of the first stage, lengths of the nanowires typically are shorter than their final desired lengths; however, diameters of the nanowires can be close to their final diameters. In a second stage of the reaction, a second amount (e.g., in terms of weight or moles) of the same or a different metal-containing reagent is introduced into the reaction mixture. During this second stage, nanowire growth is largely or substantially in the axial direction, while radial growth is largely or substantially inhibited, or vice versa depending how the reaction is controlled.

Desirable nanowire morphologies can be attained by suitable selection of absolute and relative amounts of a metal-containing reagent introduced during successive stages of a multi-staged reaction. In some implementations, a first amount of the metal-containing reagent introduced during a first stage can result in an overall concentration of the metal in a reaction mixture (including both ions and in elemental metal form) in a range of up to about 0.07 molar, such as up to about 0.065 molar, up to about 0.06 molar, up to about 0.055 molar, up to about 0.05 molar, up to about 0.045 molar, up to about 0.04 molar, up to about 0.035 molar, or up to about 0.03 molar, and down to about 0.01 molar, down to about 0.005 molar, or less. Also, a second amount of the same or a different metal-containing reagent introduced during a second stage (plus any one or more subsequent stages) can result in a final, overall concentration of the metal in the reaction mixture (including both ions and in elemental metal form) in a range of up to about 0.2 molar, such as up to about 0.18 molar, up to about 0.16 molar, up to about 0.14 molar, up to about 0.12 molar, up to about 0.11 molar, or up to about 0.1 molar, and down to about 0.04 molar, down to about 0.02 molar, or less. Surprising, nanowires having long lengths can be attained even with a relatively low final, overall concentration of the metal in the reaction mixture of less than about 0.1 molar, such as up to about 0.099 molar, up to about 0.098 molar, up to about 0.097 molar, up to about 0.096 molar, up to about 0.095 molar, up to about 0.09 molar, up to about 0.085 molar, or up to about 0.08 molar, and down to about 0.04 molar, down to about 0.02 molar, or less. In some implementations, a ratio (e.g., in terms of weight or moles) of the second amount of the metal-containing reagent introduced during the second stage (plus any one or more subsequent stages) and the first amount of the metal-containing reagent introduced during the first stage can be up to about 20:1, such as up to about 15:1, up to about 10:1, up to about 5:1, up to about 4.5:1, up to about 4:1, up to about 3.5:1, up to about 3:1, up to about 2.5:1, up to about 2:1, or up to about 1.5:1, and down to about 1:1, down to about 1:2, or less. In some implementations, a ratio (e.g., in terms of weight or moles) of an amount of the metal introduced during the second stage (plus any one or more subsequent stages) and an amount of the metal introduced during the first stage can be up to about 20:1, such as up to about 15:1, up to about 10:1, up to about 5:1, such as up to about 4.5:1, up to about 4:1, up to about 3.5:1, up to about 3:1, up to about 2.5:1, up to about 2:1, or up to about 1.5:1, and down to about 1:1, down to about 1:2, or less.

Figure 2E:
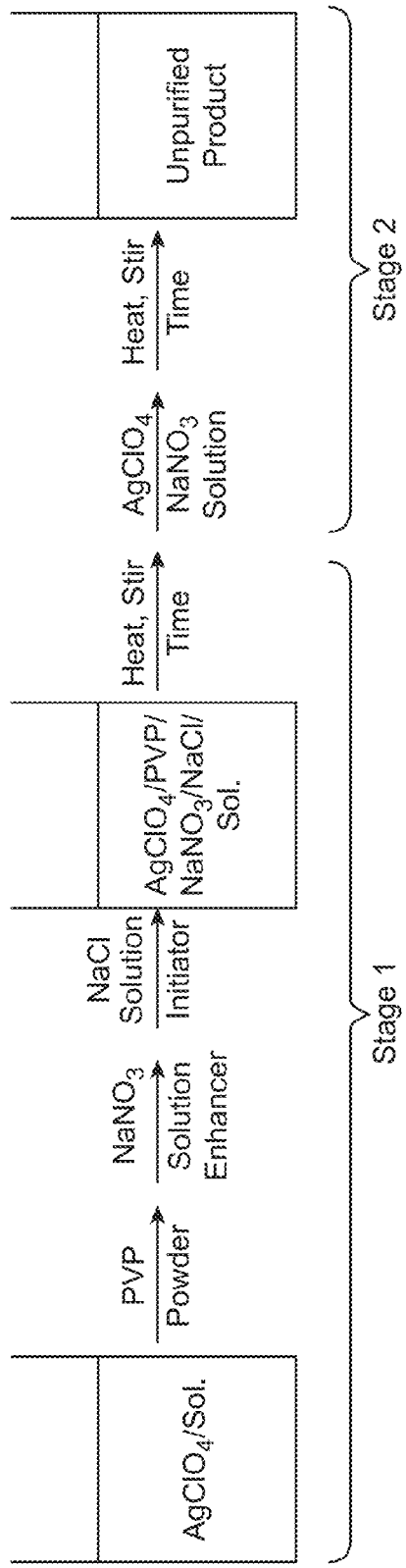
FIG. 2E shows an implementation of a multi-staged reaction for the production of silver nanowires, according to an embodiment of this disclosure.

FIG. 2E shows an implementation of a multi-staged reaction for the production of silver nanowires. In a first stage, a $AgClO_4$ solution is provided, such as by dispersing or dissolving a first amount of $AgClO_4$ in glycerol or another suitable solvent. Another silver-containing reagent or a combination of silver-containing reagents can be used in place of, or in combination with, $AgClO_4$ during this first stage. Next, PVP in a solid or semi-solid form, such as a powder, granular, or paste form, is introduced into the $AgClO_4$ solution as a templating agent and dispersed or dissolved. Another templating agent or a combination of templating agents can be used in place of, or in combination with, PVP. It is also contemplated that a PVP solution can be provided, and the first amount of $AgNO_3$ in a solution or a solid or semi-solid form can be introduced into the PVP solution, as shown in another implementation of FIG. 2F. Next, a solution of NaCl and $NaNO_3$ in the same or a different solvent is introduced as SPAs to initiate and enhance a reaction. Other SPAs can be used in place of, or in combination with, NaCl and $NaNO_3$. It is also contemplated that separate solutions of NaCl and $NaNO_3$ can be provided and introduced sequentially or simultaneously into the reaction. The reaction is heated to a certain reaction temperature and over a certain duration. During this first stage, silver nanowires can form from a reaction mixture in a self-seeding process, with lengths that are typically shorter than their final desired lengths. In a second stage, a second amount of $AgClO_4$ is introduced into the reaction mixture as a solution, along with an amount of a $NaNO_3$ solution that can be introduced simultaneously or sequentially into the reaction mixture. Another silver-containing reagent or a combination of silver-containing reagents can be used in place of, or in combination with, $AgClO_4$ during this second stage. Also, another SPA or a combination of SPAs can be used in place of, or in combination with, $NaNO_3$ during this second stage. During this second stage, silver nanowire growth is largely or substantially in the axial direction, thereby yielding an unpurified product including long silver nanowires having small diameters.

Figure 2F:
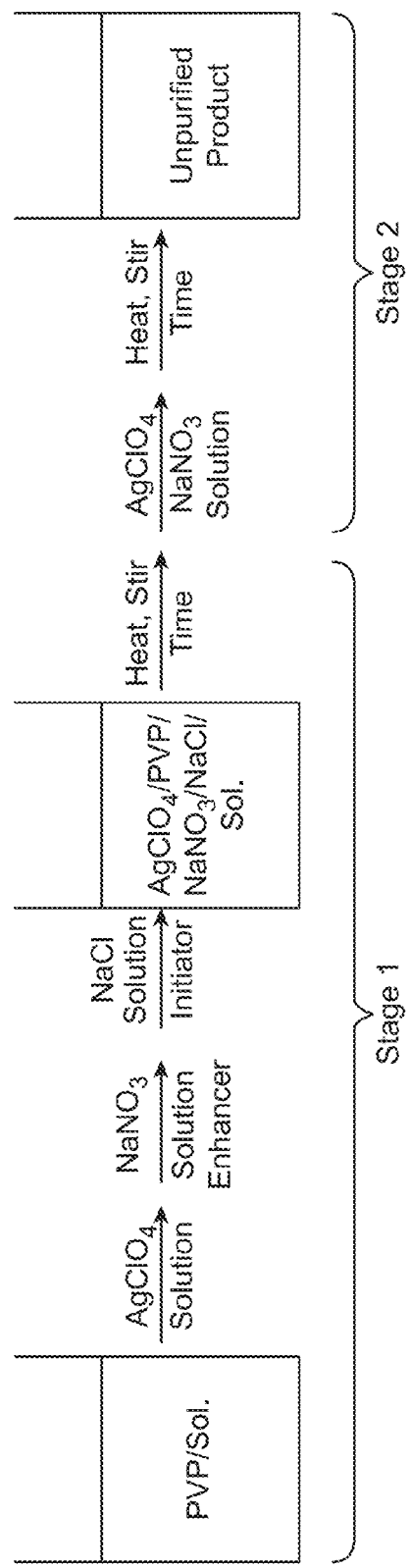
FIG. 2F shows another implementation of a multi-staged reaction for the production of silver nanowires, according to an embodiment of this disclosure.
Figure 2G:
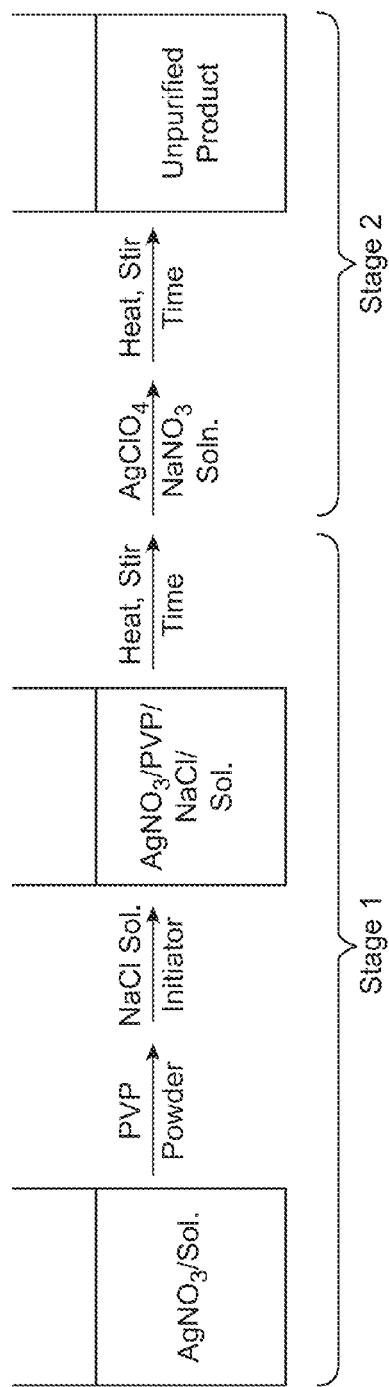
FIG. 2G shows another implementation of a multi-staged reaction for the production of silver nanowires, according to an embodiment of this disclosure.

FIG. 2G shows another implementation of a multi-staged reaction for the production of silver nanowires. In a first stage, a $AgNO_3$ solution is provided, such as by dispersing or dissolving a first amount of $AgNO_3$ in glycerol or another suitable solvent. Another silver-containing reagent or a combination of silver-containing reagents can be used in place of, or in combination with, $AgNO_3$ during this first stage. Next, PVP in a solid or semi-solid form, such as a powder, granular, or paste form, is introduced into the $AgNO_3$ solution as a templating agent and dispersed or dissolved. Another templating agent or a combination of templating agents can be used in place of, or in combination with, PVP. It is also contemplated that a PVP solution can be provided, and the first amount of $AgNO_3$ in a solution or a solid or semi-solid form can be introduced into the PVP solution. Next, a solution of NaCl in the same or a different solvent is introduced as a SPA to initiate a reaction. Another SPA or a combination of SPAs can be used in place of, or in combination with, NaCl during this first stage. The reaction is heated to a certain reaction temperature and over a certain duration. During this first stage, silver nanowires can form from a reaction mixture in a self-seeding process, with lengths that are typically shorter than their final desired lengths. In a second stage, a second amount of a different silver-containing reagent, namely $AgClO_4$, is introduced into the reaction mixture as a solution, along with an amount of a $NaNO_3$ solution that can be introduced simultaneously or sequentially into the reaction mixture. Another silver-containing reagent or a combination of silver-containing reagents can be used in place of, or in combination with, $AgClO_4$ during this second stage. Also, another SPA or a combination of SPAs can be used in place of, or in combination with, $NaNO_3$ during this second stage. During this second stage, silver nanowire growth is largely or substantially in the axial direction, thereby yielding an unpurified product including long silver nanowires having small diameters.

Figure 2H:
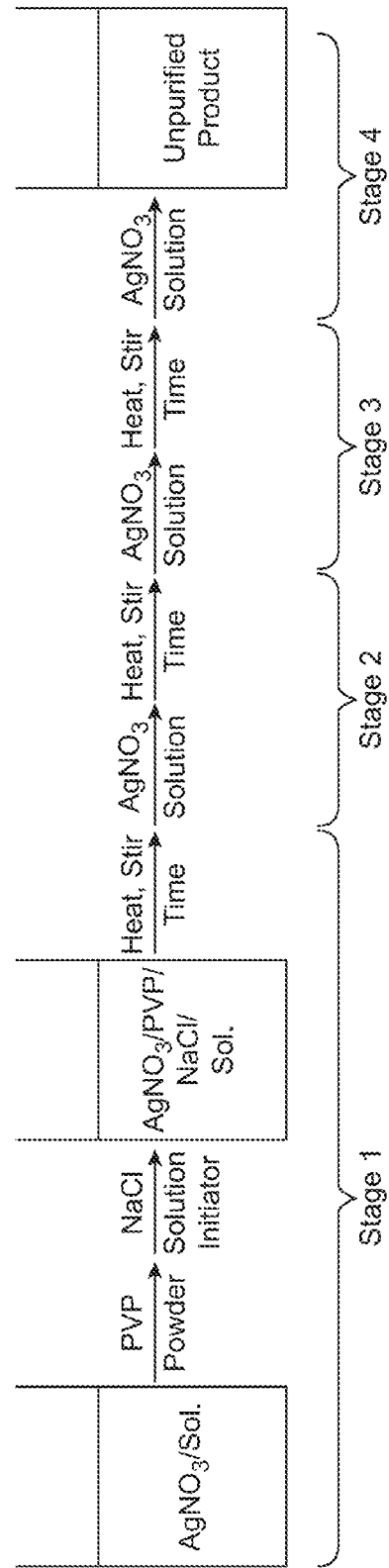
FIG. 2H shows another implementation of a multi-staged reaction for the production of silver nanowires, according to an embodiment of this disclosure.

FIG. 2H shows another implementation of a multi-staged reaction for the production of silver nanowires. In a first stage, a $AgNO_3$ solution is provided, such as by dispersing or dissolving a first amount of $AgNO_3$ in glycerol or another suitable solvent. Another silver-containing reagent or a combination of silver-containing reagents can be used in place of, or in combination with, $AgNO_3$ (see FIG. 2I and FIG. 2J). Next, PVP in a solid or semi-solid form, such as a powder, granular, or paste form, is introduced into the $AgNO_3$ solution as a templating agent and dispersed or dissolved. Another templating agent or a combination of templating agents can be used in place of, or in combination with, PVP. It is also contemplated that a PVP solution can be provided, and the first amount of $AgNO_3$ in a solution or a solid or semi-solid form can be introduced into the PVP solution. Next, a solution of NaCl in the same or a different solvent is introduced as a SPA to initiate a reaction. Another SPA or a combination of SPAs can be used in place of, or in combination with, NaCl during this first stage. The reaction is heated to a certain reaction temperature and over a certain duration. During this first stage, silver nanowires can form from a reaction mixture in a self-seeding process, with lengths that are typically shorter than their final desired lengths. In a second stage, a second amount of $AgNO_3$ is introduced into the reaction mixture as a solution, although the introduction of $AgNO_3$ in a solid form also is contemplated. Another silver-containing reagent or a combination of silver-containing reagents can be used in place of, or in combination with, $AgNO_3$ during this second stage (see FIG. 2I and FIG. 2J). In a third stage, a third amount of $AgNO_3$ is introduced into the reaction mixture as a solution, although the introduction of $AgNO_3$ in a solid form also is contemplated. Another silver-containing reagent or a combination of silver-containing reagents can be used in place of, or in combination with, $AgNO_3$ during this third stage (see FIG. 2I and FIG. 2J). And, in a fourth stage, a fourth amount of $AgNO_3$ is introduced into the reaction mixture as a solution, although the introduction of $AgNO_3$ in a solid form also is contemplated. Another silver-containing reagent or a combination of silver-containing reagents can be used in place of, or in combination with, $AgNO_3$ during this fourth stage (see FIG. 2I and FIG. 2J). During the second, third, and fourth stages, silver nanowire growth is largely or substantially in the axial direction, thereby yielding an unpurified product including long silver nanowires having small diameters. Although four stages are shown in the multi-staged implementation of FIG. 2H, other multi-staged implementations, in general, can have two or more stages, such as three stages, four stages, five stages, six stages, or more, including any type of continuous stage. Also, it is contemplated that a SPA or a combination of SPAs can be introduced during any one or more of the stages following the first stage.

Referring back to FIG. 1A, the unpurified product from the reaction phase 102 can be purified in the purification phase 104. The purification phase 104 can result in a higher percentage by number of nanowires relative to all nanostructures and microstructures (including all nanostructures other than nanowires) compared to a percentage by number of nanowires in the unpurified product. Specifically, synthesized nanowires can be separated from other components of a reaction mixture using different techniques such as gravity sedimentation, centrifugation, and cross-flow filtration, and then re-dispersed in a suitable solvent to form a nanowire dispersion. If the nanowire dispersion is determined to have an unacceptable level of agglomerates, the nanowire dispersion can be subjected to a procedure for agglomerate removal.

In some embodiments, a reaction mixture can be quenched or otherwise cooled to a desired temperature, such as about room temperature. Next, the cooled reaction mixture can be mixed or otherwise combined with a suitable re-dispersal solvent, and a solid product (including nanowires) can be permitted to settle. In some embodiments, the settled product is the desired product, so the supernatant is removed, and the settled product is kept. In other embodiments, the settled product is the undesired product, so the supernatant is removed and kept, and the settled product is disposed or recycled. The settled product can be separated by decanting or otherwise removing a supernatant, and then re-dispersed in the same solvent or another re-dispersal solvent, optionally with agitation to remove remaining components of the reaction mixture. This settle-wash process can be repeated one or more times, resulting in a dispersion of nanowires in a suitable solvent. In other embodiments, a hot, as-synthesized reaction mixture can be quenched by directly mixing or otherwise combining with a cooled re-dispersal solvent. After such quenching, other aspects of a settle-wash process can be similarly carried out as described above. Settling as described herein can include gravity settling, centrifugation, or any other similar technique. A resulting dispersion of nanowires in a re-dispersal solvent can be placed in a suitable container for shipping and storage.

Examples of suitable re-dispersal solvents include alcohols, water, hydrocarbons (e.g., paraffins, hydrogenated hybrocarbons, and cycloaliphatic hydrocarbons), alkenes, alkynes, ketones, ethers, and combinations thereof. By way of example, nanowires can be re-dispersed in isopropanol, methanol, ethanol, water, or a combination thereof. Other specific examples of suitable solvents include 2-methyltetrahydrofuran, a chloro-hydrocarbon, a fluoro-hydrocarbon, acetaldehyde, acetic acid, acetic anhydride, acetone, acetonitrile, aniline, benzene, benzonitrile, benzyl alcohol, benzyl ether, butanol, butanone, butyl acetate, butyl ether, butyl formate, butyraldehyde, butyric acid, butyronitrile, carbon disulfide, carbon tetrachloride, chlorobenzene, chlorobutane, chloroform, cyclohexane, cyclohexanol, cyclopentanone, cyclopentyl methyl ether, diacetone alcohol, dichloroethane, dichloromethane, diethyl carbonate, diethyl ether, diethylene glycol, diglyme, di-isopropylamine, dimethoxyethane, dimethyl formamide, dimethyl sulfoxide, dimethylamine, dimethylbutane, dimethylether, dimethylformamide, dimethylpentane, dimethylsulfoxide, dioxane, dodecafluoro-1-hepatanol, ethanol, ethyl acetate, ethyl ether, ethyl formate, ethyl propionate, ethylene dichloride, ethylene glycol, formamide, formic acid, glycerine, heptane, hexafluoroisopropanol, hexamethylphosphoramide, hexamethylphosphorous triamide, hexane, hexanone, hydrogen peroxide, hypochlorite, i-butyl acetate, i-butyl alcohol, i-butyl formate, i-butylamine, i-octane, i-propyl acetate, i-propyl ether, isopropanol, isopropylamine, ketone peroxide, methanol and calcium chloride solution, methoxyethanol, methyl acetate, methyl ethyl ketone, methyl formate, methyl n-butyrate, methyl n-propyl ketone, methyl t-butyl ether, methylene chloride, methylene, methylhexane, methylpentane, mineral oil, m-xylene, n-butanol, n-decane, n-hexane, nitrobenzene, nitroethane, nitromethane, nitropropane, N-methyl-2-pyrrolidinone, n-propanol, octafluoro-1-pentanol, octane, pentane, pentanone, petroleum ether, phenol, propanol, propionaldehyde, propionic acid, propionitrile, propyl acetate, propyl ether, propyl formate, propylamine, p-xylene, pyridine, pyrrolidine, sodium hydroxide, sodium-containing solution, t-butanol, t-butyl alcohol, t-butyl methyl ether, tetrachloroethane, tetrafluoropropanol, tetrahydrofuran, tetrahydronaphthalene, toluene, triethyl amine, trifluoroacetic acid, trifluoroethanol, trifluoropropanol, trimethylbutane, trimethylhexane, trimethylpentane, valeronitrile, xylene, xylenol, and other similar compounds or solutions and any combination thereof.

More generally, a re-dispersal solvent can include water, an ionic or ion-containing solution, an ionic liquid, an organic solvent (e.g., a polar, organic solvent; a non-polar, organic solvent; an aprotic solvent; a protic solvent; a polar aprotic solvent, or a polar, protic solvent); an inorganic solvent, or any combination thereof. Oils also can be considered suitable solvents.

By carrying out the production of nanowires according to FIG. 1A, FIG. 1B, FIG. 2A, FIG. 2B, FIG. 2C, FIG. 2D, FIG. 2E, FIG. 2F, and FIG. 2H, a number of benefits can be attained. For example, a yield of nanowires in the unpurified or purified product can be at least about 80% for small scale reactions (e.g., a reaction mixture volume up to about 1 L), such as at least about 85%, at least about 87%, at least about 90%, or at least about 92%, and up to about 95%, up to about 98%, or more, and a yield of nanowires in the unpurified or purified product can be at least about 55% for large scale reactions (e.g., a reaction mixture volume greater than about 1 L), such as at least about 60%, at least about 65%, at least about 70%, at least about 75%, or at least about 80%, and up to about 85%, up to about 90%, or more. As used herein, a yield of nanowires formed of a material can refer to an amount (e.g., by weight or moles) of the nanowires relative to an amount (e.g., by weight or moles) of the material added to a reaction mixture in the form of a set of reagents. Additionally, a yield of conversion of silver ions to silver metal can be at least about 99% (e.g., by weight or moles), at least about 98%, at least about 97%, at least about 96% at least about 95%, at least about 94%, at least about 93%, at least about 92%, at least about 91%, at least about 90%, at least about 89%, at least about 88%, at least about 87%, at least about 86%, at least about 85%, or at least about 80%.

As another example, a percentage by number of nanowires relative to all nanostructures and microstructures (including all nanostructures other than nanowires) in the unpurified product can be at least about 1%, such as at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 20%, at least about 25%, at least about 30%, at least about 40%, at least about 50%, at least about 60%, at least about 70%, or at least about 80%, and up to about 85%, up to about 90%, up to about 95%, or more, and a percentage by number of nanowires relative to all nanostructures and microstructures (including all nanostructures other than nanowires) in the purified product can be at least about 50%, such as at least about 55%, at least about 60%, at least about 65%, at least about 70%, at least about 75%, at least about 80%, at least about 85%, or at least about 90%, and up to about 95%, up to about 98%, up to about 99%, or more. As used herein, a percentage by number of nanowires in an unpurified or a purified product can be based on manual or automated inspection of one or more imaged samples.

As another example, a percentage by number of nanowire-forming seeds relative to all nanostructures and microstructures (including all seeds other than nanowire-forming seeds) in the unpurified product can be at least about 1%, such as at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 20%, at least about 25%, at least about 30%, at least about 40%, at least about 50%, at least about 60%, at least about 70%, or at least about 80%, and up to about 85%, up to about 90%, up to about 95%, or more, and a percentage by number of nanowire-forming seeds relative to all nanostructures and microstructures (including all seeds other than nanowire-forming seeds) in the purified product can be at least about 50%, such as at least about 55%, at least about 60%, at least about 65%, at least about 70%, at least about 75%, at least about 80%, at least about 85%, or at least about 90%, and up to about 95%, up to about 98%, up to about 99%, or more. As used herein, a percentage by number of nanowire-forming seeds in an unpurified or a purified product can be based on manual or automated inspection of one or more imaged samples.

As another example, among nanowires in the unpurified or purified product, at least about 30% of the nanowires (e.g., by number) can have an aspect ratio of at least about 50, such as at least about 35%, at least about 40%, at least about 45%, at least about 50%, at least about 55%, at least about 60%, at least about 65%, or at least about 60%, and up to about 80%, up to about 90%, or more. In some implementations, at least about 25% of the nanowires (e.g., by number) can have an aspect ratio of at least about 100, such as at least about 30%, at least about 35%, at least about 40%, at least about 45%, at least about 50%, at least about 55%, at least about 60%, or at least about 65%, and up to about 75%, up to about 85%, or more. In other implementations, at least about 20% of the nanowires (e.g., by number) can have an aspect ratio of at least about 200, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have an aspect ratio of at least about 400, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have an aspect ratio of at least about 500, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have an aspect ratio of at least about 1,000, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have an aspect ratio of at least about 1,500, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have an aspect ratio of at least about 2,000, such as at least about 25%, at least about 30%, at least about 35%, at least about 40%, at least about 45%, at least about 50%, at least about 55%, or at least about 60%, and up to about 70%, up to about 80%, or more.

As another example, among nanowires in the unpurified or purified product, an average aspect ratio of the nanowires can be in a range of about 50 to about 3,000, such as from about 100 to about 2,000, from about 200 to about 2,000, from about 400 to about 2,000, from about 400 to about 1,500, from about 400 to about 1,000, from about 500 to about 1,000, from about 100 to about 3,000, from about 200 to about 3,000, from about 400 to about 3,000, from about 500 to about 3,000, from about 1,000 to about 3,000, from about 1,500 to about 3,000, or from about 2,000 to about 3,000, and a standard deviation of a distribution of aspect ratios can be in the range of about 10 to about 500, such as from about 10 to about 450, from about 10 to about 400, from about 50 to about 350, from about 50 to about 300, or from about 50 to about 250.

As another example, among nanowires in the unpurified or purified product, at least about 30% of the nanowires (e.g., by number) can have a length of at least about 10 µm, such as at least about 35%, at least about 40%, at least about 45%, at least about 50%, at least about 55%, at least about 60%, at least about 65%, or at least about 60%, and up to about 80%, up to about 90%, or more. In some implementations, at least about 25% of the nanowires (e.g., by number) can have a length of at least about 13 µm, such as at least about 30%, at least about 35%, at least about 40%, at least about 45%, at least about 50%, at least about 55%, at least about 60%, or at least about 65%, and up to about 75%, up to about 85%, or more. In other implementations, at least about 20% of the nanowires (e.g., by number) can have a length of at least about 15 µm, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have a length of at least about 20 µm, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have a length of at least about 25 µm, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have a length of at least about 30 µm, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have a length of at least about 35 µm, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have a length of at least about 40 µm, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have a length of at least about 50 µm, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have a length of at least about 55 µm, such as at least about 25%, at least about 30%, at least about 35%, at least about 40%, at least about 45%, at least about 50%, at least about 55%, or at least about 60%, and up to about 70%, up to about 80%, or more.

As another example, among nanowires in the unpurified or purified product, an average length of the nanowires can be in a range from about 10 µm to about 100 µm, such as from about 10 µm to about 80 µm, from about 15 µm to about 80 µm, from about 15 µm to about 60 µm, from about 20 µm to about 60 µm, from about 20 µm to about 50 µm, from about 20 µm to about 45 µm, from about 25 µm to about 60 µm, from about 25 µm to about 50 µm, from about 25 µm to about 45 µm, from about 30 µm to about 60 µm, from about 30 µm to about 50 µm, from about 30 µm to about 45 µm, from about 35 µm to about 60 µm, from about 35 µm to about 50 µm, or from about 35 µm to about 45 µm, and a standard deviation of a distribution of lengths can be in the range of about 1 µm to about 40 µm, such as from about 1 µm to about 30 µm, from about 1 µm to about 25 µm, from about 5 µm to about 20 µm, from about 5 µm to about 15 µm, from about 5 µm to about 10 µm, or from about 1 µm to about 5 µm.

As another example, among nanowires in the unpurified or purified product, at least about 30% of the nanowires (e.g., by number) can have a diameter no greater than about 100 nm, such as at least about 35%, at least about 40%, at least about 45%, at least about 50%, at least about 55%, at least about 60%, at least about 65%, or at least about 60%, and up to about 80%, up to about 90%, or more. In some implementations, at least about 25% of the nanowires (e.g., by number) can have a diameter no greater than about 60 nm, such as at least about 30%, at least about 35%, at least about 40%, at least about 45%, at least about 50%, at least about 55%, at least about 60%, or at least about 65%, and up to about 75%, up to about 85%, or more. In other implementations, at least about 20% of the nanowires (e.g., by number) can have a diameter no greater than about 40 nm, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have a diameter no greater than about 35 nm, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have a diameter no greater than about 33 nm, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have a diameter no greater than about 30 nm, such as at least about 25%, at least about 30%, at least about 35%, at least about 40%, at least about 45%, at least about 50%, at least about 55%, or at least about 60%, and up to about 70%, up to about 80%, or more. In other implementations, at least about 20% of the nanowires (e.g., by number) can have a diameter no greater than about 27 nm, such as at least about 25%, at least about 30%, at least about 35%, at least about 40%, at least about 45%, at least about 50%, at least about 55%, or at least about 60%, and up to about 70%, up to about 80%, or more. In other implementations, at least about 10% of the nanowires (e.g., by number) can have a diameter no greater than about 25 nm, such as at least about 20%, at least about 25%, at least about 30%, at least about 35%, at least about 40%, at least about 45%, at least about 50%, at least about 55%, or at least about 60%, and up to about 70%, up to about 80%, or more. In other implementations, at least about 10% of the nanowires (e.g., by number) can have a diameter no greater than about 23 nm, such as at least about 20%, at least about 25%, at least about 30%, at least about 35%, at least about 40%, at least about 45%, at least about 50%, at least about 55%, or at least about 60%, and up to about 70%, up to about 80%, or more. In other implementations, at least about 10% of the nanowires (e.g., by number) can have a diameter no greater than about 20 nm, such as at least about 20%, at least about 25%, at least about 30%, at least about 35%, at least about 40%, at least about 45%, at least about 50%, at least about 55%, or at least about 60%, and up to about 70%, up to about 80%, or more. In other implementations, at least about 10% of the nanowires (e.g., by number) can have a diameter no greater than about 17 nm, such as at least about 20%, at least about 25%, at least about 30%, at least about 35%, at least about 40%, at least about 45%, at least about 50%, at least about 55%, or at least about 60%, and up to about 70%, up to about 80%, or more. In other implementations, at least about 10% of the nanowires (e.g., by number) can have a diameter no greater than about 15 nm, such as at least about 20%, at least about 25%, at least about 30%, at least about 35%, at least about 40%, at least about 45%, at least about 50%, at least about 55%, or at least about 60%, and up to about 70%, up to about 80%, or more. In other implementations, at least about 10% of the nanowires (e.g., by number) can have a diameter no greater than about 10 nm, such as at least about 20%, at least about 25%, at least about 30%, at least about 35%, at least about 40%, at least about 45%, at least about 50%, at least about 55%, or at least about 60%, and up to about 70%, up to about 80%, or more.

As another example, among nanowires in the unpurified or purified product, an average diameter of the nanowires can be in the range of 5 nm to about 100 nm, such as from about 10 nm to about 100 nm, such as from about 5 nm to about 80 nm, from about 5 nm to about 70 nm, from about 5 nm to about 60 nm, from about 5 nm to about 50 nm, from about 5 nm to about 45 nm, from about 5 nm to about 40 nm, from about 5 nm to about 35 nm, from about 5 nm to about 30 nm, from about 5 nm to about 25 nm, from about 5 nm to about 20 nm, from about 5 nm to about 15 nm, from about 10 nm to about 80 nm, from about 10 nm to about 70 nm, from about 10 nm to about 60 nm, from about 10 nm to about 50 nm, from about 10 nm to about 45 nm, from about 10 nm to about 40 nm, from about 10 nm to about 35 nm, from about 10 nm to about 30 nm, from about 10 nm to about 25 nm, from about 10 nm to about 20 nm, from about 20 nm to about 60 nm, from about 20 nm to about 50 nm, from about 20 nm to about 45 nm, from about 20 nm to about 40 nm, from about 20 nm to about 35 nm, or from about 20 nm to about 30 nm, and a standard deviation of a distribution of diameters can be in the range of about 1 nm to about 40 nm, such as from about 1 nm to about 30 nm, from about 1 nm to about 25 nm, from about 5 nm to about 20 nm, from about 5 nm to about 15 nm, from about 5 nm to about 10 nm, or from about 1 nm to about 5 nm.

As a further example, among nanowires in the unpurified or purified product, at least about 30% of the nanowires (e.g., by number) can be single crystalline, such as at least about 40%, at least about 50%, at least about 60%, at least about 70%, at least about 80%, at least about 90%, at least about 95%, or at least about 98%, and up to about 99%, up to about 99.9%, or up to about 100%.

In terms of batch-to-batch consistency across different batches of the unpurified or purified product (using substantially identical manufacturing conditions), a value corresponding to an average aspect ratio of nanowires in each batch can be obtained, and a coefficient of variation (e.g., a standard deviation divided by an average or a mean across the batches) in values across the batches can be no greater than about 30%, such as no greater than about 25%, no greater than about 20%, no greater than about 15%, no greater than about 10%, or no greater than about 5%, and down to about 2%, down to about 1%, or less. The number of batches used for determining batch-to-batch consistency can be at least 2, such as at least 3, at least 4, at least 5, at least 10, at least 15, or at least 20. This batch-to-batch consistency allows the production of a nanowire product by blending or otherwise combining multiple batches of nanowires, each batch characterized by a value of an average aspect ratio of nanowires in the batch, and a coefficient of variation in the values across the batches can be no greater than about 30%, such as no greater than about 25%, no greater than about 20%, no greater than about 15%, no greater than about 10%, or no greater than about 5%, and down to about 2%, down to about 1%, or less. The number of batches combined in the nanowire product can be at least 2, such as at least 3, at least 4, at least 5, at least 10, at least 15, or at least 20.

Also, in terms of batch-to-batch consistency across different batches of the unpurified or purified product (using substantially identical manufacturing conditions), a value corresponding to an average size of nanowire-forming seeds in each batch can be obtained, and a coefficient of variation (e.g., a standard deviation divided by an average or a mean across the batches) in values across the batches can be no greater than about 30%, such as no greater than about 25%, no greater than about 20%, no greater than about 15%, no greater than about 10%, or no greater than about 5%, and down to about 2%, down to about 1%, or less. The number of batches used for determining batch-to-batch consistency can be at least 2, such as at least 3, at least 4, at least 5, at least 10, at least 15, or at least 20. This batch-to-batch consistency allows the production of a nanowire-forming seed product by blending or otherwise combining multiple batches of nanowire-forming seeds, each batch characterized by a value of an average size or a value of an average PVP coverage of nanowire-forming seeds in the batch, and a coefficient of variation in the values across the batches can be no greater than about 30%, such as no greater than about 25%, no greater than about 20%, no greater than about 15%, no greater than about 10%, or no greater than about 5%, and down to about 2%, down to about 1%, or less. The number of batches combined in the nanowire-forming seed product can be at least 2, such as at least 3, at least 4, at least 5, at least 10, at least 15, or at least 20.

Also, in terms of batch-to-batch consistency across different batches of the unpurified or purified product (using substantially identical manufacturing conditions), a value corresponding to an average length of nanowires in each batch can be obtained, and a coefficient of variation (e.g., a standard deviation divided by an average or a mean across the batches) in values across the batches can be no greater than about 30%, such as no greater than about 25%, no greater than about 20%, no greater than about 15%, no greater than about 10%, or no greater than about 5%, and down to about 2%, down to about 1%, or less. The number of batches used for determining batch-to-batch consistency can be at least 2, such as at least 3, at least 4, at least 5, at least 10, at least 15, or at least 20. This batch-to-batch consistency allows the production of a nanowire product by blending or otherwise combining multiple batches of nanowires, each batch characterized by a value of an average length of nanowires in the batch, and a coefficient of variation in the values across the batches can be no greater than about 30%, such as no greater than about 25%, no greater than about 20%, no greater than about 15%, no greater than about 10%, or no greater than about 5%, and down to about 2%, down to about 1%, or less. The number of batches combined in the nanowire product can be at least 2, such as at least 3, at least 4, at least 5, at least 10, at least 15, or at least 20.

Also, in terms of batch-to-batch consistency across different batches of the unpurified or purified product (using substantially identical manufacturing conditions), a value corresponding to a chemical purity of nanowire-forming seeds in each batch can be obtained, and a coefficient of variation (e.g., a standard deviation divided by an average or a mean across the batches) in values across the batches can be no greater than about 30%, such as no greater than about 25%, no greater than about 20%, no greater than about 15%, no greater than about 10%, or no greater than about 5%, and down to about 2%, down to about 1%, or less. The number of batches used for determining batch-to-batch consistency can be at least 2, such as at least 3, at least 4, at least 5, at least 10, at least 15, or at least 20. This batch-to-batch consistency allows the production of a nanowire-forming seed product by blending or otherwise combining multiple batches of nanowire-forming seeds, each batch characterized by a value of a chemical purity of nanowire-forming seeds in the batch, and a coefficient of variation in the values across the batches can be no greater than about 30%, such as no greater than about 25%, no greater than about 20%, no greater than about 15%, no greater than about 10%, or no greater than about 5%, and down to about 2%, down to about 1%, or less. The number of batches combined in the nanowire-forming seed product can be at least 2, such as at least 3, at least 4, at least 5, at least 10, at least 15, or at least 20.

Also, in terms of batch-to-batch consistency across different batches of the unpurified or purified product (using substantially identical manufacturing conditions), a value corresponding to an average diameter of nanowires in each batch can be obtained, and a coefficient of variation (e.g., a standard deviation divided by an average or a mean across the batches) in values across the batches can be no greater than about 30%, such as no greater than about 25%, no greater than about 20%, no greater than about 15%, no greater than about 10%, or no greater than about 5%, and down to about 2%, down to about 1%, or less. The number of batches used for determining batch-to-batch consistency can be at least 2, such as at least 3, at least 4, at least 5, at least 10, at least 15, or at least 20. This batch-to-batch consistency allows the production of a nanowire product by blending or otherwise combining multiple batches of nanowires, each batch characterized by a value of an average diameter of nanowires in the batch, and a coefficient of variation in the values across the batches can be no greater than about 30%, such as no greater than about 25%, no greater than about 20%, no greater than about 15%, no greater than about 10%, or no greater than about 5%, and down to about 2%, down to about 1%, or less. The number of batches combined in the nanowire product can be at least 2, such as at least 3, at least 4, at least 5, at least 10, at least 15, or at least 20.

And, in terms of batch-to-batch consistency across different batches of the unpurified or purified product (using substantially identical manufacturing conditions), a value corresponding to a metal content or a concentration of nanowire-forming seeds (having a characteristic shape) in each batch can be obtained, and a coefficient of variation (e.g., a standard deviation divided by an average or a mean across the batches) in values across the batches can be no greater than about 30%, such as no greater than about 25%, no greater than about 20%, no greater than about 15%, no greater than about 10%, or no greater than about 5%, and down to about 2%, down to about 1%, or less. The number of batches used for determining batch-to-batch consistency can be at least 2, such as at least 3, at least 4, at least 5, at least 10, at least 15, or at least 20. This batch-to-batch consistency allows the production of a nanowire-forming seed product by blending or otherwise combining multiple batches of nanowire-forming seeds, each batch characterized by a value of a metal content or a concentration of nanowire-forming seeds in the batch, and a coefficient of variation in the values across the batches can be no greater than about 30%, such as no greater than about 25%, no greater than about 20%, no greater than about 15%, no greater than about 10%, or no greater than about 5%, and down to about 2%, down to about 1%, or less. The number of batches combined in the nanowire-forming seed product can be at least 2, such as at least 3, at least 4, at least 5, at least 10, at least 15, or at least 20.

As a further example, nanowires having desired morphologies can be embedded or otherwise incorporated in a variety of substrates or other host materials to form transparent conductors (or transparent conductive electrodes) having a desired combination of two or more of the following performance characteristics, namely 1) a haze no greater than about 2.5%, no greater than about 2%, no greater than about 1.9%, no greater than about 1.8%, no greater than about 1.7%, no greater than about 1.6%, no greater than about 1.5%, no greater than about 1.4%, no greater than about 1.3%, no greater than about 1.2%, no greater than about 1.1%, no greater than about 1%, no greater than about 0.9%, no greater than about 0.8%, no greater than about 0.7%, or no greater than about 0.6%, and down to about 0.4%, down to about 0.2%, or less; 2) a light transmittance (e.g., in the visible range of about 400 nm to about 700 nm) of at least about 85%, at least about 87%, at least about 90%, at least about 93%, or at least about 95%, and up to about 97%, up to about 98%, or more; and 3) a sheet resistance no greater than about 500 Ω/sq, no greater than about 400 Ω/sq, no greater than about 300 Ω/sq, no greater than about 200 Ω/sq, no greater than about 150 Ω/sq, no greater than about 100 Ω/sq, no greater than about 75 Ω/sq, or no greater than about 50 Ω/sq, and down to about 30 Ω/sq, down to about 20 Ω/sq, or less. Embedding of nanowires can be carried out as explained in, for example, U.S. Patent Application Publication No. 2011/0281070, entitled "STRUCTURES WITH SURFACE-EMBEDDED ADDITIVES AND RELATED MANUFACTURING METHODS" and published on Nov. 17, 2011, the disclosure of which is incorporated herein by reference in its entirety.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Production and Characterization of Silver Nanowires

Figure 4:
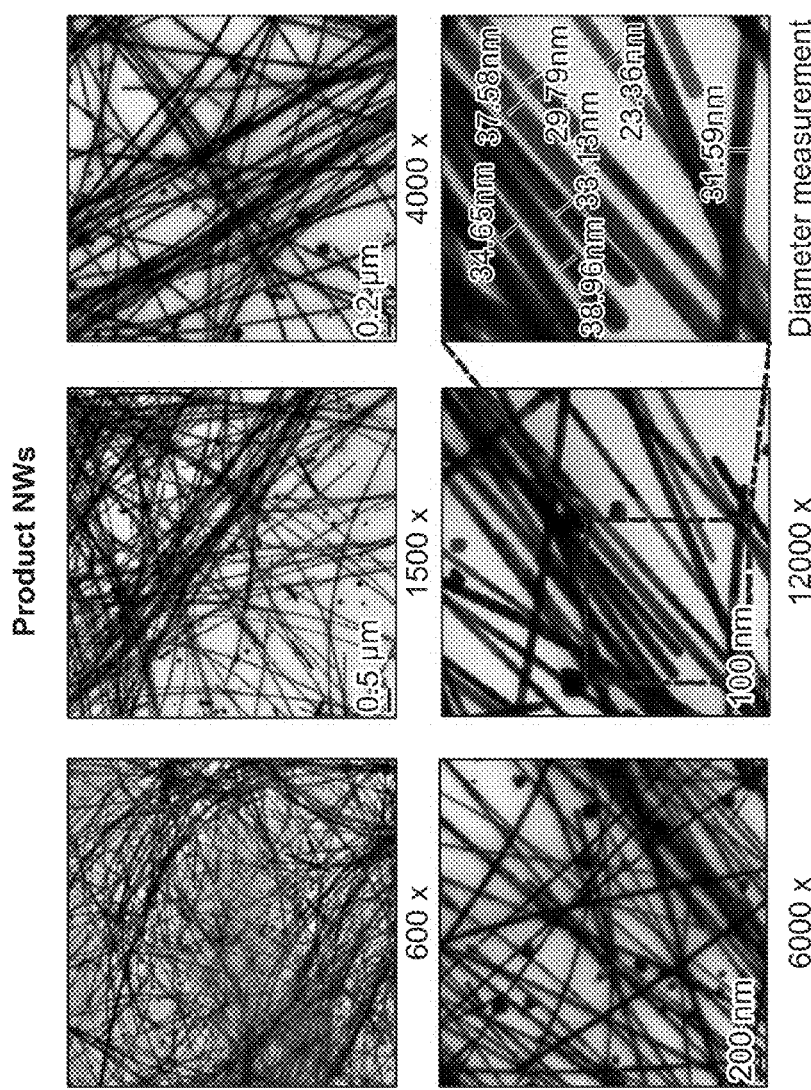
FIG. 4 are transmission electron microscope (or TEM) images of an as-synthesized, unpurified batch of silver nanowires produced according to FIG. 3.
Figure 5:
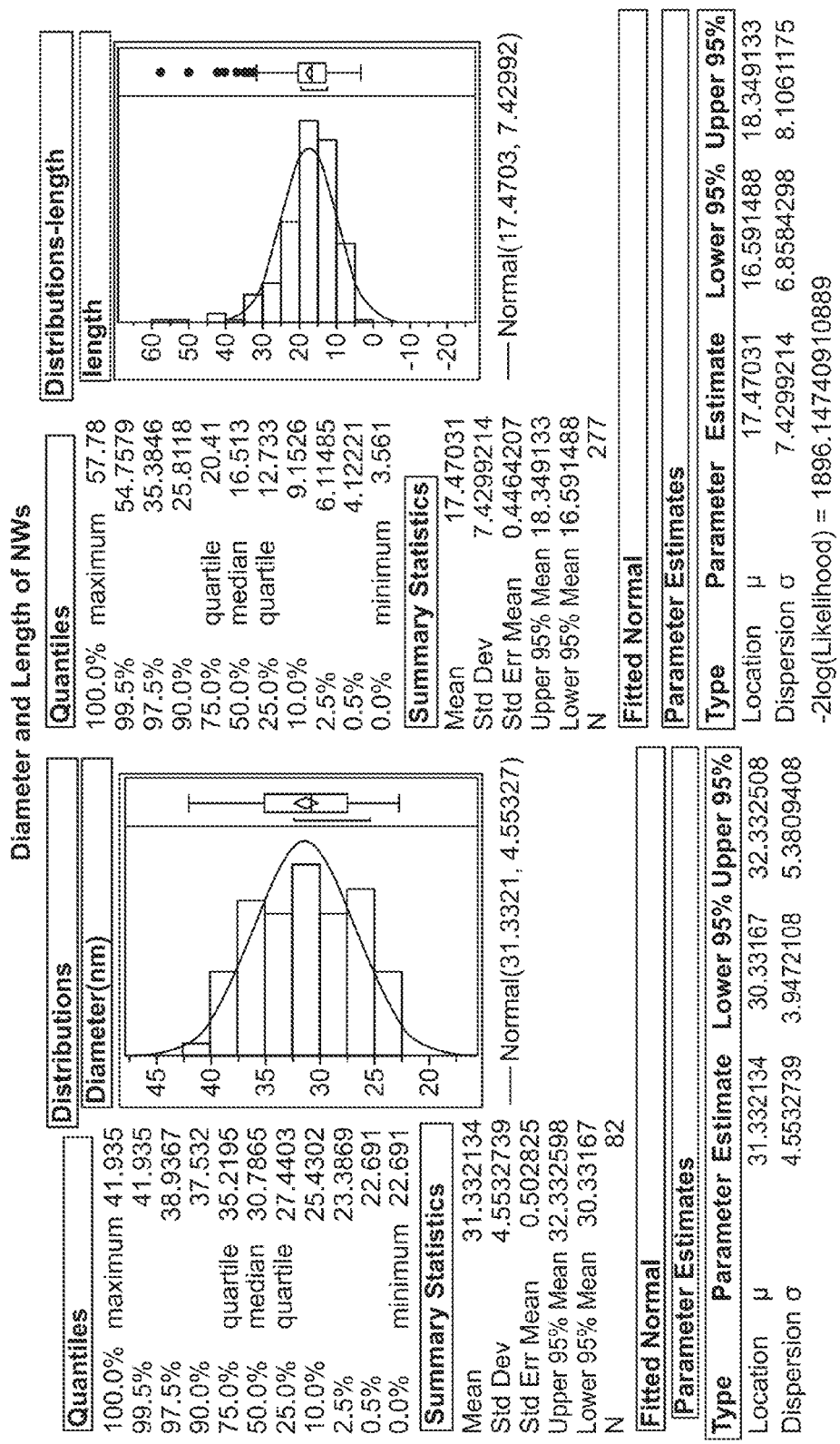
FIG. 5 shows statistical data for morphologies of silver nanowires produced according to FIG. 3.

FIG. 3 is a flowchart of a process for the production of silver nanowires according to the implementation of FIG. 2A. In this example, a single-staged reaction is used, with an overall silver concentration (including both ionic and reduced metal forms) of about 0.095 molar, and a chlorine concentration (expressed in terms of moles of chloride anion added to a reaction mixture divided by an overall volume of the reaction mixture) of about 4.7 mmolar. FIG. 4 are transmission electron microscope (or TEM) images of an as-synthesized, unpurified batch of silver nanowires produced according to FIG. 3. The as-synthesized batch included some impurities. FIG. 5 shows statistical data for morphologies of silver nanowires produced according to FIG. 3. An average diameter of the nanowires was about 31.3±4.6 nm, and an average length of the nanowires was about 17.5±7.4 µm. An average aspect ratio of the nanowires was about 560.

Figure 6:
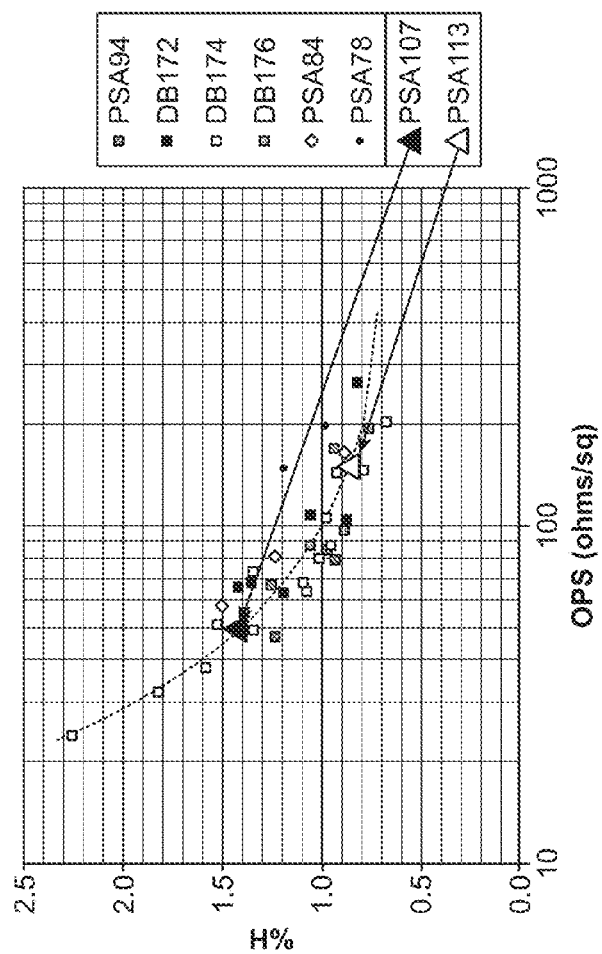
FIG. 6 shows haze and sheet resistance values of transparent conductive electrodes incorporating silver nanowires produced according to this disclosure.

Silver nanowires produced according to this disclosure were embedded in substrates to produce transparent conductive electrodes. Haze and sheet resistance values of the transparent conductive electrodes were obtained and compared with corresponding values of transparent conductive electrodes incorporating silver nanowires produced according to different reaction conditions. As shown in FIG. 6, the transparent conductive electrodes incorporating the silver nanowires produced according to this disclosure generally yielded the best results in terms of a combination of lower haze and lower sheet resistance.

Figure 7:
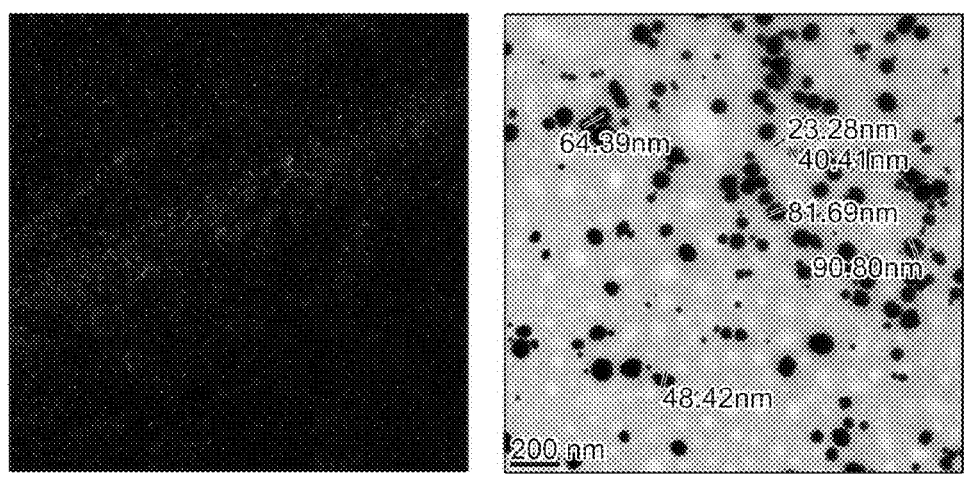
FIG. 7 shows optical and TEM images of a synthesis carried out similar to FIG. 3, but without the addition of a sodium chloride (or NaCl) solution.
Figure 8:
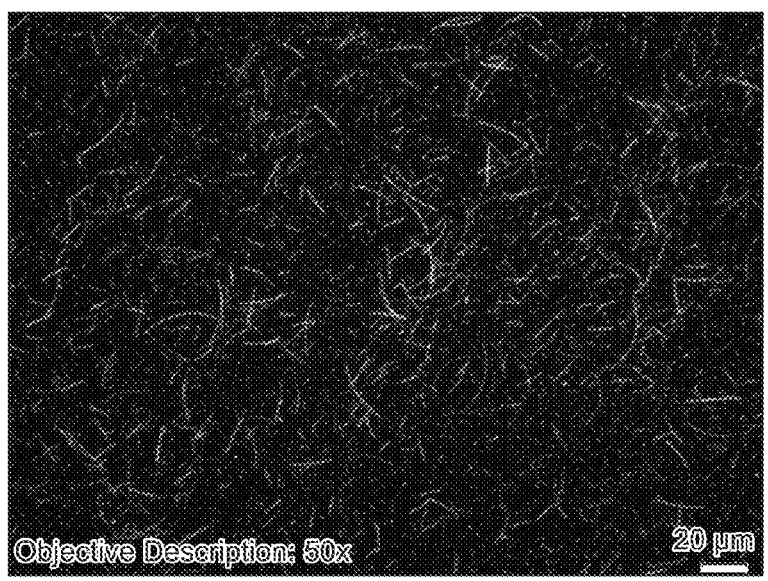
FIG. 8 shows an optical image of a product of a synthesis carried out similar to FIG. 3, but with one-tenth of an amount of NaCl used in FIG. 3.

FIG. 7 shows optical and TEM images of a synthesis carried out similar to FIG. 3, but without the addition of a SPA (here, without the addition of a sodium chloride (or NaCl) solution). No silver nanowires were observed to result from the synthesis. FIG. 8 shows an optical image of a product of a synthesis carried out similar to FIG. 3, but with one-tenth of an amount of the SPA used in FIG. 3. Silver nanowires were observed to result from the synthesis. The as-synthesized batch included some impurities.

In a reaction mixture according to FIG. 3, a ratio between the SPA anion concentration (here, chloride anion) and the overall silver concentration (including both ionic and reduced metal forms) in the synthesis was about 0.05. The ratio between the SPA anion concentration and the overall silver concentration in the synthesis according to FIG. 7 was about 0. The ratio between the SPA anion concentration and the overall silver concentration in the synthesis according to FIG. 8 was about 0.005.

This example demonstrates that a SPA (here, NaCl) promotes the formation of silver nanowire-forming seeds or promotes the formation of intermediates that lead to silver nanowire-forming seeds, which will grow into silver nanowires in a latter phase of a reaction. Other SPAs, such as potassium chloride (or KCl), potassium bromide (or KBr), tetrabutylammonium chloride (or TBAC), cetyltrimethylammonium bromide (or CTAB), and combination thereof, can be used.

Example 2

Production and Characterization of Silver Nanowires

FIG. 9A is an optical image of silver nanowires produced according to FIG. 3, while FIG. 9B and FIG. 9C are optical images of silver nanowires produced according FIG. 3, but with an additional SPA of sodium nitrate (or $NaNO_3$) added at the beginning of a reaction according to the implementation of FIG. 2B. A single-staged reaction is used, with an overall silver concentration (including both ionic and reduced metal forms) of about 0.095 molar.

Figure 9D:
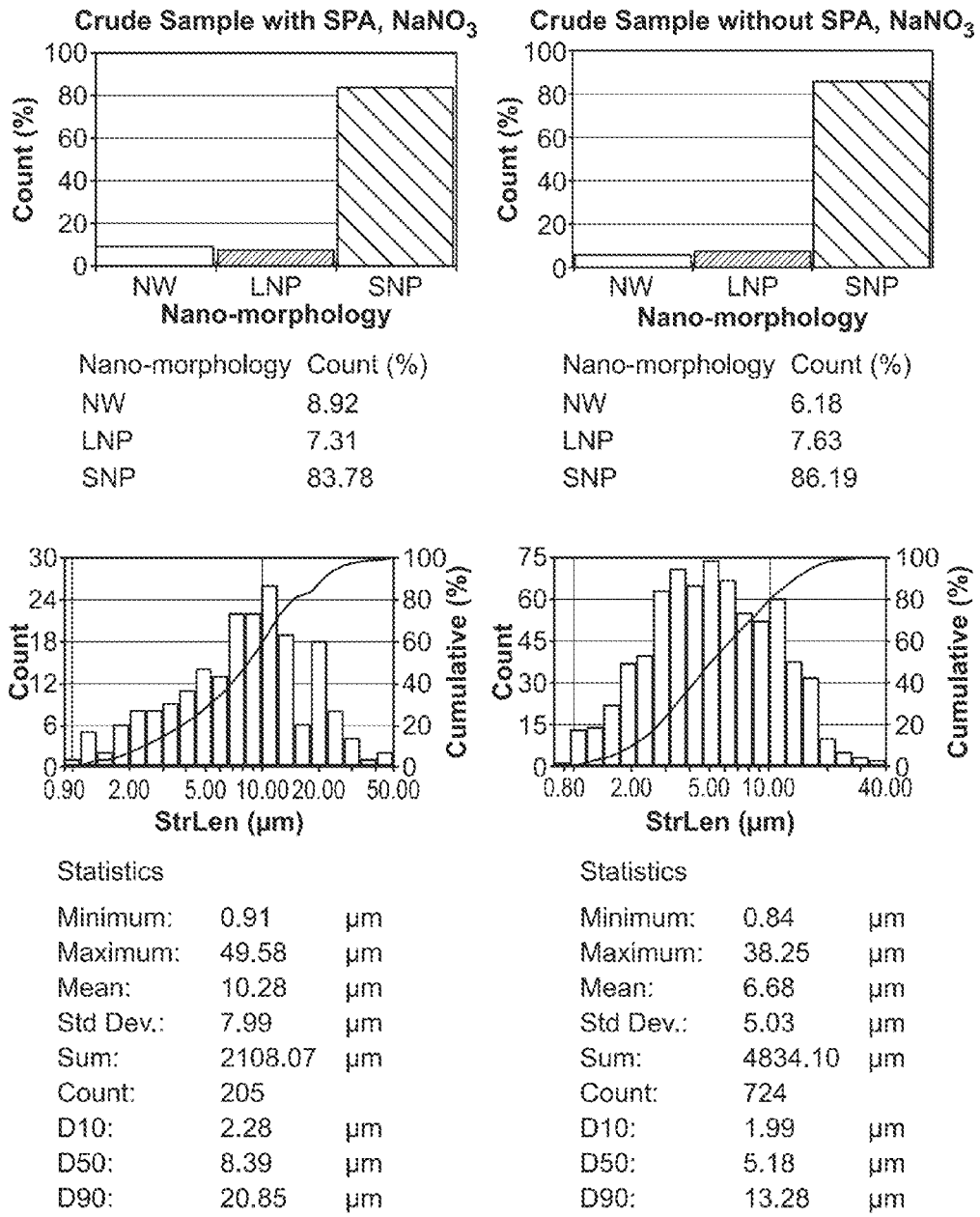
FIG. 9D shows nanowire length distribution and percentages by number of different types of nanostructures and microstructures resulting from a reaction with and without $NaNO_3$ added.

In a reaction mixture according to FIG. 9B, a ratio between the SPA chloride anion (or $Cl^-$) concentration (expressed in terms of moles of chloride anion added to the reaction mixture divided by an overall volume of the reaction mixture) and the overall silver concentration (including both ionic and reduced metal forms) in the synthesis was about 0.05. According to FIG. 9B, a ratio between the SPA nitrate anion (or $NO_3^-$) concentration (expressed in terms of moles of nitrate anion added to the reaction mixture divided by the overall volume of the reaction mixture) and the overall silver concentration (including both ionic and reduced metal forms) was about 1.555, with about 0.555 in excess of nitrate anions provided by silver nitrate. In a reaction mixture according to FIG. 9C, a ratio between the SPA chloride anion concentration (expressed in terms of moles of chloride anion added to the reaction mixture divided by an overall volume of the reaction mixture) and the overall silver concentration (including both ionic and reduced metal forms) was about 0.025. According to FIG. 9C, a ratio between the SPA nitrate anion concentration (expressed in terms of moles of nitrate anion added to the reaction mixture divided by the overall volume of the reaction mixture) and the overall silver concentration (including both ionic and reduced metal forms) was about 1.555, with about 0.555 in excess of nitrate anions provided by silver nitrate. In comparison with FIG. 9A for a process according to FIG. 3, the as-synthesized batches from FIG. 9B and FIG. 9C included a higher number ratio between nanowires and other particulate by-product nanostructures. A comparison between the number percentages of different nanostructures and microstructures formed in a crude solution with and without addition of $NaNO_3$ is presented along with a nanowire length distribution in FIG. 9D. An increase in length and percentage of nanowires in the former can be attributed to the presence of excess SPA nitrate anions.

This example demonstrates that a SPA (here, $NaNO_3$) promotes or enhances a ratio between nanowire-forming seeds and non-nanowire-forming seeds, which will increase in a product a ratio between nanowires and other particulate by-product nanostructures. Other SPAs, such as potassium nitrate (or $KNO_3$), ammonium nitrate (or $NH_4NO_3$), sodium nitrite (or $NaNO_2$), potassium nitrite (or $KNO_2$), ammonium nitrite (or $NH_4NO_2$), and combinations thereof, can be used.

Example 3

Production and Characterization of Silver Nanowires

Glycerol Reaction (1) (Large Scale 15 L, Reduced PVP): First, a stock solution "A" was prepared by dissolving about 477 g of NaCl in about 39.96 g of de-ionized water, followed by addition of about 1,012.75 g of glycerol. Examples of alternatives to NaCl include other alkali metal halides, such as KBr and potassium iodide (or KI); ammonium chloride (or $NH_4Cl$); TBAC; and other metal chlorides. Then, about 18.92 kg of glycerol was warmed up to about 60° C. in a 15 L glass reactor using a heating blanket. Next, about 262.9 g of silver nitrate (or $AgNO_3$) granular powder was added to this solution under vigorous stirring for about 5 min (until $AgNO_3$ is substantially fully dissolved in a solution form). Followed that, to the silver nitrate solution, about 443 g of PVP (MW: about 55 K) in powder form was added. Once the PVP was substantially fully dissolved, the stock solution "A" was added to the reaction mixture and continuously stirred at about 80° C. for about 16 hr. Then, the reaction temperature was raised to about 95° C. and, after about 48 hr, the reaction was stopped. The crude mixture was quenched to room temperature by adding methanol (1:1 v/v). In this reaction, concentrations of the PVP, nitrate anion, chloride anion, and overall silver (including both ionic and reduced metal forms) were respectively about 0.75×, about 1×, about 1×, and about 1× of the corresponding concentrations used for the reaction of FIG. 3.

For structural characterization of resulting silver nanowires, about 2 mL aliquot of the crude mixture was mixed with about 5 mL of methanol, or methanol/acetone (3:1 v/v), or water/acetone (1:1 v/v), and centrifuged at about 1,500 rpm for about 5 min. The supernatant was carefully decanted and washed several times with methanol to remove unwanted glycerol and PVP. The purified nanowires were re-dispersed in methanol by gentle wrist-action shaking and imaged by optical and TEM procedures.

The color of the reaction mixture progressively changed from almost colorless into translucent yellow, translucent light orange, translucent dark brown, opaque brown orange, opaque red, opaque dark purple, opaque dark purple gray, and finally to opaque light gray-olive during the reaction. It is believed that silver nanowire-forming seeds are formed during the first phase of the reaction at about 80° C., and higher growth temperature (about 95° C.) improves the yield and facilitates the growth of silver nanowires.

Figure 10:
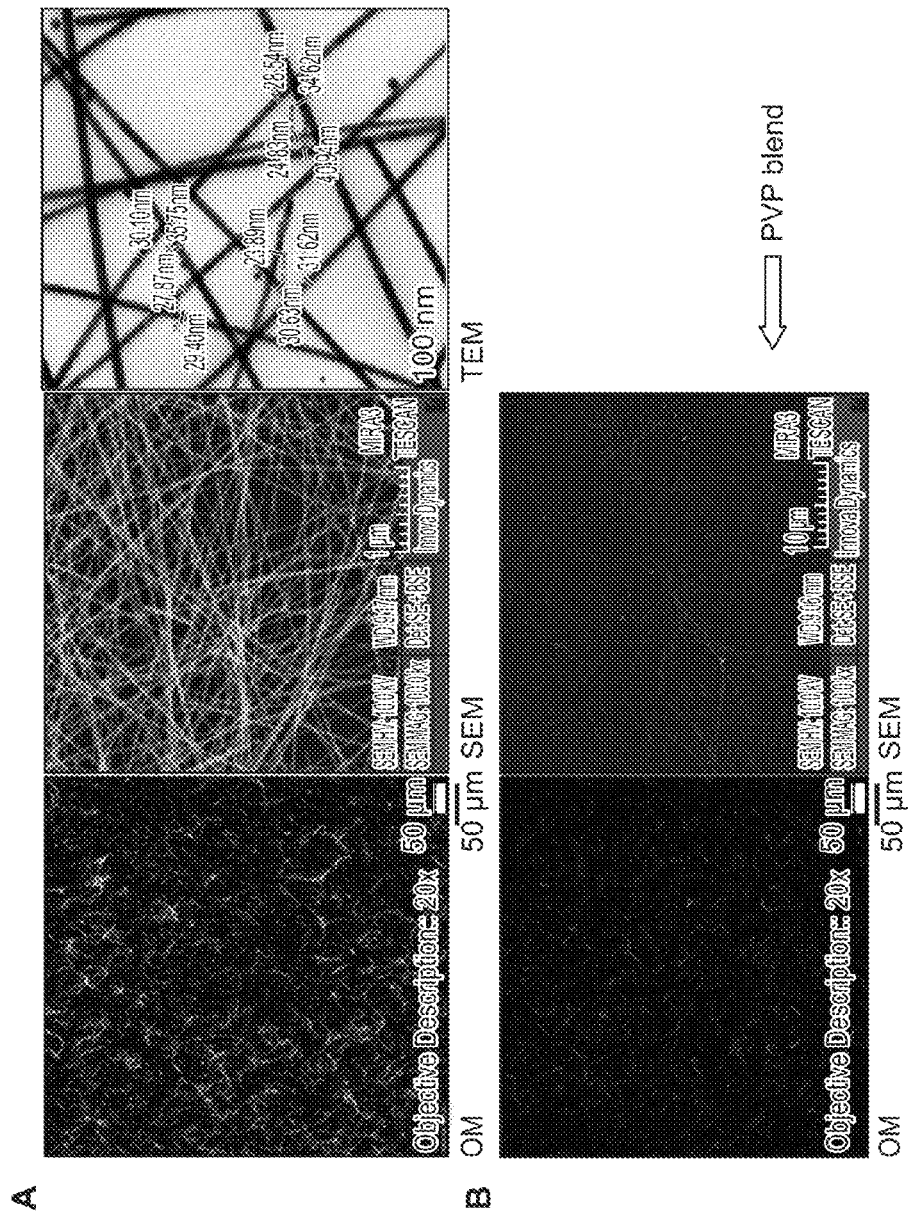
FIG. 10 shows typical microscopy images of resulting silver nanowires produced in a crude solution according to a reaction (1) in Example 3.

In this reaction, a lower PVP:silver molar ratio (e.g., about 1.62:1, with silver including both ionic and reduced metal forms) promoted longer (about 20-40 μm) and thinner (about 20-40 nm) nanowires with a high aspect ratio (up to about 2,000) (Table 1). The as-synthesized batch often includes particulate by-products; however, a lower PVP:$Cl^-$ molar ratio resulted in a higher nanowire to particle number ratio when compared with the reaction of FIG. 3. FIG. 10 shows typical microscopy images of resulting silver nanowires. The 15 L synthesis demonstrated that reduction in the PVP to silver molar ratio is a viable and promising route to grow thin and long nanowires in high yield (>50%). Moreover, by blending PVP with different molecular weights, such as about 55 K and about 40 K in 1:1 ratio, small diameter nanowires with tighter diameter distribution can be obtained without compromising their aspect ratio (FIG. 10B).

Glycerol Reaction (2) (Low Temperature, Reduced Chloride, 2 L): During the first phase of a reaction, about 35 g of $AgNO_3$ was dissolved in about 2.57 kg of glycerol preheated to about 60° C., followed by addition of about 45 g of PVP (MW: about 55 K) in powder form under constant stirring at about 500 rpm. In the meanwhile, a stock solution "A" was prepared by dissolving about 0.119 g of NaCl in about 10 g of de-ionized water, followed by addition of about 252.25 g of glycerol. Then, about 110 ml of solution "A" was injected into the $AgNO_3$/PVP mixture, and the resulting mixture was further heated to about 80° C. (Table 1). After about 96 hr of the reaction at about 80° C., the crude mixture was quenched to room temperature by adding methanol (1:1 v/v). In this reaction, concentrations of the PVP, nitrate anion, chloride anion, and overall silver (including both ionic and reduced metal forms) were respectively about 0.75×, about 1×, about 0.1×, and about 1× of the corresponding concentrations used for the reaction of FIG. 3.

Figure 11:
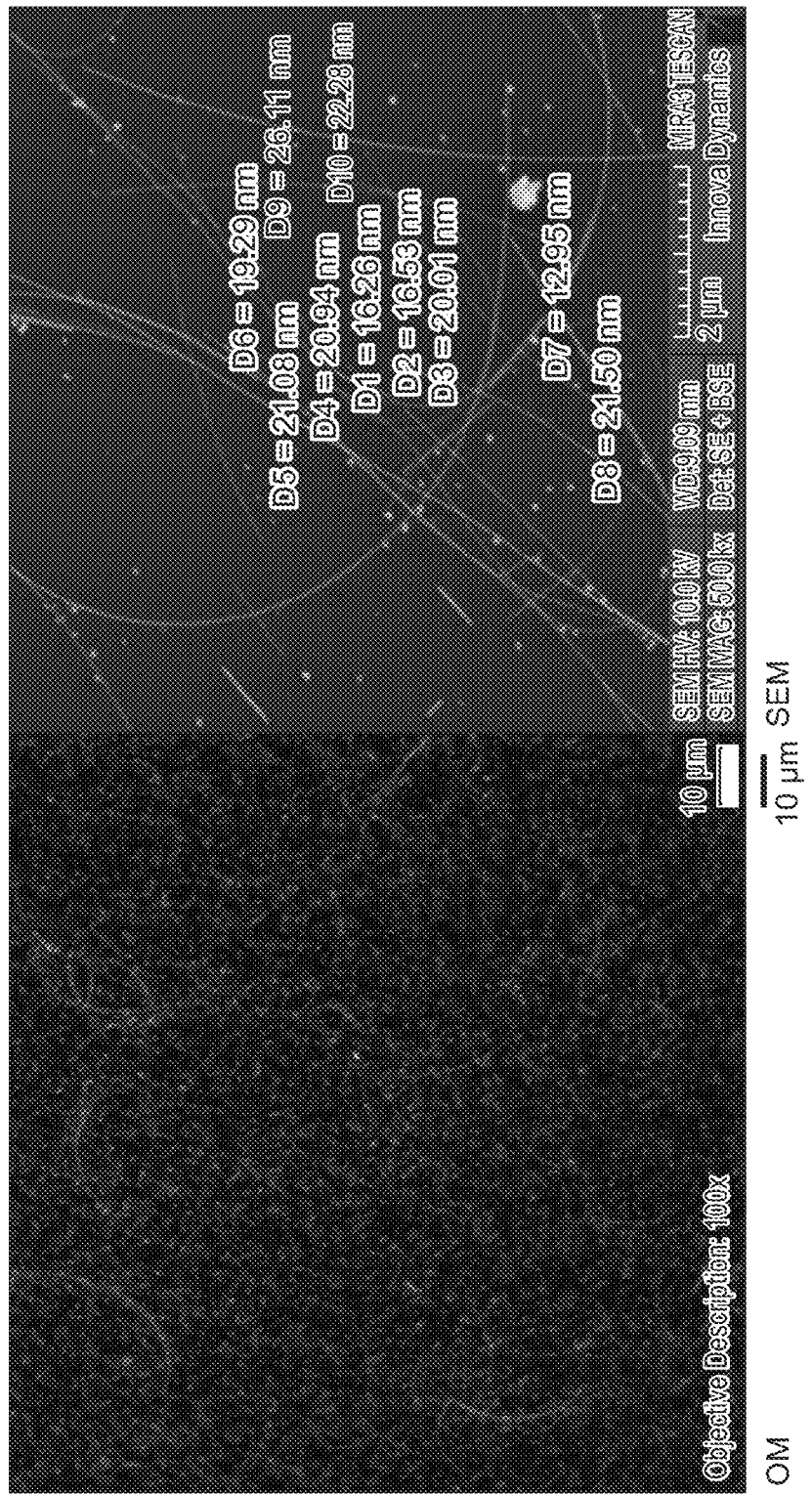
FIG. 11 shows typical microscopy images of resulting silver nanowires produced in a crude solution according to a reaction (2) in Example 3.

It is noticed that the final crude mixture was darker in color that a typical reaction mixture, suggesting the growth of thin nanowires. Reduced growth temperature and higher silver:Cl⁻ molar ratio compared to the reaction (1) resulted in smaller diameter nanowires (about 15-25 nm) with a narrower diameter distribution as seen in FIG. 11.

Glycerol Reaction (3) (Lower Nitrate Ratio, 40 mL): A stock solution "A" was prepared by dissolving about 69.45 g of PVP (MW: about 55 K) in about 3,974.82 g of glycerol at about 60° C. in a 4 L beaker using a heating mantle. Once the PVP is substantially fully dissolved, a resulting transparent solution was cooled down to room temperature. A stock solution "B" was prepared by dissolving about 1.189 g of NaCl in about 10 g of de-ionized water, followed by addition of about 252.25 g of glycerol. The resulting mixture was then well shaken to form a substantially homogeneous solution.

Initially, about 0.4 g of $AgNO_3$ granular powder was dissolved in about 3 ml of propylene glycol (or PG) using a wrist-action shaker. In the meanwhile, about 50 g of solution "A" was heated to about 60° C. in a 150 mL three neck round bottom flask. At about 60° C., about 2.1 ml of stock solution "B" was injected along with the $AgNO_3$ solution into stock solution "A," and then the reaction temperature was raised to about 80° C. After about 16 hr of the reaction, the temperature was raised to about 95° C. for about 48 hr, and finally the crude mixture was cooled down to room temperature using methanol (1:1 v/v). In this reaction, concentrations of the PVP, nitrate anion, chloride anion, and overall silver (including both ionic and reduced metal forms) were respectively about 0.75×, about 0.5×, about 1×, and about 0.5× of the corresponding concentrations used for the reaction of FIG. 3.

Figure 12:
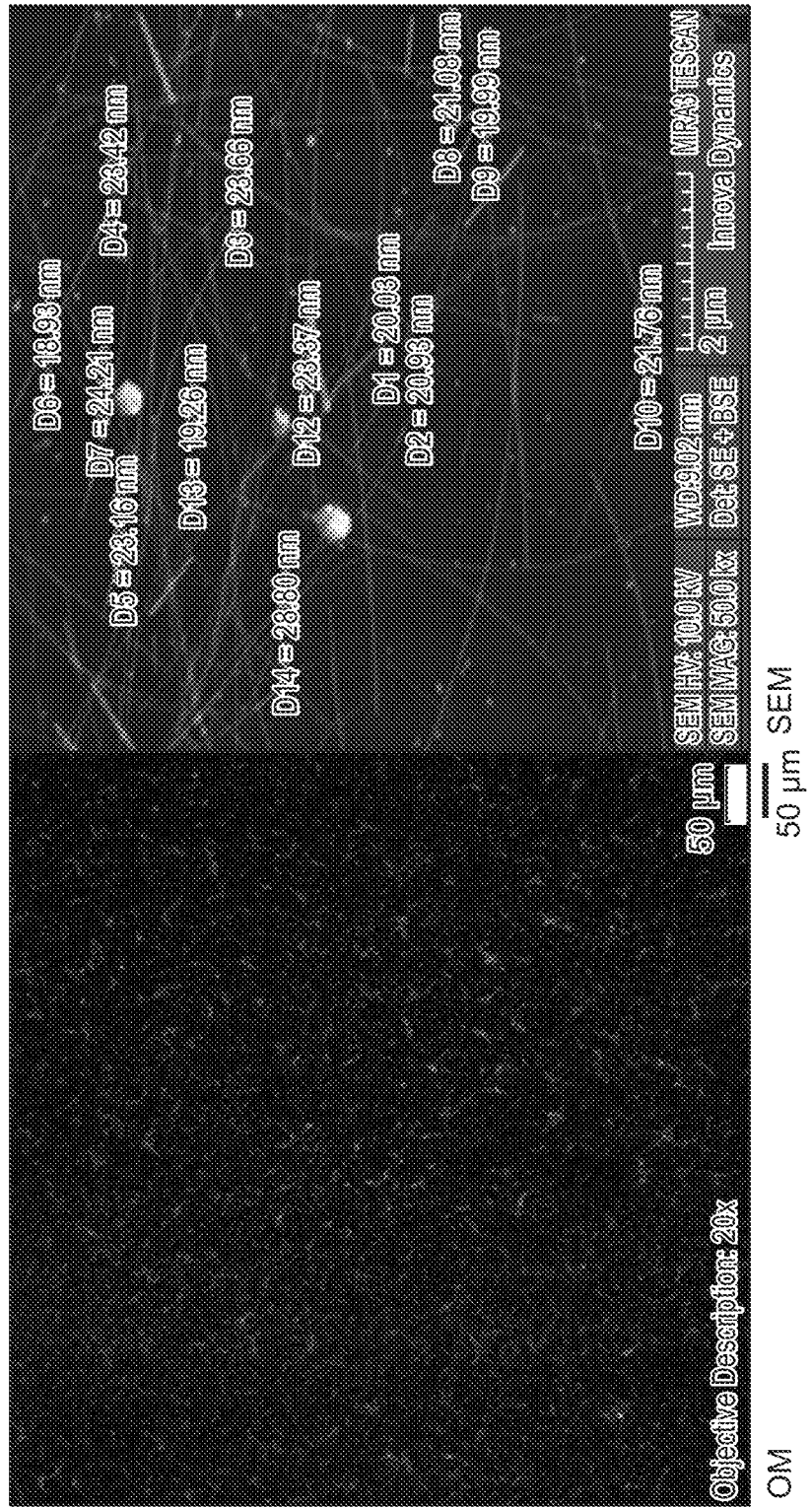
FIG. 12 shows typical microscopy images of resulting silver nanowires produced in a crude solution according to a reaction (3) in Example 3.

It is noticed that nitrate anions play a role in the formation of silver nanowires. A higher concentration of nitrate anions might be contemplated to improve a yield and length of silver nanowires. Interestingly in this reaction, a higher PVP:silver molar ratio (about 3.23:1, with silver including both ionic and reduced metal forms) along with a lower $NO_3^-$:Cl⁻ molar ratio produced small diameter nanowires with a diameter distribution of about 17-27 nm without compromising their length or yield (see FIG. 12) (Table 1). Further, as the nanowire diameter is less sensitive to temperature, a higher growth temperature can be used to improve the purity whereas the nanowire yield can be further optimized by adjusting the $NO_3^-$:Cl⁻ molar ratio. A higher PVP:silver molar ratio, including greater than or equal to about 10, greater than about 12, or greater than about 15 also can be advantageous.

Glycerol Reaction (4) (Lower Seeding Temperature, 40 mL): A stock solution "A" was prepared by dissolving about 92.63 g of PVP (MW: about 55 K) in about 3,974.82 g of glycerol at about 60° C. in a 4 L beaker using a heating mantle. Once the PVP is substantially fully dissolved, a resulting transparent solution was cooled down to room temperature. A stock solution "B" was prepared in a similar manner as explained for the reaction (1) in this example.

First, about 0.8 g of $AgNO_3$ granular powder was dissolved in about 3 ml of propylene glycol using a wrist-hand shaker and then added to about 50 g of solution "A" pre-heated at about 60° C. in a 150 mL three neck round bottom flask. Next, about 2.1 ml of stock solution "B" was injected along with the $AgNO_3$ solution at about 60° C. and reacted for about 48 hr in a seeding phase. During a growth phase, the reaction temperature was raised to about 90° C. for about 30 hr and then cooled down to room temperature by adding methanol (1:1 v/v) (Table 1). In this reaction, concentrations of the PVP, nitrate anion, chloride anion, and overall silver (including both ionic and reduced metal forms) were the same as the corresponding concentrations used for the reaction of FIG. 3.

Figure 13:
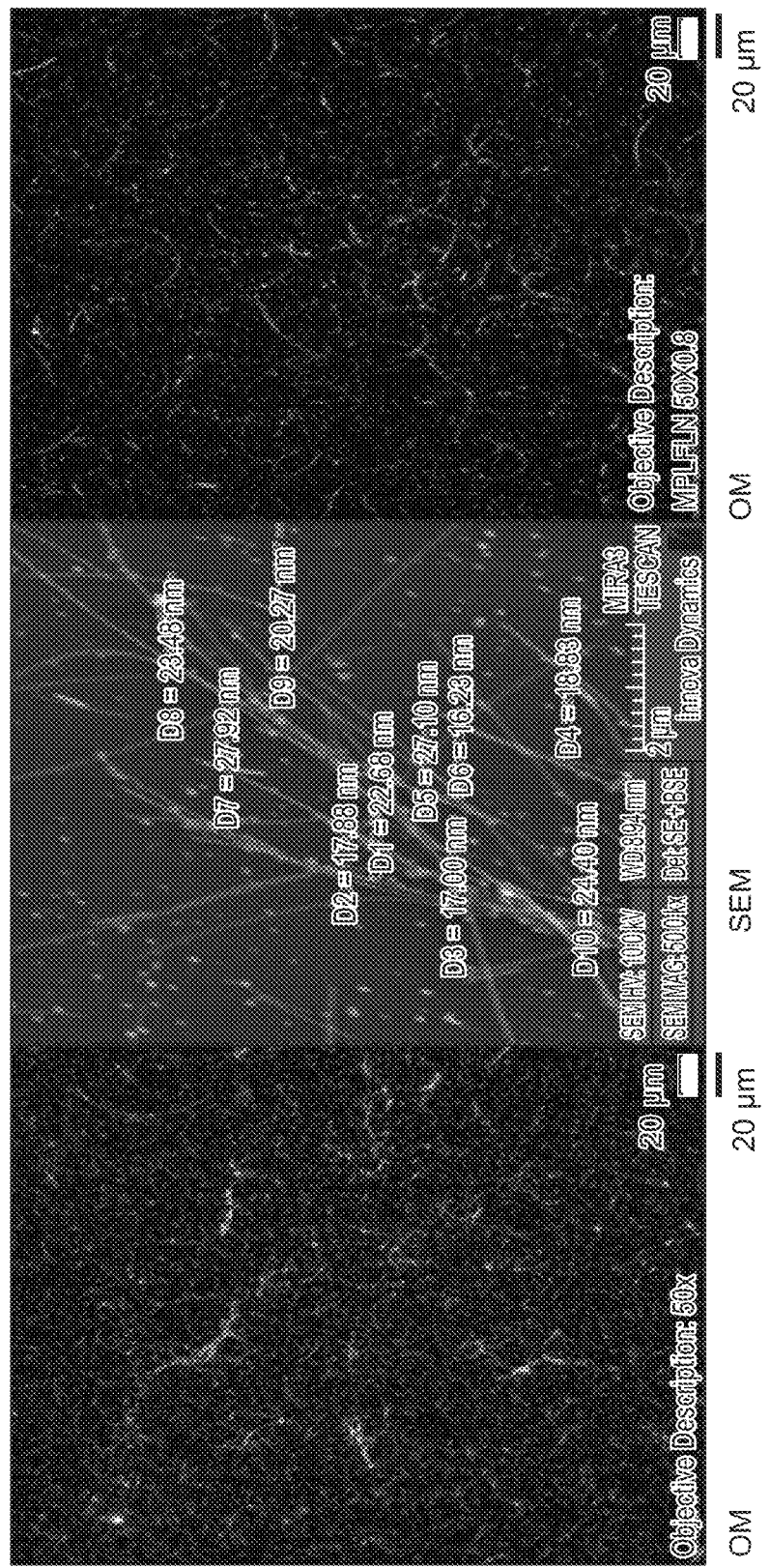
FIG. 13 shows optical and scanning electron microscope (or SEM) images of resulting nanowires produced in a crude solution according to a reaction (4) in Example 3.

The lower seeding and growth temperature than a typical synthesis resulted in small diameter nanowires (about 16-30 nm). Generally, it might be contemplated that a lower reaction temperature can lead to a poor yield, but due to a magnitude of a temperature difference from a seeding temperature (about 30° C.) and a relatively higher growth temperature, nanowire-to-particle number ratio was significantly improved compared to other low temperature reactions. FIG. 13 shows optical and scanning electron microscope (or SEM) images of resulting nanowires. The growth temperature can be further optimized to obtain silver nanowires with even higher aspect ratio (labeled "GK105B" in FIG. 13).

Glycerol Reaction (5) (Silver Perchlorate, Sodium Nitrate, 40 mL): Stock solutions "A" and "B" were prepared in a similar manner as explained for the reaction (3) in this example. First, about 0.487 g of silver perchlorate (or $AgClO_4$) powder was dissolved in about 3 ml of propylene glycol using a wrist-hand shaker. Then, about 50 g of the solution "A" was heated to about 60° C. in a 150 mL three neck round bottom flask. In the meanwhile, a stock solution "C" was prepared by dissolving about 6.81 g of sodium nitrate (or $NaNO_3$) in about 2 g of de-ionized water, followed by about 82.8 g of propylene glycol (or PG). The resulting mixture is well shaken before use. At about 60° C., about 2.1 ml of the stock solution "B" was injected along with about 4.5 ml of the stock solution "C" into the $AgClO_4$ solution. Next, the temperature was raised to about 120° C., and the reaction was stopped after about 24 hr (Table 1). The crude mixture was cooled down to room temperature using methanol (1:1 v/v). In this reaction, concentrations of the PVP, nitrate anion, chloride anion, and overall silver (including both ionic and reduced metal forms) were respectively about 0.75×, about 1×, about 1×, and about 0.5× of the corresponding concentrations used for the reaction of FIG. 3.

Figure 14:
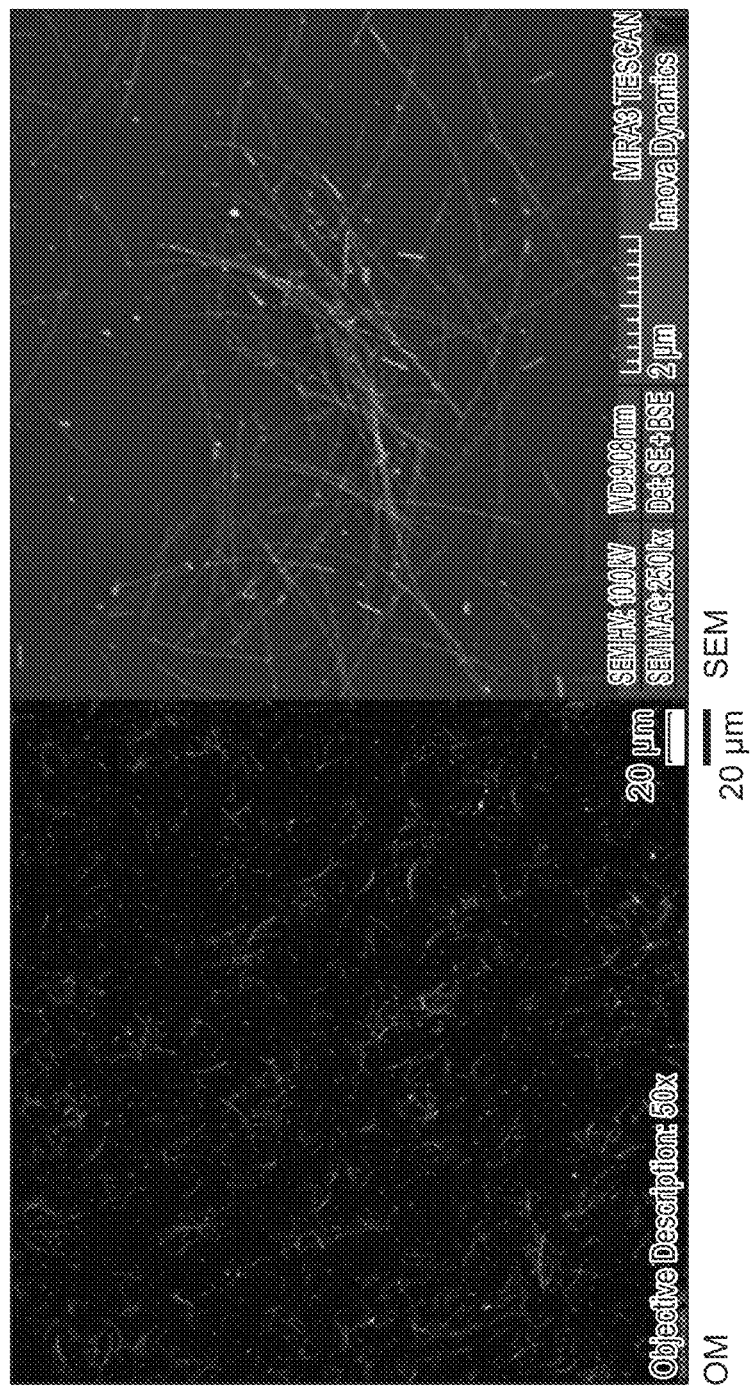
FIG. 14 shows typical microscopy images of resulting silver nanowires produced in a crude solution according to a reaction (5) in Example 3.

Here, a higher reaction temperature resulted in high-yield synthesis of silver nanowires with fewer impurities. No nanowire growth was observed in the absence of nitrate, which confirmed that nitrate anions play a role in the formation of silver nanowires. Further, a higher PVP:silver molar ratio along with a higher $NO_3^-$:silver molar ratio promoted the growth of small diameter nanowires with a diameter distribution from about 17-23 nm without compromising the yield (FIG. 14).

TABLE 1

Reaction parameter matrix with modified concentrations of different reagents in comparison with those used in FIG. 3

| Reaction No. | PVP | $NO_3^-$ | Cl⁻ | Ag | Temp. (° C.) | Morphology and Yield |
|---|---|---|---|---|---|---|
| 1 | 0.75× | 1× | 1× | 1× | 80/95 | D: 20-40 nm, L: 20-40 μm, high yield |

TABLE 1-continued

Reaction parameter matrix with modified concentrations of different reagents in comparison with those used in FIG. 3

| Reaction No. | PVP | $NO_3^-$ | $Cl^-$ | Ag | Temp. (° C.) | Morphology and Yield |
|---|---|---|---|---|---|---|
| 2 | 0.75× | 1× | 0.1× | 1× | 80 | D: 15-25 nm, L: 7-12 μm, |
| 3 | 0.75× | 0.5× | 1× | 0.5× | 80/95 | D: 17-27 nm, L: 10-15 μm, high yield |
| 4 | 1× | 1× | 1× | 1× | 60/90 | D: 16-30 nm, L: 10-20 μm, high yield |
| 5 | 0.75× | 1× | 1× | 0.5× | 120 | D: 17-23 nm, L: 5-12 μm, high yield |
| 6 | 0.75× | 1× | 0.5× | 1× | 120 | D: 25-40 nm, L: 10-20 μm, high yield, very low particle count |

Example 4

Production and Characterization of Silver Nanowires

Figure 15:
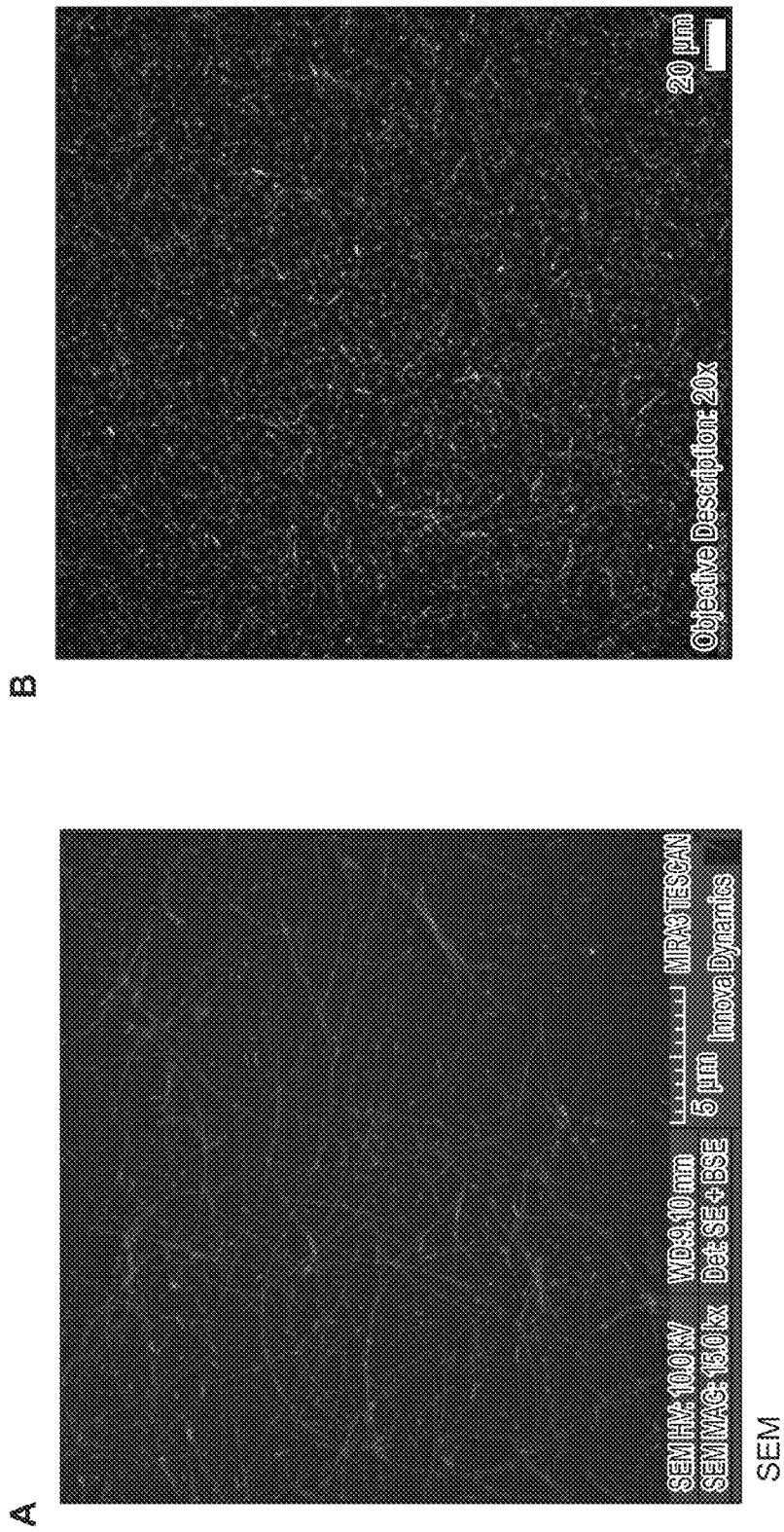
FIG. 15 are optical and electron microscopy images of silver nanowires produced in a crude solution according to the implementation of FIG. 2C.

FIG. 15 are optical and electron microscopy images of silver nanowires produced according to the implementation of FIG. 2C. A single-staged reaction is used, with an overall silver concentration (including both ionic and reduced metal forms) of about 0.1 molar. In a reaction mixture according to FIG. 15, a ratio between a SPA chloride anion concentration (expressed in terms of moles of chloride anion added to the reaction mixture divided by an overall volume of the reaction mixture) and the overall silver concentration (including both ionic and reduced metal forms) was about 0.05. A ratio between a SPA nitrate anion concentration (expressed in terms of moles of nitrate anion added to the reaction mixture divided by the overall volume of the reaction mixture) and the overall silver concentration was about 1.5. In comparison with an as-synthesized batch using a lower nitrate to silver molar ratio, the as-synthesized batch from FIG. 15B included a significantly larger population of small diameter nanowires with a similar length distribution.

This example demonstrates that a SPA (here, $NaNO_3$) promotes or enhances a ratio between nanowire-forming seeds and non-nanowire-forming seeds, which will increase in a product a ratio between nanowires and other particulate by-product nanostructures. Other SPAs, such as those listed above, can be used.

Example 5

Production and Characterization of Silver Nanowires

Figure 16:
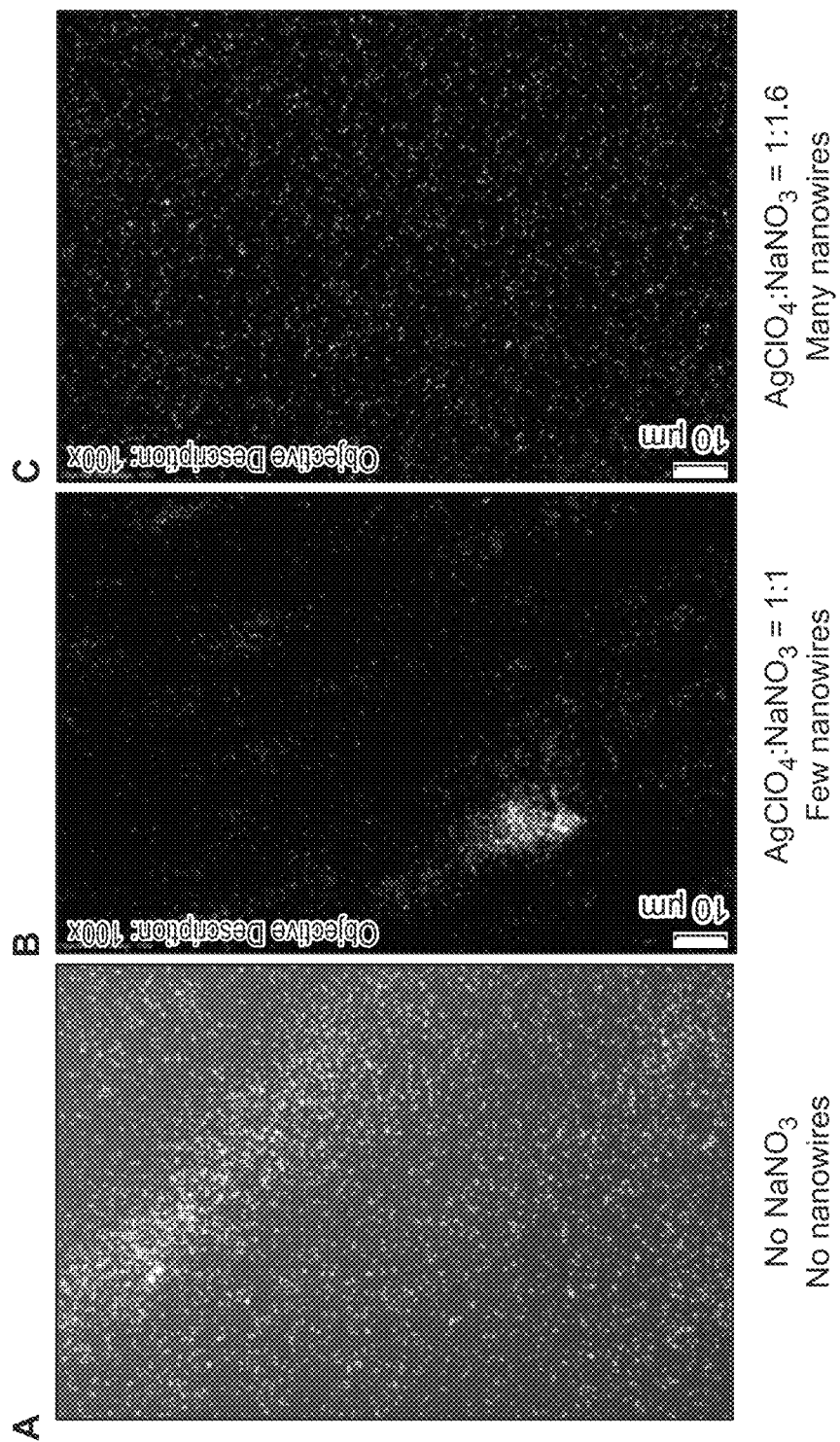
FIGS. 16A, 16B, and 16C are optical images of silver nanowires produced in a crude solution according to the implementation of FIG. 2F.

FIGS. 16A-16C are optical images of silver nanowires produced according to the implementation of FIG. 2F. A two-staged reaction is used, with a silver concentration (including both ionic and reduced metal forms) in a first stage of about 0.0426 molar, and a final silver concentration (including both ionic and reduced metal forms) in a second stage of about 0.080 molar. As a comparison, FIG. 16A shows the optical image of a reaction carried out without $NaNO_3$ as a SPA. In a reaction mixture according to FIG. 16A, a ratio between a SPA chloride anion concentration (expressed in terms of moles of chloride anion added to the reaction mixture divided by an overall volume of the reaction mixture) and an overall silver concentration (including both ionic and reduced metal forms) was about 0.05. According to FIG. 16A, a ratio between the SPA nitrate anion concentration (expressed in terms of moles of nitrate anion added to the reaction mixture divided by the overall volume of the reaction mixture) and the overall silver concentration (including both ionic and reduced metal forms) was about 0. In a reaction mixture according to FIG. 16B, a ratio between the SPA chloride anion concentration (expressed in terms of moles of chloride anion added to the reaction mixture divided by an overall volume of the reaction mixture) and an overall silver concentration (including both ionic and reduced metal forms) was about 0.05. According to FIG. 16B, a ratio between the SPA nitrate anion concentration (expressed in terms of moles of nitrate anion added to the reaction mixture divided by the overall volume of the reaction mixture) and the overall silver concentration (including both ionic and reduced metal forms) was about 1.0. In a reaction mixture according to FIG. 16C, a ratio between the SPA chloride anion concentration (expressed in terms of moles of chloride anion added to the reaction mixture divided by an overall volume of the reaction mixture) and the overall silver concentration (including both ionic and reduced metal forms) was about 0.05. According to FIG. 16C, a ratio between the SPA nitrate anion concentration (expressed in terms of moles of nitrate anion added to the reaction mixture divided by the overall volume of the reaction mixture) and the overall silver concentration (including both ionic and reduced metal forms) was about 1.6. In comparison with a process of FIG. 16A, which yielded no observable silver nanowires, the as-synthesized batch from FIG. 16B included mostly particles with a few short nanowires, and further the as-synthesized batch from FIG. 16C included a significantly higher number ratio of silver nanowires comparing to particles.

This example demonstrates that a SPA (here, $NaNO_3$) promotes or enhances a ratio between nanowire-forming seeds and non-nanowire-forming seeds, which will increase in a product a ratio between nanowires and other particulate by-product nanostructures. Other SPAs, such as those listed above, can be used.

Example 6

Production and Characterization of Silver Nanowires

Figure 17:
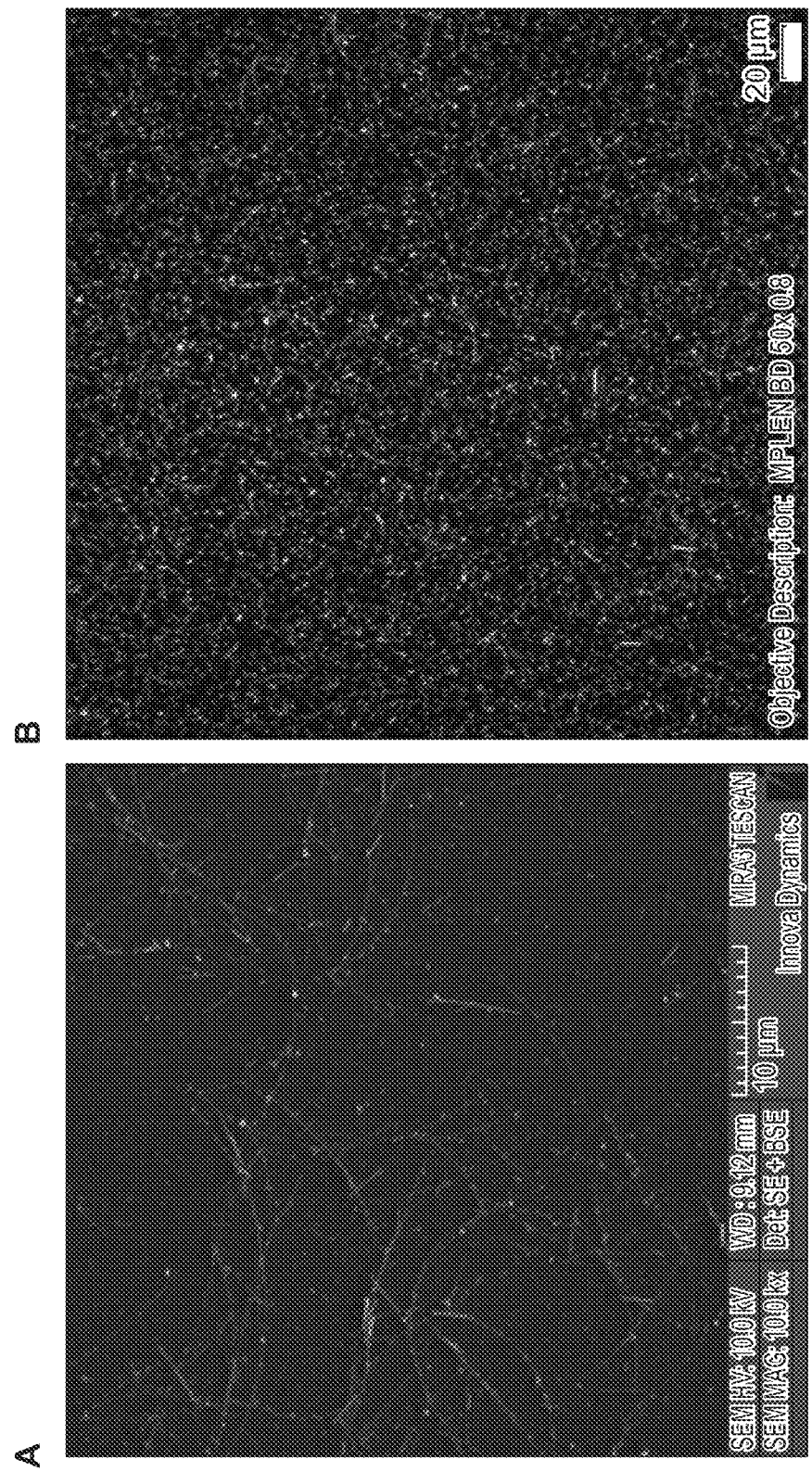
FIG. 17 are optical and SEM images of silver nanowires produced in a crude solution according to the implementation of FIG. 2G.

FIG. 17 are optical and SEM images of silver nanowires produced according to the implementation of FIG. 2G. A two-staged reaction is used, with a silver concentration (including both ionic and reduced metal forms) in a first stage of about 0.04 molar, and a final, overall silver concentration (including both ionic and reduced metal forms) in a second stage of about 0.042 molar. In a reaction mixture according to FIG. 17, a ratio between a SPA chloride anion concentration (expressed in terms of moles of chloride anion added to the reaction mixture divided by an overall volume of the reaction mixture) and the final, overall silver concentration (including both ionic and reduced metal forms) was about 0.01. A ratio between a SPA nitrate anion concentration (expressed in terms of moles of nitrate anion added to the reaction mixture divided by the overall volume of the reaction mixture) and the final, overall silver concentration (including both ionic and reduced metal forms) was about 1.1. The as-synthesized batch from FIG. 17B included longer nanowires when compared with the as-synthesized batch from FIG. 16B, without compromising diameter.

Example 7

Production and Characterization of Silver Nanowires

Figure 18:
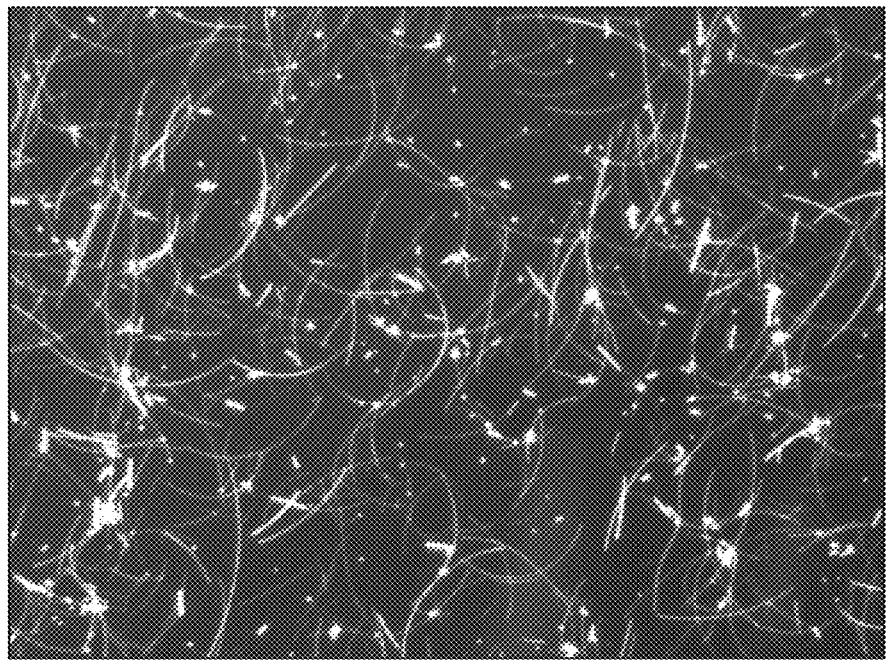
FIG. 18 is an optical image of silver nanowires produced in a crude solution according to the implementation of FIG. 2H.

FIG. 18 is an optical image of silver nanowires produced according to the implementation of FIG. 2H. In this example, a four-staged reaction is used, with a silver concentration (including both ionic and reduced metal forms) in a first stage of about 0.0456 molar, with a silver concentration (including both ionic and reduced metal forms) in a second stage of about 0.0890 molar, with a silver concentration (including both ionic and reduced metal forms) in a third stage of about 0.130 molar, and a final, overall silver concentration (including both ionic and reduced metal forms) in a fourth stage of about 0.169 molar. In a reaction mixture according to FIG. 18, a ratio between a SPA chloride anion concentration and the final, overall silver concentration (including both ionic and reduced metal forms) was about 0.0313.

Example 8

Production and Characterization of Silver Nanowires

Figure 19:
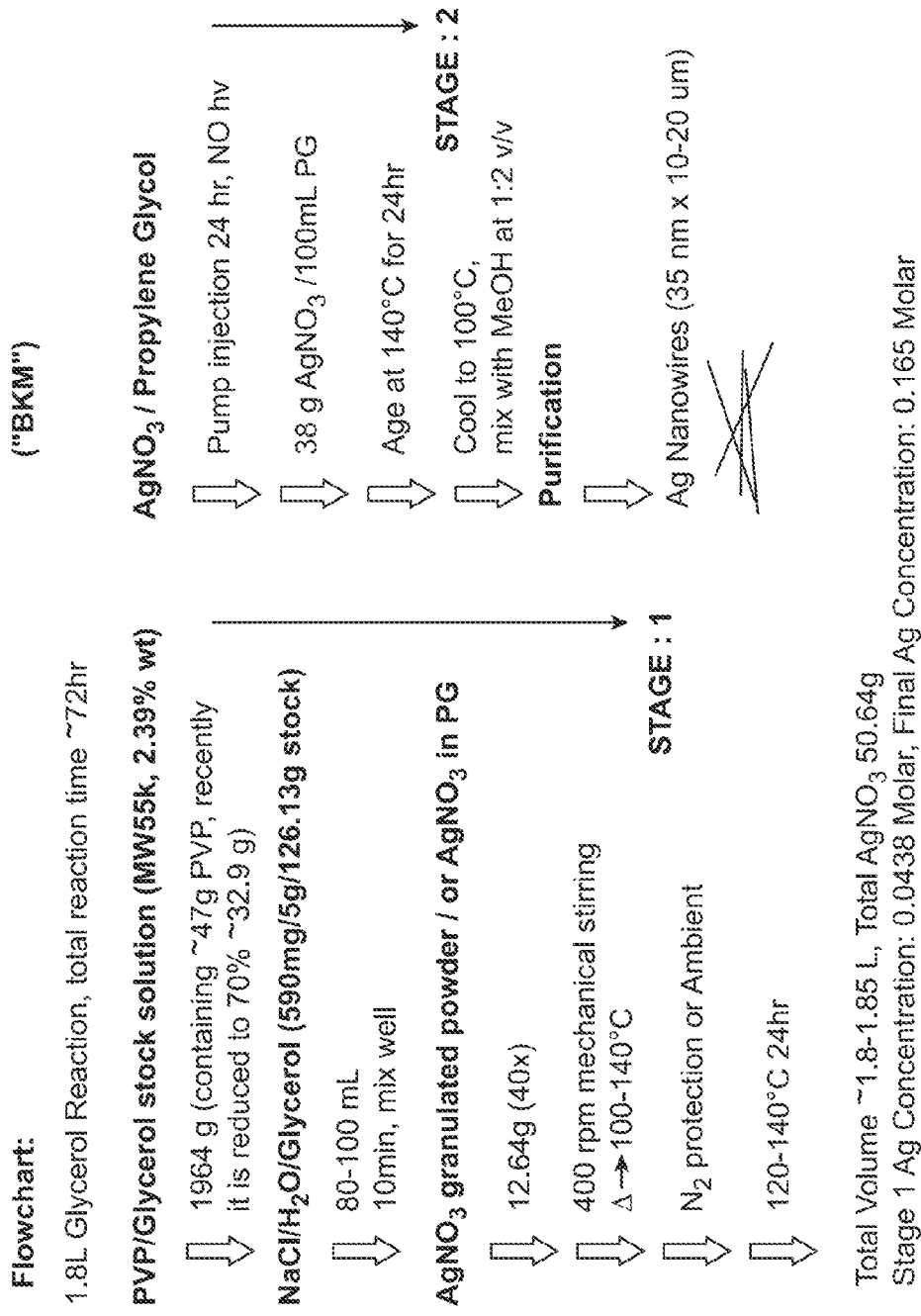
FIG. 19 is a flowchart of a process for the production of silver nanowires according to the implementation of FIG. 2H, where silver nitrate (or $AgNO_3$) in a powder or solution form is added to a poly(vinylpyrrolidone) (or PVP) solution in a first stage.

FIG. 19 is a flowchart of a process for the production of silver nanowires according to the implementation of FIG. 2H, where $AgNO_3$ in a powder or solution form is added to a PVP solution in a first stage. A two-staged reaction is used, with a silver concentration (including both ionic and reduced metal forms) in the first stage of about 0.0438 molar, and a final, overall silver concentration (including both ionic and reduced metal forms) in a second stage of about 0.165 molar.

Figure 20:
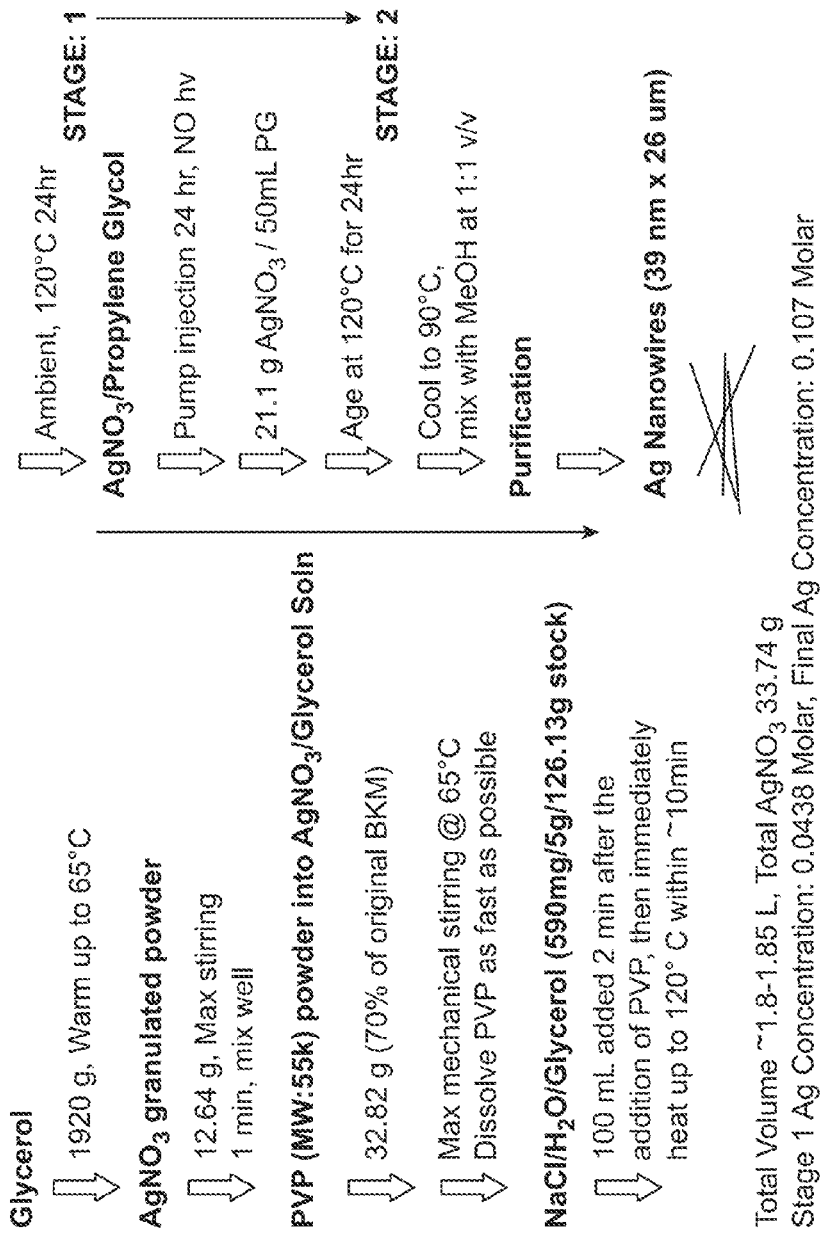
FIG. 20 is a flowchart of a process for the production of silver nanowires according to the implementation of FIG. 2H, where PVP in a powder form is added to an $AgNO_3$ solution in a first stage.

FIG. 20 is a flowchart of a process for the production of silver nanowires according to the implementation of FIG. 2H, where PVP in a powder form is added to an $AgNO_3$ solution in a first stage. A two-staged reaction is used, with a silver concentration (including both ionic and reduced metal forms) in the first stage of about 0.0438 molar, and a final, overall silver concentration (including both ionic and reduced metal forms) in a second stage of about 0.107 molar. In comparison with FIG. 19, PVP is combined with other reagents in a solid form, rather than in a solution form, and the final silver concentration is about 0.107 molar versus about 0.165 molar.

FIG. 21 compares color observations during the production of silver nanowires according to FIG. 19 and during the production of silver nanowires according to FIG. 20.

Figure 22:
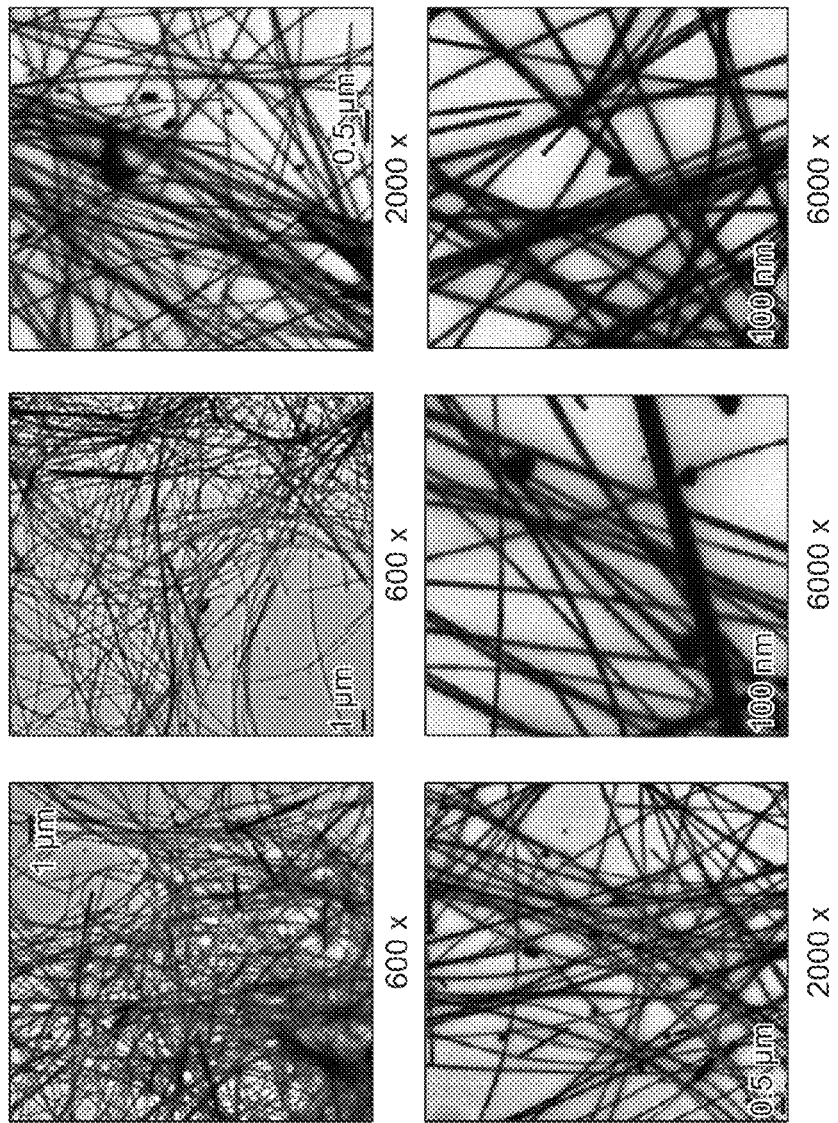
FIG. 22 are TEM images of an as-synthesized batch of silver nanowires produced according to FIG. 20.

FIG. 22 are TEM images of an as-synthesized batch of silver nanowires produced according to FIG. 20. The as-synthesized batch included some impurities. However, the general appearance is similar to batches produced according to FIG. 19, and the percentage of impurities appears to be low.

Figure 23:
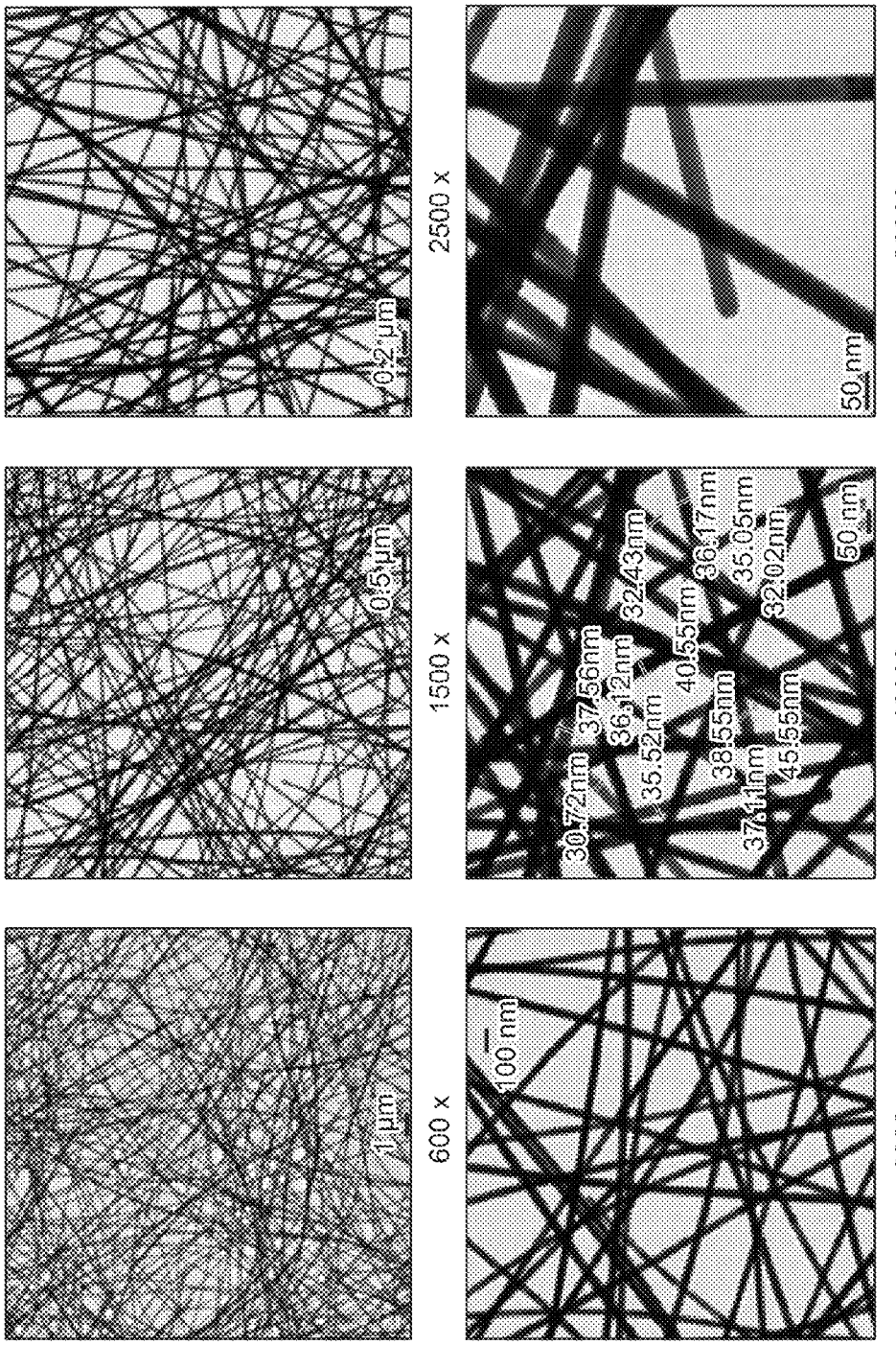
FIG. 23 are TEM images of a purified batch of silver nanowires produced according to FIG. 20.

FIG. 23 are TEM images of a purified batch of silver nanowires produced according to FIG. 20.

Figure 24:
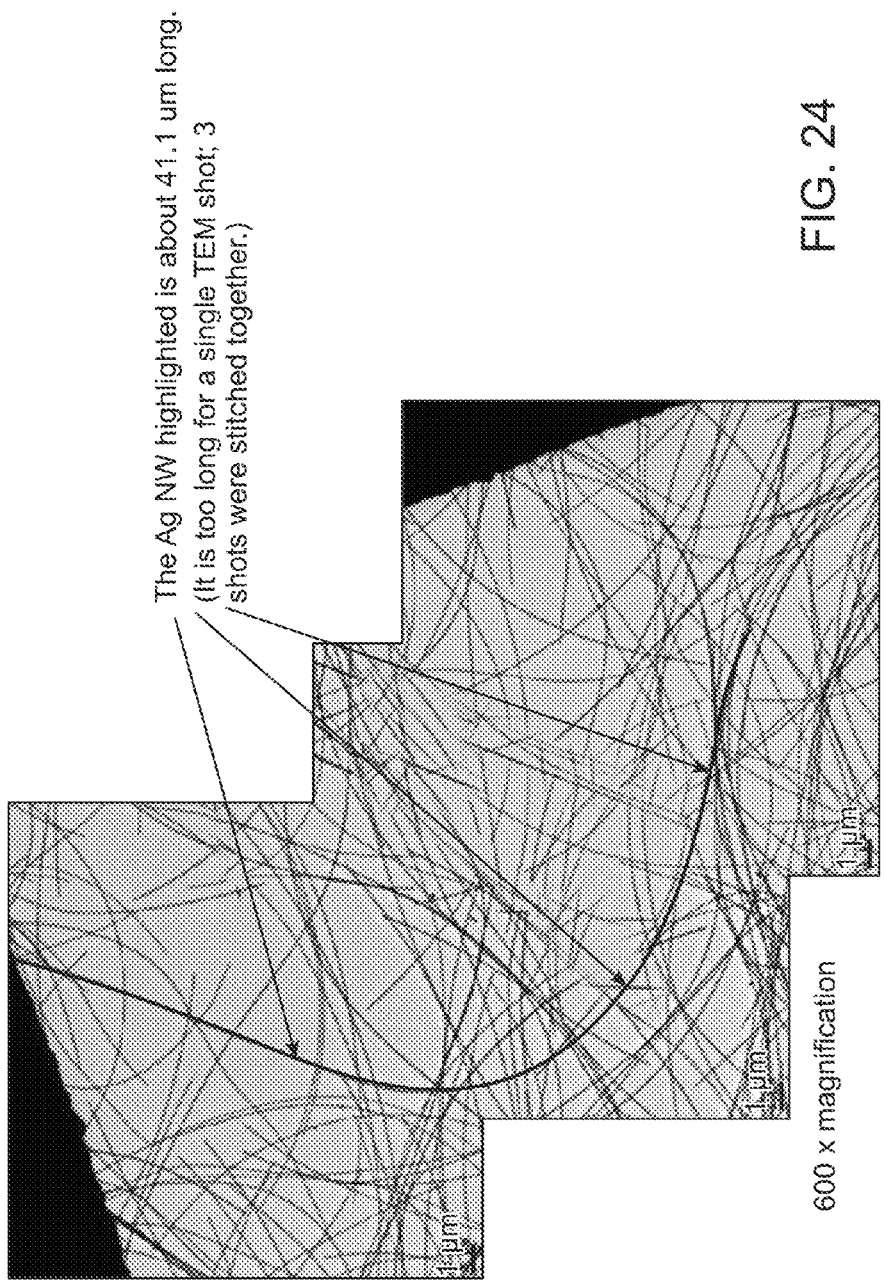
FIG. 24 are stitched TEM images of a representative long silver nanowire produced according to FIG. 20.

FIG. 24 are stitched TEM images of a representative long silver nanowire produced according to FIG. 20. The silver nanowire had a length of about 41.1 μm.

Figure 25:
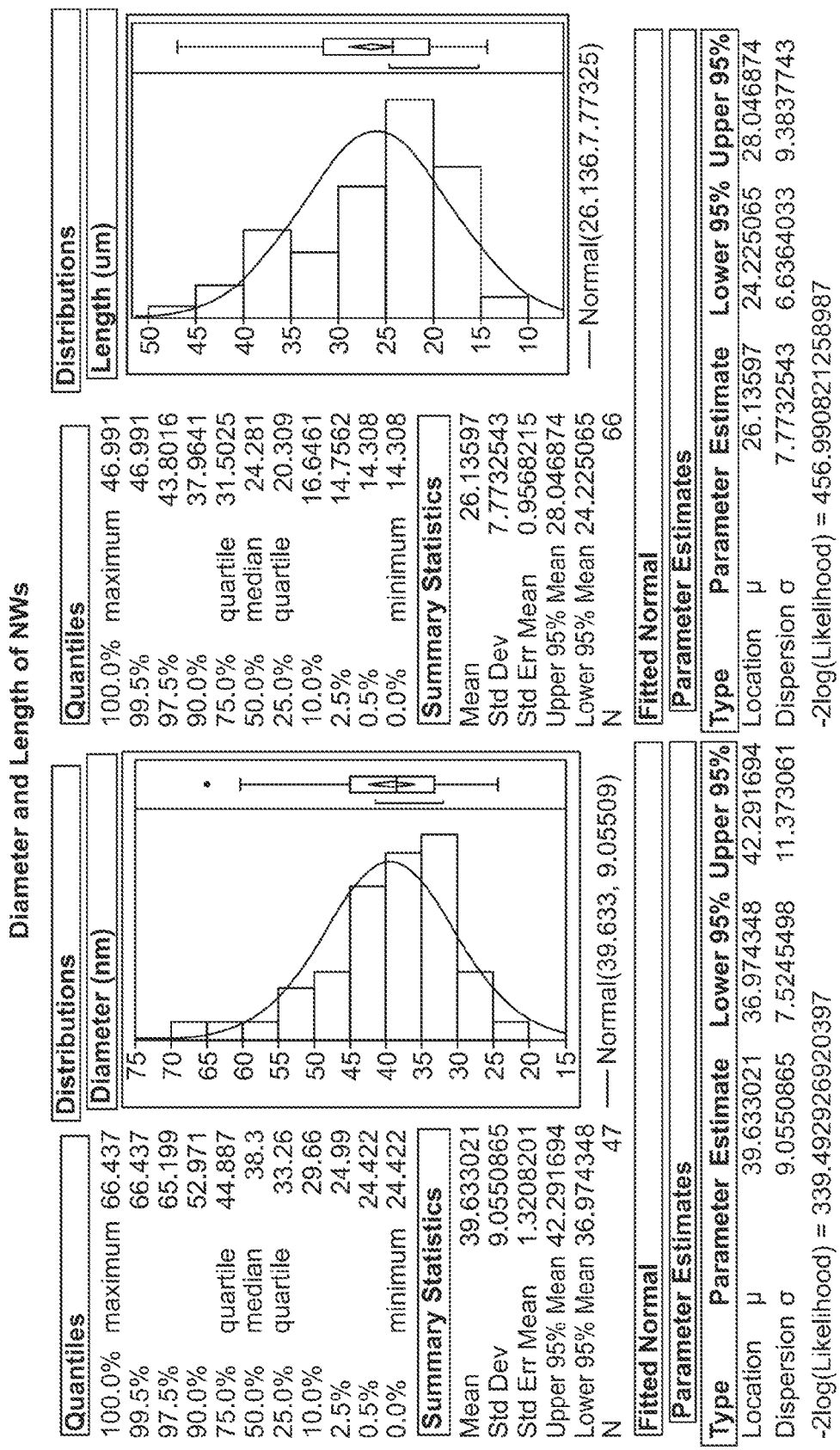
FIG. 25 shows statistical data for morphologies of silver nanowires produced according to FIG. 20.

FIG. 25 shows statistical data for morphologies of silver nanowires produced according to FIG. 20. An average diameter of the nanowires was about 39.6±9.1 nm, and an average length of the nanowires was about 26.1±7.8 μm.

Figure 26:
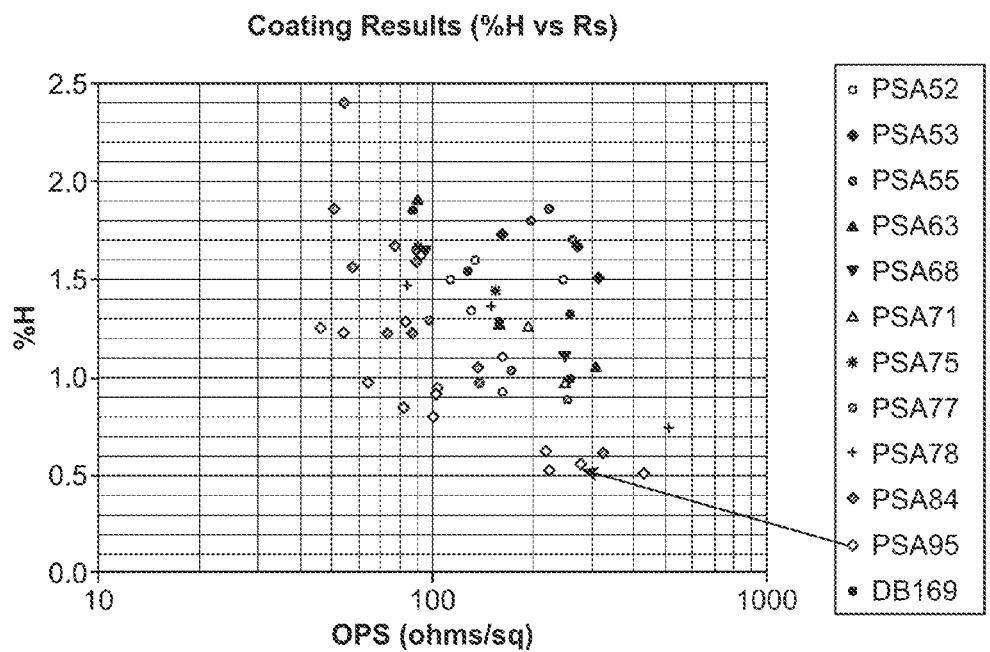
Figure 27:
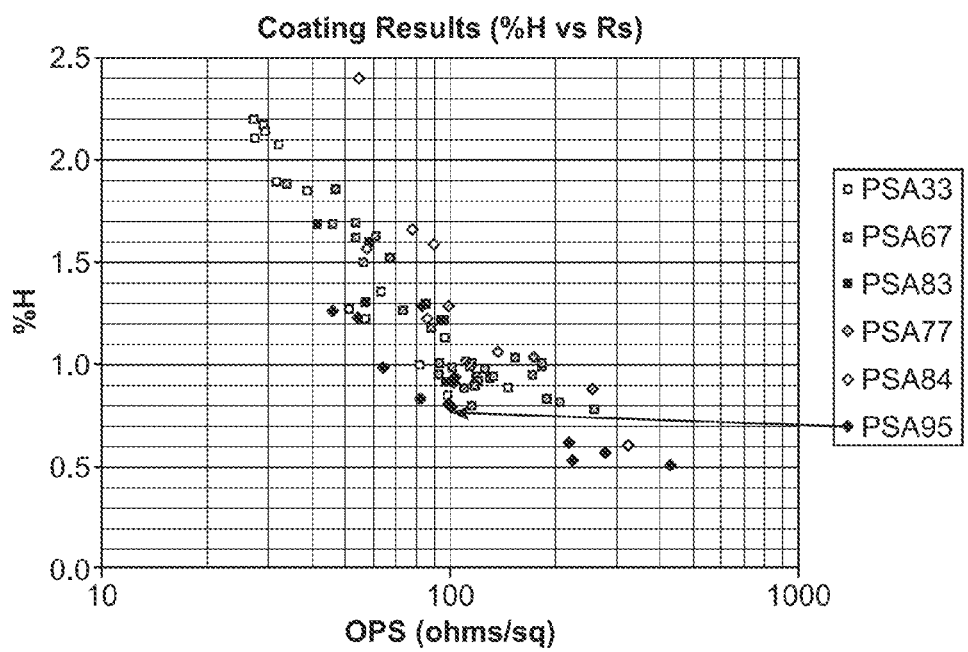

Silver nanowires produced according to FIG. 20 were embedded in substrates (here, polycarbonate substrates) to produce transparent conductive electrodes. Haze and sheet resistance values of the transparent conductive electrodes were obtained and compared with corresponding values of transparent conductive electrodes incorporating silver nanowires produced according to different reaction conditions. As shown in FIGS. 26-28, the transparent conductive electrodes incorporating the silver nanowires produced according to FIG. 20 generally yielded the best results in terms of a combination of lower haze and lower sheet resistance.

Example 9

Production of Silver Nanowires

Figure 29:
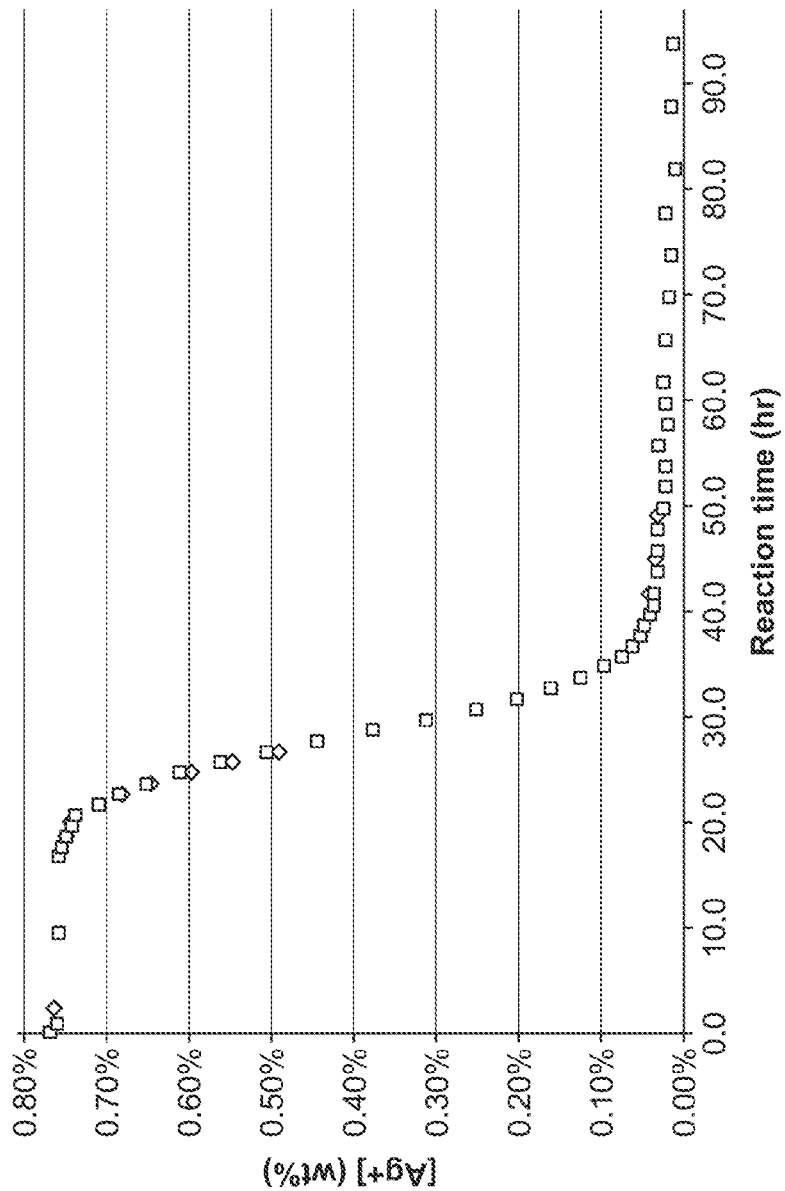
FIG. 29 is a titration plot of free silver cations (or $Ag^+$) available in a reaction mixture during the course of a reaction for a typical synthesis (square, about 96 hr) and a shorter synthesis (diamond, about 48 hr).

FIG. 29 is a titration plot of free silver cations (or $Ag^+$) available in a reaction mixture during the course of a reaction for a typical synthesis (square, about 96 hr) and a shorter synthesis (diamond, about 48 hr). After about 48 hr of the reaction, the amount of free $Ag^+$ in the mixture drops below about 0.03 wt. %, indicating that about 96% (or more) of the reaction is complete. No noticeable difference was observed in nanowire morphology for the 48 hr synthesis compared to the typical 96 hr synthesis.

Example 10

Characterization of Silver Nanowires

Figure 30:
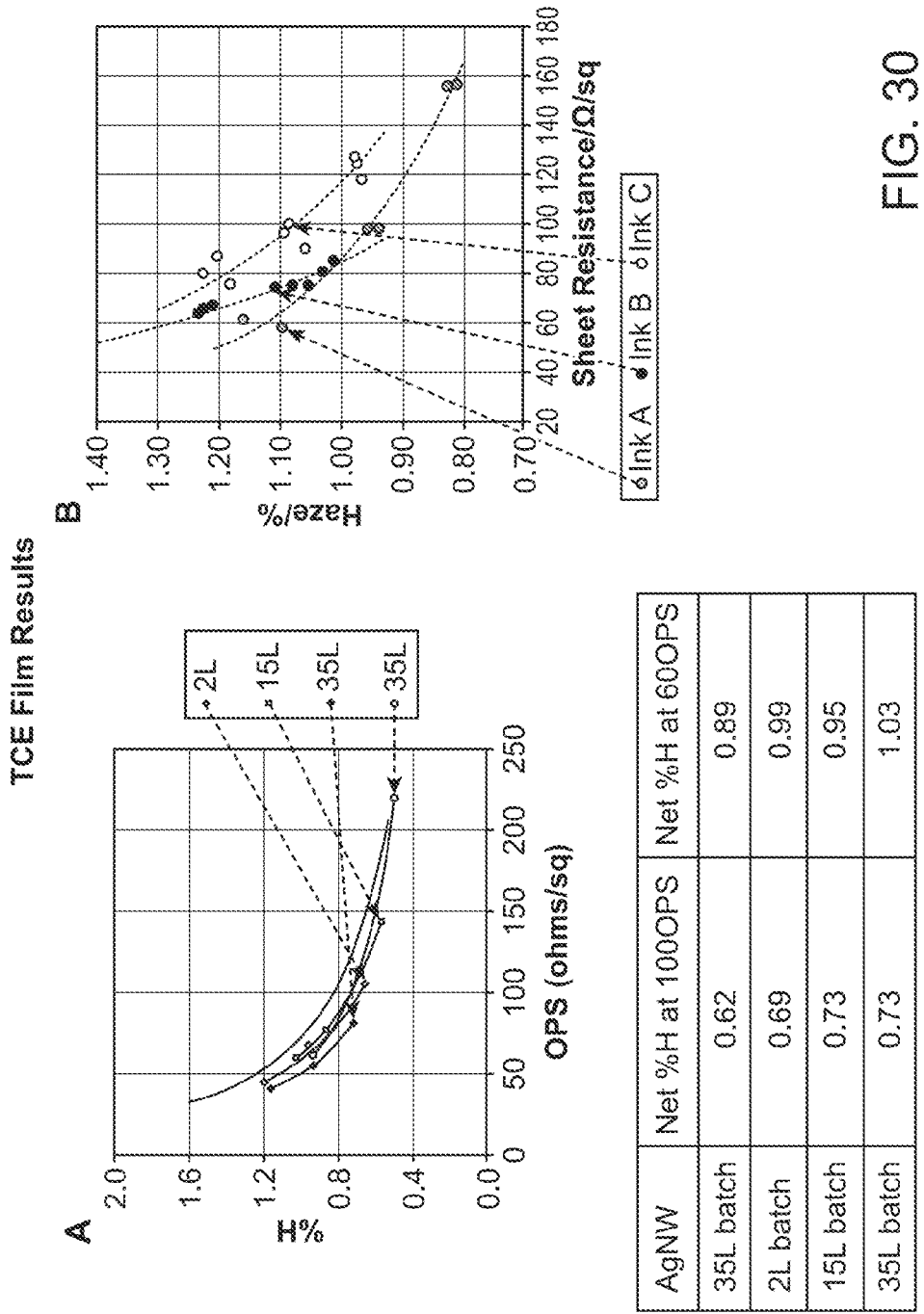
FIG. 30 shows haze and sheet resistance values of transparent conductive electrodes incorporating silver nanowires and with different silver nanowire ink formulations.

Silver nanowires produced according to this disclosure were embedded in substrates to produce transparent conductive electrodes. Haze and sheet resistance values of the transparent conductive electrodes were obtained and compared with one another. As shown in FIG. 30, the transparent conductive electrodes exhibited excellent results in terms of a combination of low haze and low sheet resistance, which can be further optimized using different nanowire ink formulations.

Example 11

Production and Characterization of Silver Nanowires

Figure 31:
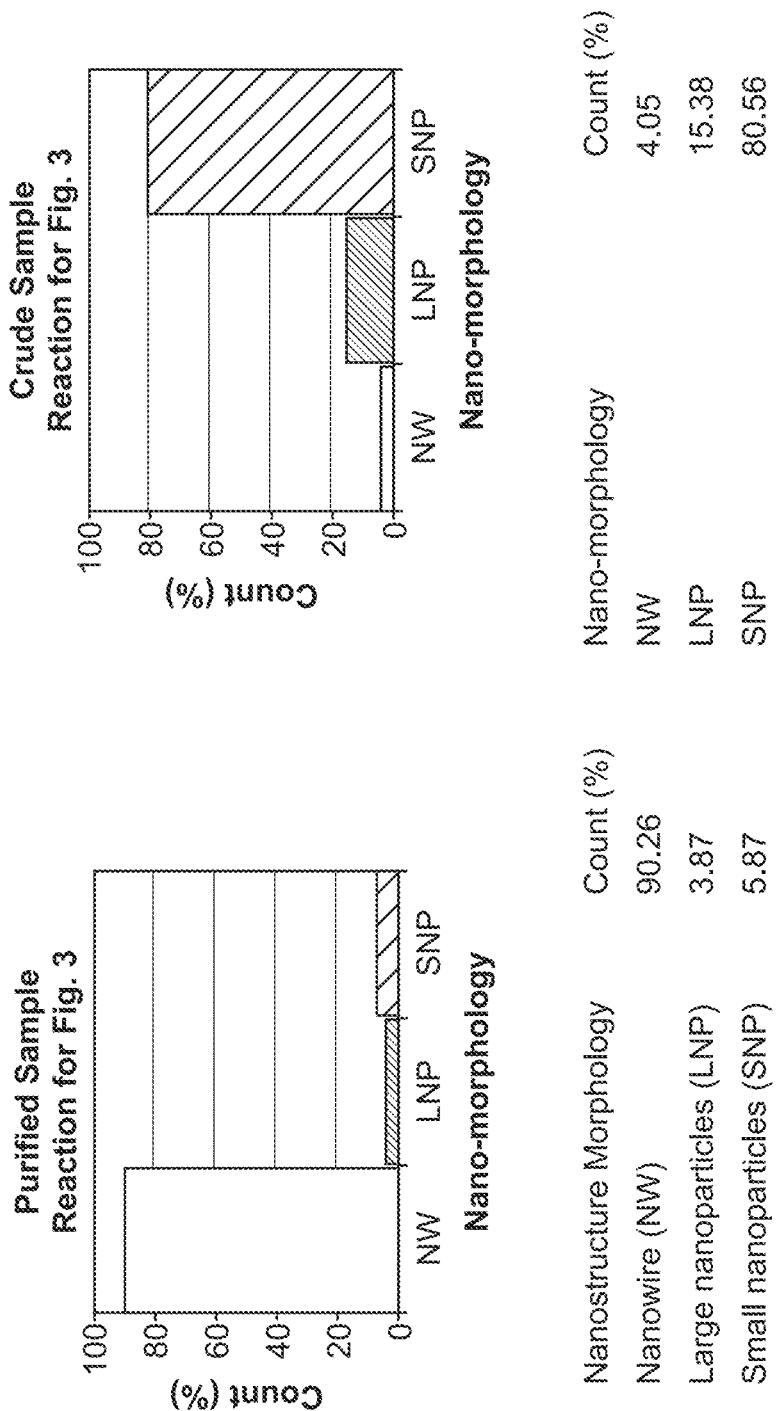
FIG. 31 shows percentages by number of different types of nanostructures resulting from a reaction according FIG. 3, with the left-hand side showing results for a purified sample, and the right-hand side showing results for a crude sample.

FIG. 31 shows percentages by number (based on inspection of imaged samples) of different types of nanostructures and microstructures resulting from a reaction according FIG. 3, with the left-hand side showing results for a purified sample, and the right-hand side showing results for a crude sample. The different types of nanostructures and microstructures formed in the reaction are mainly categorized into nanowires, large particles, and small particles, and are characterized with an optical microscope. Several (e.g., at least 25) dark field optical images are acquired at controlled brightness and exposure to calculate the number percentages of nanowires (here, specified as having an aspect ratio >3), small particles (here, specified as having a diameter <2 μm in dark field), and large particles (here, >2 μm diameter in dark field) using an image analysis software program, which in turn indicate the purity of the particular reaction.

Figure 32:
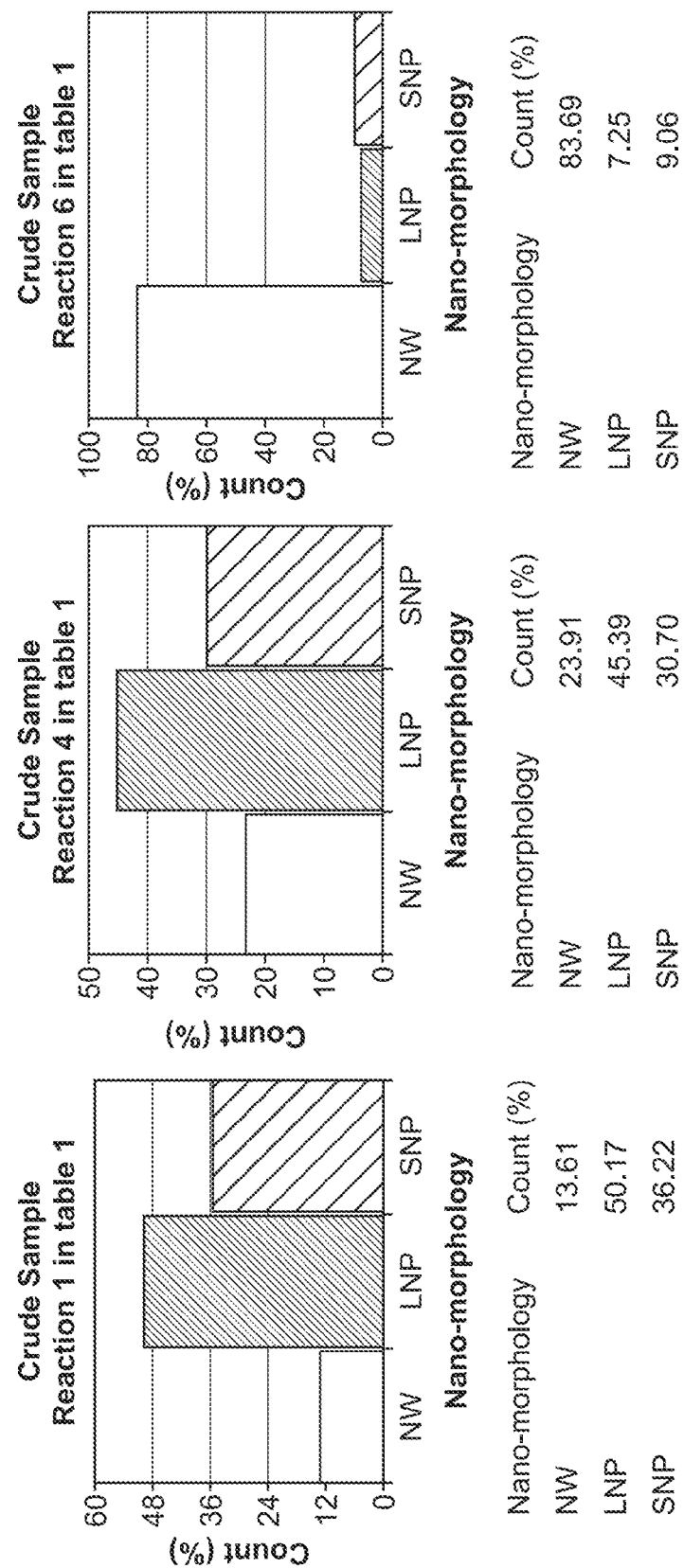
FIG. 32 (left-hand side) shows percentages by number of different types of nanostructures resulting from the reaction (1) in Table 1 of Example 3, FIG. 32 (middle) shows percentages by number of different types of nanostructures resulting from the reaction (4) in Table 1 of Example 3, and FIG. 32 (right-hand side) shows percentages by number of different types of nanostructures resulting from reaction (6) in Table 1 of Example 3, a high purity reaction in which concentrations of PVP, $AgNO_3$, and NaCl added to a reaction mixture were respectively about 0.75×, about 1×, and about 0.5× of the corresponding concentrations used for the reaction of FIG. 3, and a reaction temperature was about 120° C.

FIG. 32 (left-hand side) shows percentages by number of different types of nanostructures and microstructures resulting from the reaction (1) in Table 1 of Example 3, and FIG. 32 (middle) shows percentages by number of different types of nanostructures and microstructures resulting from the reaction (4) in Table 1 of Example 3. FIG. 32 (right-hand side) shows percentages by number of different types of nanostructures and microstructures resulting from a reaction in which concentrations of PVP, AgNO$_3$, and NaCl added to a reaction mixture were respectively about 0.75×, about 1×, and about 0.5× of the corresponding concentrations used for the reaction of FIG. 3, and a reaction temperature was about 120° C.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, or process to the objective, spirit and scope of this disclosure. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not limitations of this disclosure.

What is claimed is:

1. A method of producing nanowires, comprising:
   energizing
   (i) a metal-containing reagent;
   (ii) a templating agent;
   (iii) a reducing agent; and
   (iv) a seed-promoting agent (SPA)
   in a reaction medium and under conditions of a first temperature for at least a portion of a first duration, followed by a second temperature for at least a portion of a second duration, and the second temperature is different from the first temperature, wherein:
   the reaction medium includes an alcohol including at least three hydroxyl groups per molecule,
   the first temperature is less than 85° C.,
   the second temperature is less than 105° C. and is greater than the first temperature,
   the metal-containing reagent is silver nitrate,
   the templating agent is poly(vinylpyrrolidone),
   the reducing agent is an oxidized derivative of the alcohol,
   the SPA is sodium chloride, and
   an overall concentration of silver in the reaction medium, including ionic and elemental metal forms, is less than 0.1 molar.

2. The method of claim 1, wherein the alcohol is glycerol.

3. The method of claim 1, wherein the templating agent is in a solid or semi-solid form when combined with the metal-containing reagent.

4. The method of claim 1, wherein:
   the SPA is a first SPA, and
   the energizing further includes energizing a second SPA that is a source of nitrate anions different from silver nitrate.

5. The method of claim 1, wherein the first temperature is at least 40° C., and the second duration is longer than the first duration.

* * * * *